(12) United States Patent
Orlow

(10) Patent No.: US 12,097,439 B2
(45) Date of Patent: *Sep. 24, 2024

(54) METHOD AND SYSTEM FOR STRUCTURING AND DEPLOYING AN ELECTRONIC SKILL-BASED ACTIVITY

(71) Applicant: Vetnos, LLC, New York, NY (US)

(72) Inventor: Daniel K. Orlow, New York, NY (US)

(73) Assignee: Vetnos LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,911

(22) Filed: Dec. 1, 2023

(65) Prior Publication Data

US 2024/0091628 A1 Mar. 21, 2024

Related U.S. Application Data

(63) Continuation-in-part of application No. 18/496,347, filed on Oct. 27, 2023, which is a continuation-in-part of application No. 17/902,637, filed on Sep. 2, 2022, now Pat. No. 11,819,768, which is a continuation of application No. 17/563,807, filed on Dec. 28, 2021, now Pat. No. 11,433,295, which is a continuation of (Continued)

(51) Int. Cl.
| | |
|---|---|
| *A63F 9/24* | (2006.01) |
| *A63F 3/06* | (2006.01) |
| *A63F 11/00* | (2006.01) |
| *G06F 13/00* | (2006.01) |
| *G06F 17/00* | (2019.01) |
| *G06N 20/00* | (2019.01) |
| *G06Q 50/34* | (2012.01) |
| *G07F 17/32* | (2006.01) |

(52) U.S. Cl.
CPC .......... *A63F 3/0645* (2013.01); *G06N 20/00* (2019.01); *G06Q 50/34* (2013.01); *G07F 17/3211* (2013.01); *G07F 17/3227* (2013.01); *G07F 17/3237* (2013.01); *G07F 17/3244* (2013.01); *G07F 17/3288* (2013.01)

(58) Field of Classification Search
CPC ... G07F 17/32; G07F 17/3214; G07F 17/3222
USPC .......................... 463/1, 15, 19, 20, 22, 25, 30
See application file for complete search history.

(56) References Cited

U.S. PATENT DOCUMENTS

2006/0030395 A1* 2/2006 Thomas .............. G07F 17/3293
463/17

* cited by examiner

*Primary Examiner* — Adetokunbo O Torimiro
(74) *Attorney, Agent, or Firm* — Greenberg Traurig, LLP

(57) ABSTRACT

Embodiments of the present disclosure enable system(s) and method(s) for creating and deploying an electronic skill-based activity, including implementing a matchup tool to determine a projected performance score for participants in real-world events based at least in part on historical performance data of each participant. The matchup tool creates suggested matchups for inclusion in a skill-based game by selecting, for each suggested matchup, at least two components, formed from one or more participants, expected to produce substantially similar scores in the skill-based game based on the projected performance score of each participant. The matchup tool renders for display to a game operator the suggested matchups to enable the game operator to interactively select suggested matchups for inclusion within the skill-based game. The matchup tool transmits the selected matchup to presentation devices of users to enable the users to interactively select components as predicted winning components of the skill-based game.

20 Claims, 37 Drawing Sheets

Related U.S. Application Data application No. 17/367,249, filed on Jul. 2, 2021, now Pat. No. 11,207,588.

Multiple Game Types

Array Selected from Risk Inventory Based on Predicted Preferences of Customer

- Computer Builds Array from Risk Inventory and Selects "Winner"

- Computer Builds Array from Risk Inventory and Customer Selects "Winner"

- Customer Builds Array from Risk Inventory and Selects "Winner"

Array Selected from Randomly Generated Risk Inventory

- Computer Builds Array from Risk Inventory and Selects "Winner" (Slots)

- Computer Builds Array from Risk Inventory and Customer Selects "Winner" (Keno)

- Customer Builds Array from Risk Inventory and Computer Selects "Winner"

- Customer Builds Array from Risk Inventory and Selects "Winner"

| Select Secondary Random Numbers | | |
|---|---|---|
| [1-10] | [11-20] | [21-30] |
| 9 | 12 | 22 |
| [31-40] | [41-50] | [51-60] |
| 36 | 41 | 57 |
| [61-70] | [71-80] | [81-90] |
| 65 | 79 | 84 |

570

| Match Primary and Secondary | | |
|---|---|---|
| 9 | 12 | 30 |
| 9 | 12 | 22 |
| 40 | 44 | 58 |
| 36 | 41 | 57 |
| 63 | 71 | 89 |
| 65 | 79 | 84 |

575

Athlete or Team Based Event Slot Machine
Athlete Selection of Matchup, Over
Under, Toggle of Events 1 Through N

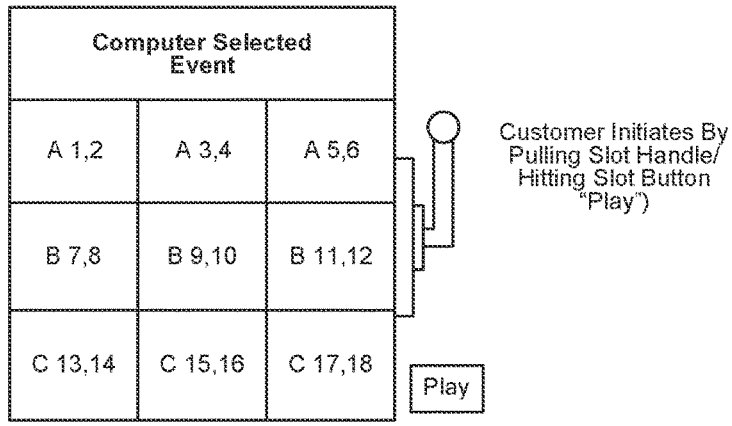

1. Consumer Accepts Array and Athlete Selection (Lottery)
2. Bingo of Prior Games Results are Randomized to Bingo using Draw System
3. Customer has Ability to Play for Presented Game at Multiple Payouts

*FIG. 26*

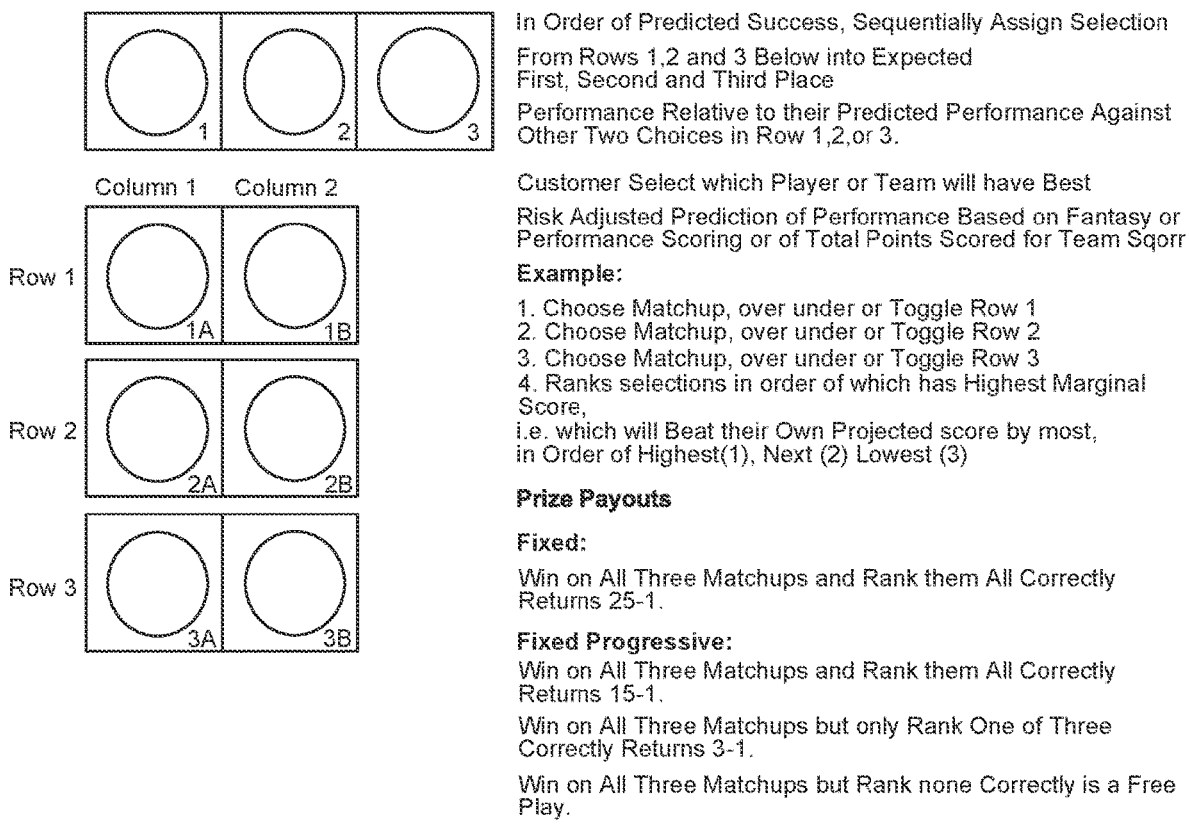

In Order of Predicted Success, Sequentially Assign Selection
From Rows 1,2 and 3 Below into Expected
First, Second and Third Place
Performance Relative to their Predicted Performance Against
Other Two Choices in Row 1,2,or 3.

Customer Select which Player or Team will have Best
Risk Adjusted Prediction of Performance Based on Fantasy or
Performance Scoring or of Total Points Scored for Team Sqorr

Example:

1. Choose Matchup, over under or Toggle Row 1
2. Choose Matchup, over under or Toggle Row 2
3. Choose Matchup, over under or Toggle Row 3
4. Ranks selections in order of which has Highest Marginal Score,
i.e. which will Beat their Own Projected score by most,
in Order of Highest(1), Next (2) Lowest (3)

Prize Payouts

Fixed:

Win on All Three Matchups and Rank them All Correctly
Returns 25-1.

Fixed Progressive:

Win on All Three Matchups and Rank them All Correctly
Returns 15-1.

Win on All Three Matchups but only Rank One of Three
Correctly Returns 3-1.

Win on All Three Matchups but Rank none Correctly is a Free
Play.

*FIG. 27*

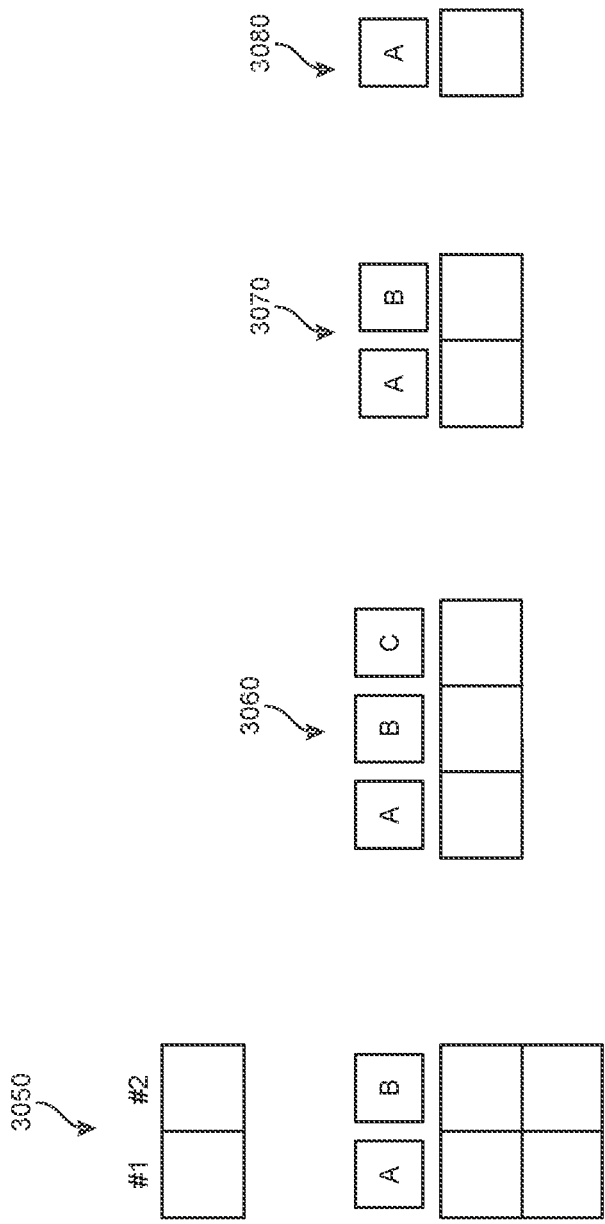

II. Ranking Athletes

| | #1 | #2 | #3 | #4 |
|---|---|---|---|---|
| | A | B | C | D |

24 Permutations
N=4

FIG. 32A

II. Over Under
1. A+B
2. A+C
3. A+D
4. B+C
5. B+D
6. C+D

III. Matchup

Team 1        Team 2

| 1 | A | B |   | C | D |
| 2 | A | C |   | B | D |
| 3 | A | D |   | B | C |

IV. Ranking Teams

| #1 | #2 | #3 |

- Select From Rows 1, 2 & 3
- Rank in Order of Expected Performance N=4

FIG. 32D

V. Matchup With Ranking

Team 1        Team 2

| 1 | A | B |   | C | D |
| 2 | A | C |   | B | D |
| 3 | A | D |   | B | C |

| #1 | #2 | #3 |

FIG. 32E

Rewards:

A Rewards May or May not Equal B Rewards

| | | |
|---|---|---|
| Fixed | A | B |
| Fixed Progressive | A | B |
| Dynamic Fixed | A | B |
| Dynamic Fixed Progressive | A | B |

FIG. 33

METHOD AND SYSTEM FOR STRUCTURING AND DEPLOYING AN ELECTRONIC SKILL-BASED ACTIVITY

PRIORITY

This application is a continuation in part of U.S. application Ser. No. 18/496,347, filed on Oct. 27, 2023, which is a continuation in part of U.S. application Ser. No. 17/902,637, filed on Sep. 2, 2022, which is a continuation of U.S. patent application Ser. No. 17/563,807, filed Dec. 28, 2021, to be issued as U.S. Pat. No. 11,433,295, which is a continuation of U.S. patent application Ser. No. 17/367,249, filed Jul. 2, 2021, now issued as U.S. Pat. No. 11,207,588, the disclosures of each of which are incorporated, in their entirety, by this reference.

TECHNICAL FIELD

The present invention relates to computer-implemented gaming activities that incorporate games of skill and chance. Aspects of the invention relate to computer-implemented gaming systems that meet the requirements for class II gaming under 25 C.F.R. § 547.

BACKGROUND ART

Sports wagering is a very popular activity because it increases fan interest and excitement in sports events. With a wager at stake, a fan's interest in the outcome of a sports event is heightened. Also, sports wagering increases a fan's interest in a sport as the fan tracks teams and players in an attempt to place wagers that they believe will be winning. Sports wagering, both land-based and internet-based, has been established to offer such services and may depend on jurisdictional laws.

Sports wagering, however, is not legal in many locations. As a result, other types of activities have been created to increase fan interest and excitement associated with sporting events. As one example, fantasy sports have been created. These activities correlate the performance of players or sets of players involved in actual sports events to a non-wagering entertainment activity.

Skill-based games that allow a player to participate with real money purchases with resulting prizes based on the user's skill have become popular. Such games allow a user to engage in a skill where they compete and play against other users. Examples of such skill-based games include games such as Diamond Strike, poker, and fantasy sports leagues (e.g., baseball, football etc.).

Traditional fantasy sports typically require a significant time commitment and may be difficult for a fan to play casually or quickly. Similarly, legacy sports betting is a standardized model based on money-line spreads, with betting lines on single events or multiple events in combinations and at various prices for various risk level. Consequently, from the perspective of an operator, it may be difficult to attract casual sports fans with traditional fantasy sports.

Class II games under 25 C.F.R. § 547 provide popular Native American gaming activities. Predominant in this category are games based on bingo cards, i.e. a random number output in an array format. Integrating fantasy sports scoring into class II bingo games ensures a high degree of randomness and may provide added excitement for sport's fan gaming enthusiasts.

It is thus desirable to develop new type activities in a fast-paced sports and event based gaming environment, including skill-based activities as well as activities that satisfy the technical requirements for class II games under 25 C.F.R. § 547.

A requirement for successful implementation of such activities is a risk-management based platform of services configured to serve games of skill and chance to customers, and to produce, manufacture, distribute and monitor based on unit risk and liquidity.

SUMMARY OF THE EMBODIMENTS

In accordance with embodiments of the invention, there is provided a non-transitory storage medium storing instructions that, when executed by an activity server system, establish computer processes. In this embodiment, the activity server system communicates over a wide area network with a plurality of presentation computing devices, each distinct one of the presentation devices associated with a distinct one of a plurality of users. Also in this embodiment the computer processes include:

- separately responsive to prompting by the activity server system, receiving from each of the presentation devices user profile data including user validation information;
- validating the profile data to determine user eligibility to play a proffered event bingo game;
- serving, to each validated presentation device of each eligible user, a corresponding game card having a plurality of risk units selected from a risk inventory, each risk unit having at least two potential winning outcome and an association with a position on the game card;
- determining a set of reward winning patterns;
- estimating a volume of game card sales;
- determining a fixed odds payout for each of the set of reward winning patterns based on the estimated volume of game card sales;
- for each risk unit, choosing, from the at least two potential winning outcomes therein, a projected winner;
- for each risk unit, determining, based on an outcome of a set of actual events, which potential winner is an actual winner based on the correct event selection;
- for bingo games daubing all positions for each game card for which actual winners match projected winners;
- for bingo games determining if each game card has at least one reward winning pattern based on daubed positions, and identifying a user having such game card;
- dispensing the fixed odds payout to the user having the reward winning pattern.

In a further related embodiment determining the fixed odds payout includes determining the fixed odds payout based on a desired discount to theoretical value. To discount the theoretical value the platform may take the chance of a reward being won, and then the amount of a fixed odds reward as a payout to determine the projected payouts. The fixed odds may then be discounted to allow for a theoretical profit to be obtained. Since meeting the theoretical profit becomes higher as more money enters the pool, the platform may be able to offer higher odds payouts if more money is bet. Optionally, determining the fixed odds payout based on the desired margin includes determining the desired margin based on the estimated volume of game card sales. Also optionally, determining the fixed odds payout includes determining the fixed odds payout separately for each presentation device. Also optionally, determining the fixed odds payout separately for each presentation device further includes determining the fixed odds payout separately for each such presentation device based on a history of success of such presentation device. Also optionally, serving the corresponding game card further includes configuring the corresponding game card for playing a skill-based game. Also optionally, serving the corresponding game card further includes configuring the corresponding game card for playing a chance-based game. Also optionally, the computer processes further comprise determining a venue associated with each of the presentation devices and wherein configuring the corresponding game-card for playing the skill-based game further includes determining if the venue of each respective presentation device so permits and otherwise prohibiting playing the skill-based game. Also optionally, the computer processes further comprise determining a venue associated with each of the presentation devices and wherein configuring the corresponding game-card for playing the chance-based game further includes determining if the venue of each respective presentation device so permits and otherwise prohibiting playing the chance-based game. Also optionally, determining if each game card has at least one reward winning pattern further includes determining if the game card has a correct ranking, based on a marginal score, of the risk units. Also optionally, determining if each game card has at least one reward winning pattern further includes determining if a participant of each risk unit is qualified. Also optionally, determining the fixed odds payouts for each of the reward winning patterns includes calculating the fixed odds payouts based on a size of a sphere of outcomes so as to reduce a probability of a non-negative return.

In accordance with another embodiment of the invention, there is provided a non-transitory storage medium storing instructions that, when executed by an activity server system, establish computer processes. In this embodiment, the activity server system communicates over a wide area network with a plurality of presentation computing devices, each distinct one of the presentation devices associated with a distinct one of a plurality of users. Also in this embodiment the computer processes include:

separately assigning, from a risk inventory, a risk unit, comprising at least two potential winners, to a position of each bingo card;

for each bingo card, assigning each potential winner of each risk unit a pool of numbers;

for each bingo card, selecting randomly, from the pool of numbers assigned to each potential winner a corresponding number;

for each risk unit, choosing, from the at least two potential winners in the risk unit, a projected winner, and assigning the corresponding number for the projected winner to the risk unit's assigned position;

for each risk unit, determining, based on an outcome of a set of actual events, which potential winner is an actual winner;

assigning each risk unit on the bingo card the actual winner for such risk unit and a winning number, wherein the winning number is the corresponding number assigned to the actual winner;

marking all positions for each bingo card for which actual winners match projected winners;

selecting a game ending pattern for the bingo cards;

for each position on the bingo cards, assigning a second number chosen randomly from a pool of numbers including the winning number for the position;

daubing each marked position on the bingo cards for which the assigned winning number matches the second number;

selecting the bingo card having a game ending pattern of daubed positions as a winning bingo card, and identifying a user having the winning bingo card;

dispensing a reward to the user having the winning bingo card;

dispensing a fixed odds reward to the user having a bingo card having a reward winning pattern.

In a further related embodiment assigning each potential winner of each risk unit the pool of numbers includes, for each bingo card, assigning each potential winner a distinct pool of numbers. Optionally, the computer processes further include generating the risk inventory based on algorithmic processes. Also optionally, generating the risk inventory includes using machine learning. Also optionally, assigning, from the risk inventory, the risk unit includes assigned the risk unit based on random selection. Also optionally, the array of positions is a two-dimensional array. Also optionally, the array of positions is mapped onto a three-dimensional surface. Also optionally, the array is a 3×3 matrix. Also optionally, selecting the bingo card having a game ending pattern further includes selecting the bingo card having daubed selections on two contiguous squares. Also optionally, selecting the bingo card having a game ending pattern further includes selecting the bingo card having a pattern of three daubed selections in a row, selected from the group consisting of horizontal, vertical, and diagonal. Also optionally, serving the corresponding bingo card having an array of positions includes displaying the bingo card to the user as a slot machine interface and wherein the computer processes further comprise initiating the event bingo game by a user interaction with the slot machine interface. Also optionally, assigning a second number chosen randomly from a pool of numbers is done repeatedly such that for each bingo card each marked position is a daubed position, wherein the reward to the user having the winning bingo card is the fixed odds reward

BRIEF DESCRIPTION OF THE DRAWINGS

The foregoing features of embodiments will be more readily understood by reference to the following detailed description, taken with reference to the accompanying drawings, in which:

FIG. 6 summarizes multiple embodiments of array-based games, based on how arrays are constructed and how choices are made for the arrays.

FIG. 7 embodies array-based games for which the computer generates and arranges event-based risk units in an array-based on a set of rules, and selects a prospective winner for each risk unit based on further rules.

FIG. 8 embodies array-based games for which the computer generates and arranges event-based risk units based on a set of rules, and customer chooses a prospective winner for each risk unit.

FIG. 21 shows, by means of a specific example, the process of building a micro bingo card according to an embodiment of the instant invention. Risk units are selected randomly or algorithmically by the computer and displayed on a 3×3 bingo card. First integers are randomly selected from pools, and are overlaid with computer-selected risk units, so that each potential winner is associated with a first integer.

FIG. 26 is a micro bingo game configured as a slot machine, where the customer initiates machine processes that select events and potential winners and compares potential winners to actual winners according to event bingo rules.

FIG. 27 embodies a game where the user selects a projected winner from a risk unit and ranks the projected winners in the order of highest to lowest marginal score.

FIGS. 30A-H embody games having a varied number of risk units, potential winners, and rank selections.

FIGS. 32A-E embody games where each potential winner may include more than one participant.

FIG. 33 embodies a game where rewards change based on selection of a potential winner.

DETAILED DESCRIPTION OF SPECIFIC EMBODIMENTS

Figure 1:
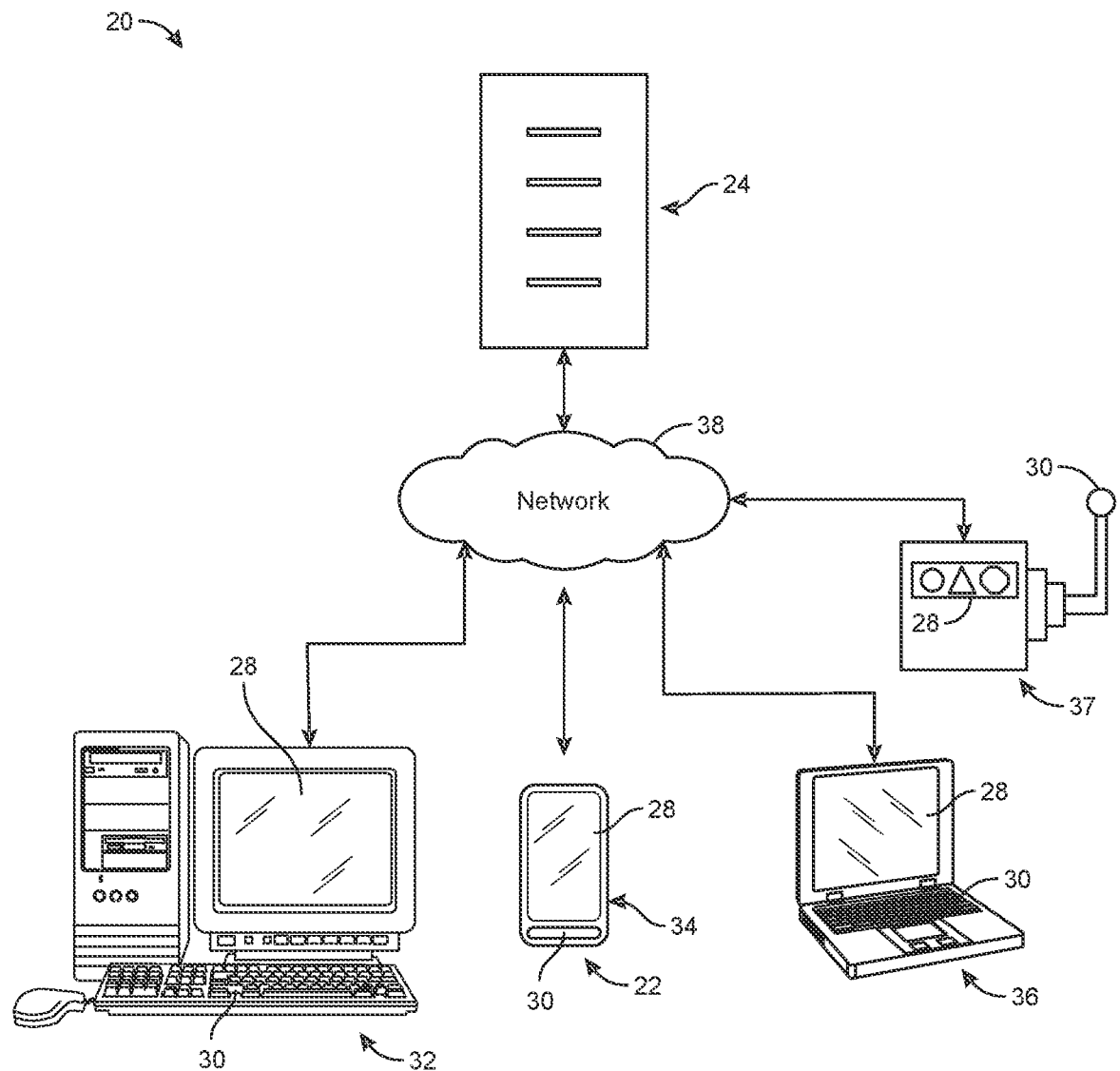
FIG. 1 is a computing environment for implementing embodiments of the present invention.

Definitions. As used in this description and the accompanying claims, the following terms shall have the meanings indicated, unless the context otherwise requires:

A "set" is a grouping that includes at least one member.

A "skill-based game" shall mean a game that allows a user to use a skill such as the selection of participants based upon statistics and personal knowledge prior to occurrence of a set of events, such as sporting events, wherein, for the skill-based game, a determination will be made based upon a set of preexisting scoring rules for scoring the one or more of the participants based upon actual performance in the set of events. As used herein, a "skill-based game" shall be understood to operate in a manner as to be exempt from sports betting regulation under provisions of the Unlawful Internet Gambling Enforcement Act of 2006 (UIGEA), 31 U.S.C. §§ 5361-5366, as a "fantasy or simulation sports game or educational game or contest in which (if the game or contest involves a team or teams) no fantasy or simulation sports team is based on the current membership of an actual team that is a member of an amateur or professional sports organization (as those terms are defined in section 3701 of title 28)" and that additionally meet the enumerated criteria of 31 U.S.C. § 5362(1)(E)(ix). Specifically, (I) All rewards offered to winning participants are established and made known to the participants in advance of the game or contest and their value is not determined by the number of participants or the amount of any fees paid by those participants. (II) All winning outcomes reflect the relative knowledge and skill of the participants and are determined predominantly by accumulated statistical results of the performance of individuals (athletes in the case of sports events) in multiple real-world sporting or other events. (III) No winning outcome is based—(aa) on the score, point-spread, or any performance or performances of any single real-world team or any combination of such teams; or (bb) solely on any single performance of an individual athlete in any single real-world sporting or other event. Further these are read in accordance and to be congruent with a broad range of state law tests.

"Bingo" is defined herein by 25 C.F.R. 547.3, which in part requires that players: (1) play for prizes with sheets (herein also referred to as cards) bearing randomly generated numbers; (2) mark numbers or designations when events, are determined, 3) daub positions based on event selection (an event being a ball drop or other event); and (4) end the game by being the first person to cover a "game-ending pattern" on such cards based on a "ball drop" producing a random number that matches a random number already present on a sheet (or here a card)

An "event bingo" game is a bingo game the outcome of which (the "ball drop") is determined by the association of actual event outcomes with randomly selected numbers. According to embodiments described in this disclosure, events are associated with positions on an array, and randomly selected first and second numbers are assigned to each position of each risk unit, in part based on the outcome of actual events. Any array choice game can be used to construct an "event bingo" game.

A "user" means an individual playing a skill-based game or an event bingo game.

A "participant" refers to an item, for example, a "player," such as an "athlete" or a "team" within an event (e.g., sporting event such as professional football or other event etc.), on which a skill-based game is based. In horse-racing a "participant" can be a horse, a jockey, or a trainer.

A "risk unit" is a choice of "potential winners" offered to the user. Examples of risk units are: an over-under, a matchup, a toggle, and other types of single choice game offerings.

A "projected winner" is a single potential winner chosen from a risk unit. The projected winner can be chosen by means selected from the group consisting of: a user selection, a random computer process, and a non-random computer process.

A "winning selection" is a projected winner later determined to be an "actual winner."

An "actual winner" is determined for each risk unit based on the results of one or more actual events. The "actual winner" of a matchup or toggle is determined as the participant in a risk unit having the highest score.

A participant's "score" is based on performance in actual events, and may be expressed in terms of a variety of player statistics (e.g. points scored, assists, runs batted in) or may be an aggregate statistical determination of player performance (e.g. fantasy points).

A "matchup" is a risk unit that presents to the user a first participant and a second participant from which a projected winner is chosen from the two participants. If the projected winner matches the actual winner, then the risk unit is said to be "correctly matched."

A "matchup N" is a risk unit that presents to the user N participants from which a projected winner is chosen from the N participants. If the projected winner matches the actual winner, then the risk unit is said to be "correctly matched."

An "over-under" is a game in which the user is presented a predicted score for a participant in an event and selects whether the actual score will be over or under the predicted score. For an "over-under" the "projected winner" is a skill-based or random selection of over or under. If the projected winner matches the actual winner, then the risk unit is said to be "correctly matched."

A "toggle" is a risk unit that presents to the user a first participant and a choice from a plurality of second participants to pair against the first participant in a matchup. If the projected winner matches the actual winner, then the risk unit is said to be "correctly matched."

For a matchup or toggle, a "marginal score" is the difference in score between the first participant and the second participant. For an over-under the "marginal score" is the difference between an actual score and a predicted score. For a match-up having a point spread, the marginal score is the difference between the actual score and the point spread.

An "advanced choice game" is a game with one or more risk units, each game being assigned a fixed odds payout based on winning user selections within the game.

A "ranking game" is an advanced choice game comprising multiple selections, wherein the selections are further ranked based on marginal score, in the order of highest to lowest.

An "array" is an arrangement of objects in two dimensions or on the surface of a three-dimensional object. It can be calculated as a single object, which in a three-dimensional application is the same as a cube or die.

For an event bingo game, a "bingo card" is synonymous with an "array."

A "position" is a location and geometric representation of an object in an array. For traditional bingo, the "position" is represented as a "square." However, in other array-based games, including event bingo, a "position" may be represented by another type of geometric object such as a triangle, pentagon, or hexagon.

A "game-ending pattern" for a bingo card associated with an event bingo game is a predetermined pattern of matched first and second random numbers on a bingo card.

A "winning bingo card" is the first bingo card to obtain a game ending pattern of matching first and second random numbers.

An "array choice" is a game that includes an array of positions, each position associated with an element, each element being selected from the group consisting of a matchup, a toggle, and an over-under, wherein, for each element, the user makes a selection of a predicted outcome associated with the element. In order for a user to win, the actual outcome must match the predicted outcome for each of a specified pattern of elements in the array, such as neighboring pairs, a row, a column, or a diagonal.

An "array choice-plus-ranking" is an array choice game in which, besides selecting a predicted outcome for each element of an array, the user additionally ranks the selected predicted outcome in relation to the outcomes of other elements in the array.

A "category choice" is a game that includes multiple categories of matchups and the user selects a set of participants from each matchup category.

A "two-dimensional array" is an array presenting positions as a two-dimensional arrangement. For array-based games, each position is associated with a risk unit. The presented arrangement of positions defines the contiguity of neighboring positions for the purpose of determining a "game-ending pattern."

A "three-dimensional array" is an array presenting positions on the surface of a three-dimensional object. For array-based games, each position is associated with a risk unit. The presented arrangement of positions defines the contiguity of neighboring positions which may determine a game-ending pattern or a reward winning pattern.

"Tic-tac-toe" is an array choice game for which each square of a 3×3 array provides a risk unit, and for which winning requires three-in-a-row winning choices.

"X's and O's" is a variant of the tic-tac-toe game for which the tic-tac-toe board is rotated for presentation as a diamond.

"Micro Bingo" is an event bingo game for which each square of a 3×3 array is associated with randomly selected numbers associated with risk unit selections, whereby the game ending pattern ends the game. In various embodiments a prize ending or reward winning pattern may be produced by also using a random number generator to identify and match correctly selected events qualifying for awards to the previously produced random number generator such that for event-based bingo, a reward winning pattern can be randomly or previously established matching correctly selected events to produce a game ending pattern. In various embodiments the interim, continuation, consolation or bonus prizes are then awarded based on the sequence of correctly selected events.

An "operator" means a person or group that operates the system for presenting the skill-based game to a user. In certain contexts, the operator refers to a person or group of people that are skilled at determining matchups of players of equal sport skill that will likely produce similar fantasy points during a given game and scores of players that will likely be produced during a given game. The operator may receive matchup, over-under, and score suggestions from a suggestion engine and may use a matchup/score tool for making the final assigned matchups/scores. The operator of the system for presenting the skill-based game to the user, manages the activity management server, the platform and the distributed computer application for playing the skill-based game.

A "fixed odds payout" is a fixed amount of a reward assigned and presented to a given user based upon the given user's purchase amount paid and selections made in an advanced choice game, and not altered based upon the participation and selections of other users. There are four types of a fixed odds payout, each separately defined herein: a simple fixed odds payout, a fixed odds progressive payout, a dynamic fixed odds payout, and a dynamic fixed odds progressive payout.

A "simple fixed odds payout" is a fixed amount reward assigned to a given user based upon the given user's purchase amount paid and selections made in an advanced choice game, and not altered based upon the participation and selections of other users nor subject to variation in level based on a series of winning occurrences or on dynamic conditions.

A "fixed odds progressive payout" is a fixed odds payout having graduated levels based on a series of winning occurrences in the advanced choice game.

A "dynamic fixed odds payout" is a dynamically priced fixed amount reward assigned to a given user based upon the given user's purchase amount paid and selections made in an advanced choice game, and not altered based upon the participation and selections of other users, the fixed amount being dynamically priced using a technique selected from the group consisting of artificial intelligence (AI), machine learning, other algorithmic data analysis of reward, risk, volume, and total risk, and combinations thereof.

A "dynamic fixed odds progressive payout" is a dynamic fixed odds payout having graduated levels based on a series of winning occurrences in the advanced choice game.

A "risk inventory" is a set of risk units.

A "reward" is a benefit conferred upon an individual for service, effort, or achievement, such benefit including, among other things, any of a prize, a payout, and an award, and may be denominated in a form selected from the group consisting of cash, a nominal prize, a token, a currency that is, among other things, promotional, social, cryptographic, or convertible, and combinations thereof.

A "computer process" is the performance of a described function in a computer system using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

A "computer interface" is a physical or virtual embodiment that is presented to a user, allowing the user to provide instructions to control underlying computer processes.

A "slot machine" is a physical device or a virtual embodiment of a physical device that provides a computer interface that allows a user to initiate an event bingo game, signal whether or not the user is a winner of the event bingo game, and notify and/or delivers the winner a reward.

A "reward winning pattern" is a selection of actual winners meeting criteria established for receiving a fixed odds payout.

A participant is "qualified" if the participant has achieved a predetermined performance threshold in order to receive fantasy points, e.g. scoring a touching, making the 8 seconds, winning an award, etc.

A "game card" is a bingo card or other card having a game presenting a set of risk units to the user in any configuration. A game card may comprise a ranking game, bingo game, advanced choice game, or other games including games not discussed.

To "mark" a position on a game card is to indicate the position has a winning selection.

A "daub" is an indication that a position has matched a ball drop.

"Profile data" of a user is a collection of data indicative of the user, which may include data selected from the group consisting of: user validation data, user location data, user history of success, other information about the user, and combinations thereof.

Embodiments of the present invention are related to U.S. patent Ser. No. 14/847,795, filed on Sep. 8, 2015, which is published as U.S. Patent Application Publication No. 2016/0071355 and now issued at U.S. Pat. No. 10,353,543, and which is incorporated herein, in its entirety, by reference.

Technical Implementation

Embodiments of the present invention include methods and systems for presenting to users pure skill-based games (e.g. array and ranking games) and array-based games of chance (e.g. event bingo games). The embodiments present the games on fixed odds payout using a parlay structure in an array set {An,x} including performance based scoring ("fantasy/projected performance") of sport and other data enabled performance activities.

The array-based games may relate to sports activities or other entertainment-based activities, to elections, or to other events for fixed odds payout. In some embodiments, the array-based games are available for all sports, including all North American stick and ball (professional leagues, NCAA, tennis golf etc.), NASCAR (and formula 1), soccer (futbol), cricket, rugby, bass fishing, rodeo events, horse racing, etc. Some embodiments uniquely provide array-based components for horse-racing in which each component is based on performance of a horse, a jockey, a cowboy, livestock, or a trainer for fixed odds payout. In some embodiments, the activities relate to fantasy-sports type activities. Some embodiments allow multiple participants to be formed into a single game with a single reward format that is consistent despite the participants being from different sports, sports events, or other events.

FIG. 1 is a block diagram of an exemplary computing environment 20 for implementing embodiments of the present invention. The computing environment 20 includes an activity management server 24 communicatively coupled to presentation devices 22 that present, via applications executed on the presentation devices 22, game activities of skill and chance to corresponding users. The applications include user interfaces that present visual aspects of the game activities to the users.

In the environment of FIG. 1, the presentation device 22 is communicatively coupled, via a computer network 38, to the activity management server 24. The computer network 38 may be the Internet, a cellular network, a satellite communication network, or any other networks or communication systems or devices known in the art. In some embodiments, the communication link through the network 38 is a dedicated link, such as a dedicated wired link between the presentation device 22 and activity management server 24. In some embodiments, the communication link through the network 38 includes one or more local area network, wide area network, or any other networks linked together to form the computer network 38. The network 38 may include a public network, a private network, and combinations thereof. Communication over the network 38 may use different communication channels, such as secure and unsecure channels.

Each presentation device 22 includes a video display 28 configured to display game activities, and an input device 30 configured to receive input related to the game activities. Each presentation device 22 further includes a communication interface configured to communicate, via network 38, with the activity management server 24. Each presentation device 22 also includes a main processor for executing program instructions, memory for storing data such as program instructions, a video processor, an audio processor, other processors, input and output ports, etc. In some embodiments, a presentation device 22 is configured within a game console, smart television, kiosks, gaming tables, gaming tablets or other such device. In some embodiments, the presentation device 22 is a desktop computer 32, a telephone, including cellular, wireless or wired telephones or smart phone 34 (e.g., iPhone® or Android® device), a laptop or notebook computer 36, a tablet, a slot machine interface 37, or any other computing device without limitation.

The input device 30 may include a keyboard, mouse, joystick, touch-screen, buttons, track-balls, microphones, voice and gesture recognition components, or any other component known in the art to be capable of receiving input from a user. The communication interface of the presentation device 22 may be configured to permit data to be transmitted and received from components of the presentation device 22. The communication interface may support wired or wireless communications using various protocols, such as 3G, 4G, IMT, GSM, TCP/IP, Bluetooth, 802.11xx, etc. The communication interface may also be used in conjunction with alternate reality (AR) or virtual reality (VR).

The activity management server 24 includes one or more processors for executing program instructions, memory for storing data such as program instructions, and at least one communication interface for forming a communication link to at least one presentation device 22. In some embodiments, the activity management server 24 is communicatively coupled to a data storage device, such as a hard drives or database. The activity management server 24, or coupled data storage device, may store data, such as participant statistics, event schedules, images of participants, data regarding matchups, data regarding scores, data regarding rankings, data regarding game configurations, user account information, history of success of the user, and other data. The server 24 may also be configured to communicate, via its communication interface, with other devices to obtain data, such as configured to communication with another server or device to obtain game schedule information, updated player rosters, etc. In some embodiments, the activity management server 24 includes a user station that permits an operator to interface with and manage the activity management server 24, such as to change operator settings.

Aspects of the invention may be implemented via a distributed architecture, a cloud server architecture, a client-server architecture, or using any other system architecture known in the art.

Aspects of the invention may also be implemented as an "app" (e.g., downloadable, installable or installed software) which runs on the presentation device 22. For example, embodiments may include a "mobile client" that comprises a downloadable app. For example, a user may download an app from the operator or from an app store. The app may be stored on the user's presentation device 22 and then be executed by one or more processors thereof. One advantage of the downloadable app is that a much more engaging and rich media experience may be provided to the user. Further, enhanced security features including authentication and verification of identity, location, and other factors may be implemented on the app to deliver a compliant and secure experience for the user. The mobile client may be configured to interface with the activity management server 24, such as to receive information from that server 24 and to transmit information to that server 24, as well as implement other functionality.

Figure 2:
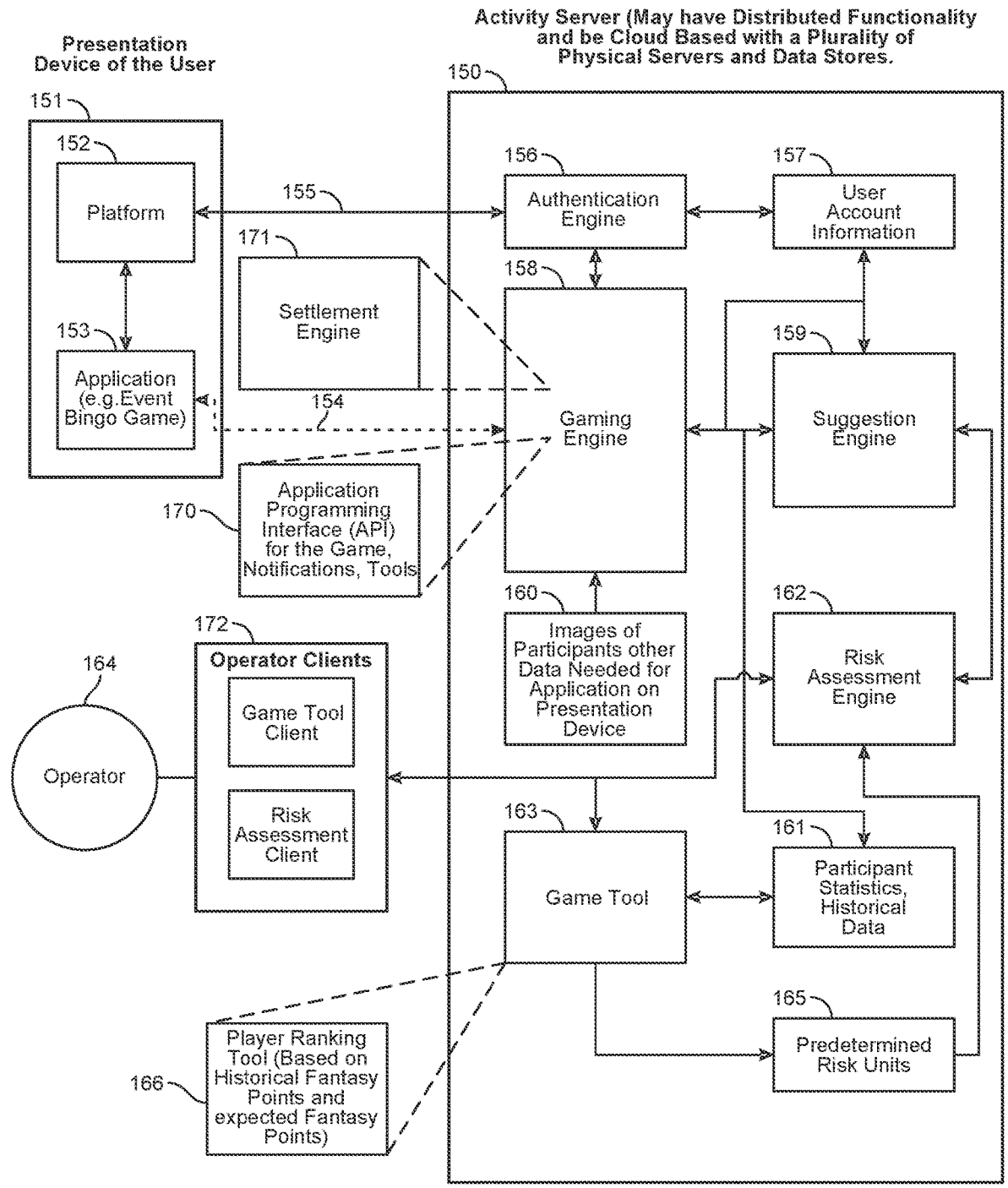
FIG. 2 is a block diagram of a platform, implemented in the network environment of FIG. 1, for performing games of skill and chance in accordance with embodiments of the present invention.

FIG. 2 is a block diagram of a platform, implemented in the network environment of FIG. 1, for serving games in accordance with an embodiment of the present invention FIG. 2 shows some of the internal components within the activity server system 150 and within the presentation device 151 of a user. In some embodiments, the activity server system 150 is the activity management server 24 of FIG. 1 and the presentation device 151 is one of the presentation devices 22 of FIG. 1.

The user first communicates through the presentation device 151 with the activity server system 150 and downloads a platform 152. The platform 152 is then run on the presentation device 151. The platform 152 provides an interface between the activity server system 150 and any platform-specific game application 153 that is downloaded to the presentation device 151. The platform 152 may perform some or all of the authentication processing and determines if the user meets with a set of compliance criteria to use the platform 152. The user downloads a platform specific game application 153 to the presentation device 151 from the activity server system 150. The platform specific game application 153 includes hooks, such as API function calls to the platform. Thus, the game application 153 only operates if authorized by the platform 152.

The compliance criteria may be based upon local or national laws and determining whether the user complies with such laws. For example, the platform 152 may have access to GPS information, or IP-based location information and may use this information to select the compliance criteria based upon location. Additionally, the age of the user may be pertinent as jurisdictions may have various age requirements. Thus, the platform 152 interfaces with the presentation device 151 and extracts information from one or more sources (e.g. GPS data, IP information) or may require the user to enter a password or answer a series of questions to validate the user's identity. Once the platform 152 determines that the user is an authorized user and one that meets the compliance criteria, the platform 152 grants access to the application game and allow the application game to either communicate 154 directly with the activity server system 150 or communicate 155 with the activity server system 150 through the platform 152.

The activity server system 150 may include one or more servers (e.g., management server 24) and may operate in a distributed computing environment. Thus, the functionality performed by the computer-based modules of the activity server system 151 may be distributed across processors or devices. The presentation device 151 (e.g., presentation device 22) of the user interfaces with one or more computer-based modules of the activity server 150 through a communications network. The activity server system 150 receives a request to play a game from the presentation device at an authentication engine 156 and receives a key that indicates that the platform 152 has confirmed compliance. The authentication engine 156 accesses a user's account information module 157 and obtains the account information for the specified user. The authentication engine 156 may perform additional authentication based upon data passed from the platform and the user's account information.

Once the authentication engine 156 is satisfied, the authentication engine 156 accesses the gaming engine 158. The gaming engine 158 provides game information (e.g., matchup data, over-under data, graphical images, statistics, etc.) to the game application 153 on the presentation device 151. The gaming engine 158 is in communication with a suggestion engine 159, an image database 160, a participant statistics and historical information database 161. The gaming engine 158 gathers this information and formats the information in accordance with a protocol that is recognized and understood by the game application 153. The game application 153 receives the data and incorporates the data into one or more templates for presentation to the user. Additionally, the application program 153 provides an interface for the transmission of selection data and other game related data to the game engine 158.

The suggestion engine 159 provides a series of risk units (e.g. matchups, over-unders, toggles) to the game engine 158 based upon a plurality of factors including: the specific user and his likes and dislikes (e.g., as to teams, particular participants, etc.), a risk assessment engine 162 determination, and a set of predetermined risk units. The predetermined risk units are determined by an operator, who is knowledgeable about the specific activity or activity of the game, or automatically determined by the suggestion engine 159 based on various criteria, including statistics and historical data associated with the activity or activity participant and accessed from database 161.

A game tool 163 is provided to the operator for assisting the operator in his risk unit selections. The tool 163 may include a graphical interface and accesses participant statistics and historical data in a database 161. The operator 164 determines risk units and stores them in a database 165.

The suggestion engine 159 communicates with a risk assessment engine 162. The risk assessment engine 162 receives all of the predetermined risk units from the database 165 and determines whether certain ones should be eliminated based upon a criteria set. As expressed above, the risk assessment engine 162 may eliminate matchups, over-unders and toggles based upon player injures, or if a determination is made that a matchup is no longer an even match or the predicted score of the over-under is no longer a likely score. The risk assessment engine 162 may receive data from one or more locations about matchup, toggle and over-under selection by users. If the matchup/toggle selections reach a predetermined percentage in favor of one of the participants, the risk assessment engine 162 may remove the matchup from the list of possible matchups. If the over-under selections reach a predetermined percentage in favor of going over or under the presented score, the risk assessment engine 162 may remove the over-under from the list of possible over-unders. The risk assessment engine will operate on single events (projected teams or athletes or other events) or more complex or conditional outcomes. It should be understood by one of ordinary skill in the art that other analytical tools may be used for assessing risk and making determinations about which risk units to eliminate from presentation. For example, one may not wish to include two match-ups having players in the same game. Additionally, it should be recognized that the risk assessment engine 162 continues to operate during the playing of the sports games or other events and can cause the risk units displayed between end-users to change. The risk assessment engine may allow for an operator to respond to the identification of a risk and to take action based on that risk by instructing the activity server 150 to change the predetermined risk units as stored in data source 165. Risk can be identified based upon information, such as a report about an athlete, an injury report, information posted on a news or blog website. The risk assessment engine may include a web-monitoring tool for each player that is part of a risk unit, such that information about the player is collected and represented to an operator. Additionally, the risk assessment engine may be regularly updated based upon award entries. For example, the risk assessment engine may provide a listing of the 10 highest matchups with the greatest risk. The risk could be based simply on an imbalance in sales or on a more complex formula. Additionally, the risk assessment engine 162 may monitor all of the selections by users and identify if there are imbalances based upon groups of matchups, toggles, and over-unders that show an imbalance in the selected risk units. The risk assessment engine includes a graphical user interface that displays the risk units with the greatest risk and reports on developing news about players where imbalances in selections are occurring. For example, the 30 highest matchups that have the greatest risk may be presented and a news ticker of information about the players in the matchups may be included from either a general web search or by monitoring specific websites (sports-related websites, e.g. ESPN, NBA, MLB etc. or fantasy sports-related websites) for the names of the players in the matchups. Thus, the risk assessment engine allows for monitoring of risk in real-time.

In embodiments of the invention, the risk assessment engine can be automated based upon threshold values to remove matchups, toggles, or over-unders. For example, there may be a monetary threshold for a matchup that causes the matchup to be removed, such as, a statistical differential in award entries or wagers on one player or team or if more than 80% of the wagers are on one potential event outcome.

The risk assessment engine 162 passes the risk units to the selection engine 159. The selection engine 159 may then further eliminate some of the risk units. For example, matchups or over-unders that include a participant from a favored team of the user may be preferred. Similarly, matchups or over-unders that include participants from a team that the user does not like may be given a lower priority. Other factors may be used by the selection engine 159 in determining the risk units to present as discussed above. The process of determining which risk units should be presented at a higher or lower rate may develop a pruned list of risk units.

The game engine 158 then sends the pruned or unpruned list of risk units from the selection engine 159 along with images of the risk unit participants, statistics of the participants and other data needed by the application game 153 for providing the intended visual and game experience to the user on the presentation device 151 through a secure network connection 154. For an array game, in some embodiments, the application game 153 may present an array of position units (e.g. "squares") for the application game 153 for the user to associate each square with one of the pruned matchups or over-unders. In other embodiments, the game engine 158 uses a random or algorithmic method for selection of the advanced choice games for the entries of the array. In some embodiments, the platform also uses a random or algorithmic method for determining the placement of the selected risk units into the entries of the array. In some embodiments, the platform also uses a random or algorithmic method for determining the placement of the selected risk units into the entries of a ranking array. In some embodiments the platform uses a random number generator to assign numbers to potential winners, and to provide winning numbers to match in event bingo games. The activity server system 150 may also have an engine which provides chances of a reward winning pattern occurring depending on the set of reward winning patterns. Dependent on the chances of each reward winning pattern occurring, a set of fixed odds payouts for each reward winning pattern may be determined. In some embodiments the fixed odds payout may depend on the potential winners selected. The fixed odds payouts may be determined such that the chance of a non-negative return are unlikely. Promotional payouts may also be determined such that the chance of a non-negative return are more likely than in other embodiments. The engine calculating the chances of a reward winning pattern occurring may take into account the chance of a user or computer selecting a winning selection in each risk unit. While this may typically be 50% where there are 2 potential winners, the activity server may be able determine fixed odds for non-negative return when the risk units do not present 50/50 chances.

In one embodiment the platform 152 and the application 153 are client programs that run locally on the presentation device of the user. The various components of the activity server system can communicate with one another through an Application Programming Interface (API) 170. The API 170 allows for the communication of the game information between the application 153 and the gaming engine 158. Additionally, the API 170 can be used for supplying both tools such as the matchup & over-under tool and the risk assessment engine to a presentation device of the operator 164 in the form a client programs 172, so that the operator may remotely monitor and make changes to the game without the need to be directly connected to the activity server system 150. The application game 153 receives this data and incorporates the data into one or more templates for presentation on the display associated with the presentation device 151. Communication continues between the game engine 158 and the application game 153 until the end of the session.

The user's selection is saved and stored in a database 157 associated with the user's account. The game engine 158 includes a settlement engine 171 that also determines whether the user has selected one or more winning participants, whether the winning participants are in a row of the tic-tac-toe board, whether winning participants are in a row of a ranking array (and correctly ranked), and whether random number assigned to a user's selection matches an independently chosen random number in event bingo. The game engine 158 informs the application game 153 whether the user has won the game based upon the game rules. The settlement engine 171 is also configured to provide payment to a winning user and may interact with the user's account information data store 157 to determine where any winnings should be transferred (e.g., a banking account, such as a checking account or other account such as PayPal account).

The activity server system 150 may also include a virtual machine to generate diagrams and descriptions for presentation to the user on the presentation device 151. The activity server system 150 may also include an integrity tool. If the individual athlete is not performing as expected, the integrity tool predicts and measures continuously the market and performance expectations of the participants of the advanced choice games.

Figure 3:
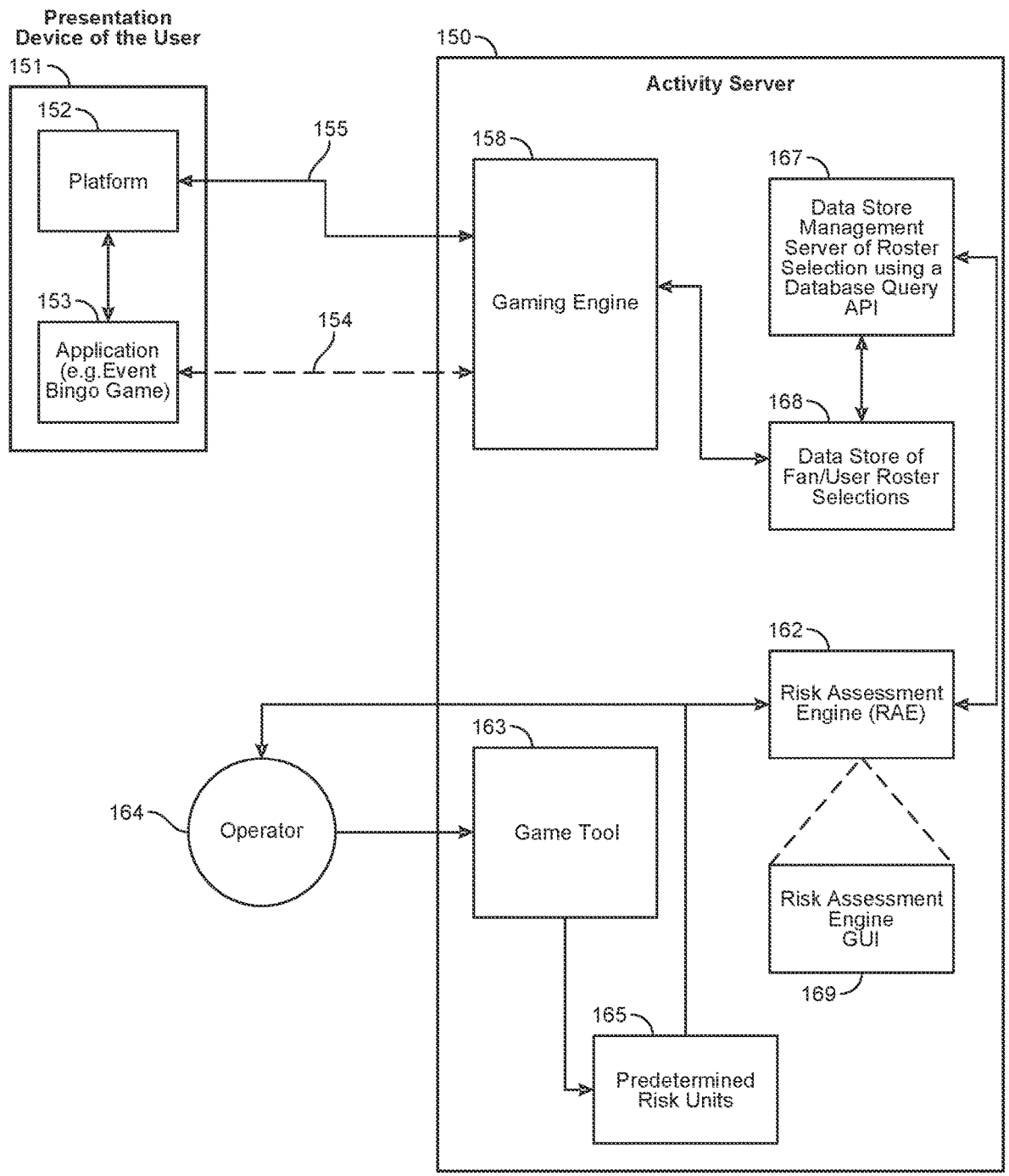
FIG. 3 is a block diagram of the platform of FIG. 2, further configured with a risk engine user interface 169 and roster listing data store 167, in accordance with an embodiment of the present invention.

FIG. 3 is a block diagram of the platform of FIG. 2, further configured with a risk engine user interface 169 and roster listing data store 167, in accordance with an embodiment of the present invention. The risk assessment engine 162 include a graphical user interface 169 to allow an operator to view a listing of correlated roster payouts (wherein a roster is the selection by a user of a pre-defined number of matchups or toggles and selected winners for those matchups/toggles or a pre-defined number of over-unders and selected over or under predictions for the presented score), or a pre-defined number of a mix thereof, and roster counts ordered by potential payout amount to determine the riskiest combinations, which would be presented at the top of a listing in the graphical user interface. As indicated above, the risk assessment engine GUI 169 may be local to the risk assessment engine 162 or a client application may be available to an operator such that the GUI 169 is presented remotely on the presentation device of the operator and the operator can remotely monitor the game and any risk determined by the risk assessment engine 162. The risk assessment engine 162 may include a set of predefined thresholds or the operator may set a threshold value for each number of picks of potential payout maximums and roster count maximums. In one embodiment of the invention, the risk assessment engine is configured to highlight and present selection groups above a threshold in the graphical user interface with some indicia, such as highlighting the selection group in red. The risk assessment engine may also generate alerts, which can be auditory or may generate an e-mail notification to one or more operators. Depending upon the configuration by the operator, the risk assessment engine may automatically close individual matchups when a threshold level has been met without requiring authorization from an operator. The thresholds may be determined at the discretion of the operator but will be based at least in part on an expected number of users submitting rosters along with historical information concerning payouts.

As shown in FIG. 3, the roster selections by user playing the fantasy game or team-based game (user roster data) are sent from the presentation device of the user through the network connection 154 between the application 153 and the gaming engine 158. The data received by the gaming engine will include the ID number for the user, a description of the selected roster including the number of picks, whether the picks include a hedge, and an array of selections for each risk unit within the roster. Thus, the array will include a pointer to the selected athlete in each matchup selected by the user. Additionally, other parameters may be communicated when the roster selections are transmitted by the application 152 running on the presentation device of the user 151, including the location of the presentation device. On a periodic basis or at the request of an operator, the risk assessment engine queries the data store management server 167 using a database query API to query the data store of user roster selections. The database of the data store 168 contains all of the currently active user roster selections for all of the users playing the fantasy game. The API query will produce a report to the risk assessment engine. For example, the database query may produce a report that indicates the N-riskiest selections in terms of overall possible payout disparity for matchups or over-unders. Other database searches may be used to provide information concerning risk to the risk assessment engine. The risk assessment engine will receive the results of the database query in the form of a report, such as a data file in a predefined format in conformity with the database API. The risk assessment engine parses the report and compares the entries within the report to a threshold value that has either been preset or set by an operator. For example, the threshold could be based on a percentages of disparity, such as 40% of the users betting on one athlete or team, or the threshold could be in the disparity of the total amount bet, such that a payout that included a matchup may exceed $500,000. Again, other thresholds can be established based upon the risk without deviating from the intended scope of the invention. It should be recognized by one or ordinary skill in the art that the data-base and data management server may operate as part of the activity server system or may be outside of the activity server system. Additionally, the data store management server may periodically push the results of a pre-set number of database queries to the risk assessment engine within the risk assessment engine needing to query the data store management server 167.

In one embodiment of the invention, risk units may be presented on a customized basis to fans. Customization of risk units occurs in the suggestion engine 159 that takes into account the user's account information and profile data stored in a datastore 157. For example, while a plurality of users may be presented with the same card or set of matchups, set of over-unders, or mixed set of matchups and over-unders, the order of how such is presented may be customized. As one example, the first presented matchup may be selected based upon the location of the user or based upon a fan's profile. If the matchups include a matchup involving Drew Brees, fans who are located in Louisiana or identify themselves as New Orleans Saints fans may be presented with a set of matchups where the first matchup is the matchup involving Drew Brees. Thus, the order or configuration of the matchups, over-unders, or mix may vary based upon geographic region, time of year, rankings of players or teams, user's input or profile data or other criteria. In addition, the graphical presentation of the matchups and over-unders may be changed based upon such criteria.

Figures 31A, 31B, 31C:
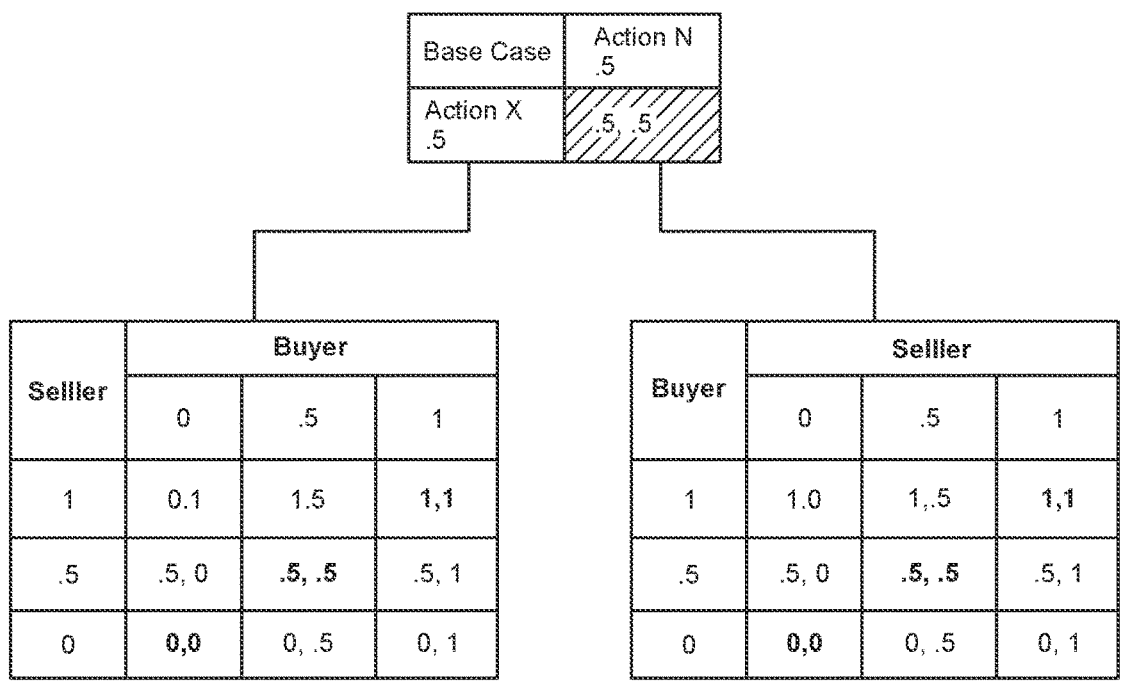
FIGS. 31A-C embody how the platform bases odds off of a prisoner's dilemma problem.

FIGS. 31A-C are block diagrams showing the determination of risk used to assign fixed odds payout to matchups and over-unders, in accordance with an embodiment of the present invention.

The challenge for crafting game products from joint and several events is embedded in the idea of a game itself. One category of game that is generally understood is Oskar Morgenstern and John von Neumann's explication of the Prisoner's Dilemma, wherein the games of cooperation, incomplete information, and optimization are characterized by the set of possible outcomes.

In the prisoner's dilemma the game is assumed to have positive and negative potential outcomes, with the simple version concerning two participants each participant having a potential outcome that may be positive or negative. Each participant experiences an outcome which is based, at least in part, on the performance of the other participant. If both participants exhibit behavior in which each participant cooperates with the other participant they may experience a positive outcome. Similarly, if both participants exhibit behavior in which neither cooperates with the other, one may receive a positive outcome while the other may receive a negative outcome. More generally, in this context the individual participants always have an incentive to choose in a way which creates less than optimal outcome for the participants as a group. The game is assumed to be one cooperation to evade a negative outcome—if both participants behave optimally both are successful, if neither cooperates both realize negative outcomes, and two possibilities for partial results of partial cooperation.

A uniformity of outcomes to either both mutually negative or both mutually positive represent the participants' weighting of their information and the result of the mutual actions. One can treat these as equivalent to market instructions, with a mutual negative decision around a sell game as resulting in a sell decision, and a mutual decision around a buy game resulting in a buy decision.

In the event of machine learning there exist two categories, supervised and unsupervised learning. Supervised learning uses decision trees, naïve Bayesian classification, ordinary least squares regression, logistic regress, support vector machines, and ensemble methods amongst others.

Unsupervised learning uses clustering algorithms (such as Eigen vectors), principle component analysis, singular value decomposition, and other tools and methodologies. Both are producing signals that produce expected values where the ratio of "true" to "false" is better than random, i.e. has a ratio that is better than the coin toss of 50% probability. While adjusted probability is typically the result of what is called a Bayesian Nash equilibrium, which is not the only form of game production. The expected value can be also represented as a state of the data that may also form the expectation of probabilistic outcome.

In such a circumstance the above Prisoners Dilemma becomes a set of high confidence intervals of 0.5 (50%) probabilities and can be represented as an array set for each characteristic or information signal that produces the expected result. As such the reading or a game theory around an event has advanced to a set of statements around the data itself rather than the expected value of cooperation. In such a set, the instructions for the probability are around the "memory" of the game, i.e. its data being available to calculate, and the calculation instructions themselves.

As shown in FIGS. 31A and 31B, partial payouts on both buy and sell games are calculated by the platform. Three states of informational results exist in a machine learning game: a buy decision, a sell decision, both starting from a base decision. As such any game therefore be set as being the result of an array set of 0.5 probability sets (shown in FIG. 31B) as the game in digital format depends on the player deciding whether they agree with the base case.

As shown in FIG. 31C, a game can now be created from any array which the game is executed whereby the probability of outcome is a machine learning based expectation of an equivalent result whereby the game contestant identifies an expectation where they believe the game maker is incorrect in producing a game of (ANX), for any array set. Thus, the general game is for any and all variation on a game wherein A and X may be of any value of 1 or more, and where A may or may not be equal to X. The commercial value of the game is the ability to predict the required number of contestants for any array at a payout that may be both for single or multiple outcomes and which also produces a risk statement of how stable much the prediction of 0.5 be to maintain the stability of the expected reward.

This relationship can be described as being the organization of "tuples" various arrangements of X, N in an array such that a central limit theorem relating the expected payout to the contestant can be calculated based on the number of contestants to produce a fixed payout knowable for a statistical level of risk and ordered by a central limit theorem. Such a set involves the conditional performance of the contestant in correctly ascertaining the performance of a real word athlete or athletes or other efforts resulting in a final performance at a measurement of the least means squared adjusted or some other measurement of risk adjusted expected performance. Such a measurement may be in the single incident of an athlete, team, or a real-world event. Such an event may be on a continuous polling basis, or in the form of a final polling outcome, i.e. a vote.

Moreover, the form of the X, N can also be conditional in series, such that the array can be arrangements of X, N in series as reflected by [ ]. Such a three-dimensional game also offers the same underlying games, whereby a computer recursively and heuristically solves for a set of arrays which may also be considered as a machine learning based game for enthusiasts seeking to have a 2×2×2 game or a 3×3×3 game, or a 1×2×3 game. Indeed a the computer process is such that a 1×10 game is defined as being a N1×X10× {0}game—the instance of a the second array is defined as being a null set {0} or Ø game rather than not existing at all.

In all circumstance, the fixed reward for correctly defining the array outcome of N, X can be defined by the necessary levels of customer participation for the reward payout be at an expected level. Rather than the game maker making money from the differential between two reward outcomes based upon the buyer vs. the seller of the reward, the reward payout can be defined as fixed for a previously defined level of customer activity. The revenue model exists in the discount to the reward payout at a discount to the theoretical value of the reward given the predicted required levels of customer activity. Moreover the rewards can themselves be fixed on a progressive basis. Thus while one embodiment may require a 6 out of 6 selection to obtain a reward, fixed odds payouts can be defined for the given levels of player activity for 4 out of 6, 5 out of 6, and 6 out of 6 correct selections.

Various Embodiments of the present invention are implemented at a matchup game having a fixed odds payout. However, not all embodiments of the present invention are limited to such a matchup game. An over-under of an athlete offers similar array presentations for fixed odds payout based on actual performance. An over-under on a set of athletes or teams in a row across (1) and ×(1 or more) down a column. In this embodiment, the computational system offers fixed odds payout with a single calculable value of all risks and expected outcomes for customer activity on the platform. Other games in embodiments of the present invention (e.g., parlay matchups, tic-tac-toe, ranking array, etc.) can be calculated based on a game algorithm, which is defined as a process or set of rules to be followed in calculations or other problem-solving operations. The rules can be particularly followed by a computational system that defines risk, reward and a further algorithm based on probabilities of liquidity expressed at each transaction for either cash or other reward format (possibly for token, loyalty program, merchandise, or liquidity rebate) that prove to have statistical value on the calculation of reward, risk and liquidity, i.e. customer activity.

The game algorithm exists as a separate mathematical formulation that has been deployed throughout the entire gaming platform. As a result new games are in continuous development based on the premise of the value of fixed odds payout in either matchup or over-under presentment but with single or instances or other formats. For example, when building ranking games, in some embodiments the platform develops ranking games build on top of event choice games, and in other embodiments the platform builds ranking games separately from event choice games.

In embodiments, rewards are available in two forms and can be continuously produced: (1) fixed odds payout with a single reward outcome; and (2) fixed odds payout with multiple reward outcomes.

The platform is data driven, which allows rewards to continuously deploy additional fixed odds payout at the player level for either athletes or teams in each of the games produced above. Moreover, the prizing or rewards can occur in the time interval both prior to the game and during the game itself.

The centralizing computational theory of the platform additionally allows multiple application programming interfaces to automatically generate similar games but across multiple events. Any sporting or athletic contest (defined as professional or amateur league or association) can be turned into game inventory. This further included racing formats such as auto or horse racing wherein the jockey and or the trainer are offered as athletes. Last, it includes awards or other reality shows, such as the Oscar, the Tony, the Grammy, the Emmy, the Country Music Awards, or game shows, all of which can be rendered to this game presentment of continuous fixed odds payout.

In sports gaming, three methods may be used to achieve a monetary benefit. First, a margin-based method takes a fee and manages a spread (margin) between buyer's price and seller's price. This method is based on game theory, and sometimes called a double-blind auction. The market-maker, through the platform, manages the prices of a seller's auction that is higher in price than in a buyer's auction. This premise of auction behavior is an essential part of game theory and includes use cases such as Bayesian Nash price equilibrium. One risk is that to produce liquidity and attract larger wagers, the market-maker may need to act as principal in order to serially locate an offsetting buy or sell order.

Second, a volume-based method takes a percentage of the total volume bet, with losers paying the winners on a pro rata basis from the pool of price entries. This method is called a pari-mutuel or rake system—no risk to the manager, but a high number of games at various price points for wagering means the business is highly dependent on marketing spend. Further, the data used by the method cannot be centralized, virtually assuring a direct-to-consumer model and low scalability. This model has been the backbone of horse-racing, poker, and daily fantasy sports.

Third, a margin-and-volume based method offers a fixed odds payout, with a fixed reward that is at the midpoint of predicted sellers and buyers price, but at a discount from the theoretical value expected for the payout on that midpoint for an expected number of players. Such a method is improved and used by the platform in embodiments of the present invention to determine the fixed odds payouts for the advanced choice games. This method uses machine-learning tailored to game theory. Rather than relying on the typical game theory treatment of probability, in this method, embodiments of the present invention reformulate the game theory to states of data as digital signals around the data with reward, risk, and liquidity all having a common centralized limit. Accordingly, for every level of reward and risk, this method calculates the value of that trade-off based on the value of the number of players of the games on a random basis producing a more efficient price. As every player gets the same odds, there is no need to add fractionated pools of liquidity to assure effective marketing. As the games are predictive to the midpoint, there is no need for the market-maker to accept principal risk to assure price. As primary risks of marketing and balance sheet exposure can be controlled, there is no marginal friction between margin and volume in working capital turns, i.e. no marginal OpEx or CapEx necessary to grow the business. In embodiments, the platform relies on the discount to the fair value of the model to determine the fixed odds payout.

Further, when teams are matched to payouts based on handicapped spreads, e.g., Team A at plus X points, the actual bet is on a portfolio of athletes. Fixed odds payouts of embodiments of the present invention are the foundational math for producing a sports book based on teams or other events—but using a more efficient pricing model.

Figure 28:
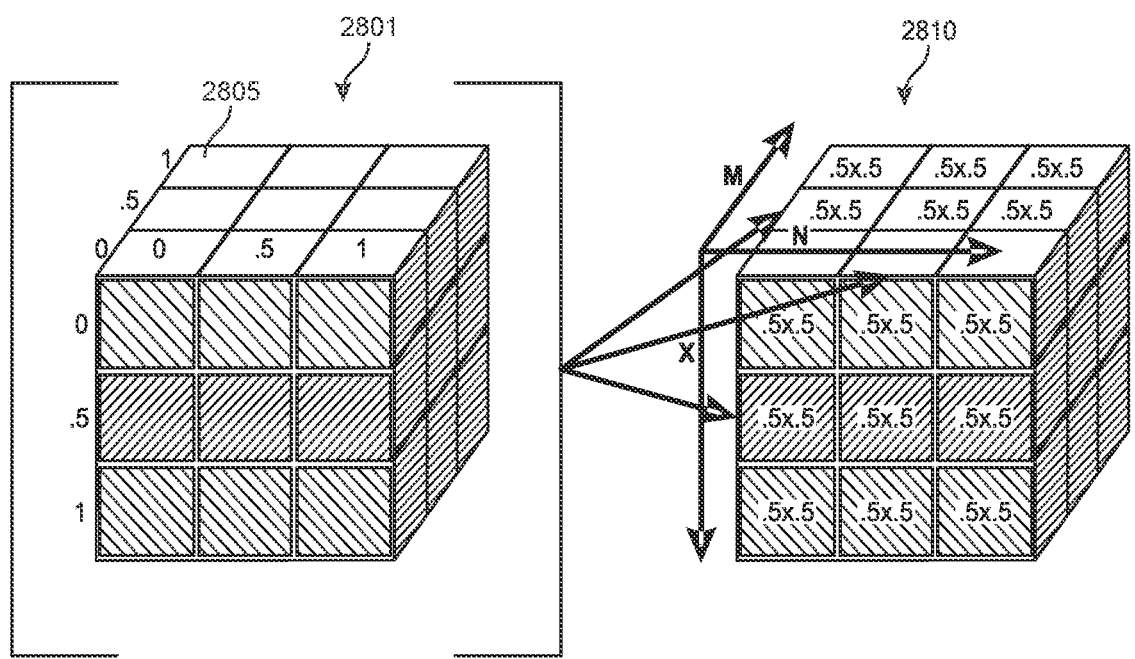
FIG. 28 shows how the platform might represent a number of games in a three-dimensional space before reducing.

In some embodiments of the invention, the platform starts a game by creating a 3D advanced choice game as shown in FIG. 28. In on embodiment the 3D advanced choice game has 27 risk units 2805 in a cube 2801. In this embodiment each risk unit is a 3D block, and not the 2D surface of such block. However, in some embodiments each risk unit is the surface of a block. The cube 2801 has possible outcomes marked as 0, 0.5, and 1. The platform then determines, for a given game probability of 50%/50%, a reward for a winning pattern and a level of volume necessary for the theoretical value reward to be equal to the input as shown in cube 2810. In some embodiments the platform determines whether each risk unit in a game has a unique 50/50 chance. If one risk unit is the over-under on a player of team A and another risk unit is the over-under of the entire team A, the two may be linked such that the chance of success of picking over on both is higher than the 25% chance of picking two true 50/50s. In such a case, the two risk units would not each have a unique 50/50 chance. The platform would then adjust the risk units in a game to ensure the risk units are all true 50/50s. Alternatively, the platform may adjust the prizes to account for the adjusted chances of success due to non-unique risk units.

In some embodiments of the invention, a game can have more than two outcomes while still providing what we call here a 50% game probability. Consider, for example, a game having four potential outcomes. Ideally, the probability of each outcome would be 25%, but the ideal situation does not always prevail. With a game having four potential outcomes, the platform determines a margin of error associated with such platform's estimation of a 25% probability for any given outcome. For such game to have a 50/50 game probability, the margin for error, of the platform's estimation of each outcome's success, must straddle 25% equally in each direction. In some embodiments the game probability is not 50/50, and thus the platform calculates the rewards based on the percentage chance each potential winner will be an actual winner. In one embodiment the platform would base the fixed odds payout after the potential winner is selected. In another embodiment the platform would base the fixed odds payout on the outcome having highest chance of being the winning outcome. For any game and number of potential winners, the platform can calculate the probability of any number of given outcomes to determine the likelihood of a winning pattern being selected. From these likelihoods the platform further calculates the accompanying fixed odds rewards. By adjusting the fixed odds rewards and chances of winning (e.g. by changing the winning pattern) the platform can determine a projected payout percentage. In different embodiments the projected payout percentage is associated with a level of volume of sales of the game, sometimes referred to as liquidity.

To aid in the game operator's generating a profit from sales of the game, it is advantageous to find a balance which allows the game to payout a specific amount of rewards that both delivers profit and keeps user interest. For example, a game that paid out 70% of entrance fees would, in theory, be bought less by users than a game which paid out 98% of the entrance fees. However, the game offering 98% would need to sell 15 times more tickets to average a greater profit. The platform can derive a fixed odds payout that maximizes profits by varying the percentage payout of fees expected to be paid as fixed odds rewards.

Further, the operator may wish to limit the chances of a non-negative return. For any game based on chance, there is a chance that the odds will fall out of the operator's favor and more money will be paid out than taken in. There are two significant factors in reducing the chances of a non-negative return. First, the percentage payout, and second, the volume of sales. Since a higher volume of sales decreases the chance of a non-negative return, it allows the operator to offer higher percentage payouts, which increases user participation.

The platform does not have full control over the volume of sales, and thus uses volume of sales data to appropriately adjust the percentage payout to maximize profit for the game. In some embodiments, the platform collects user data and increases payouts to specific users based on their likelihood of winning, past participation, or other data features. The platform may also adjust the payouts universally.

Figure 14:
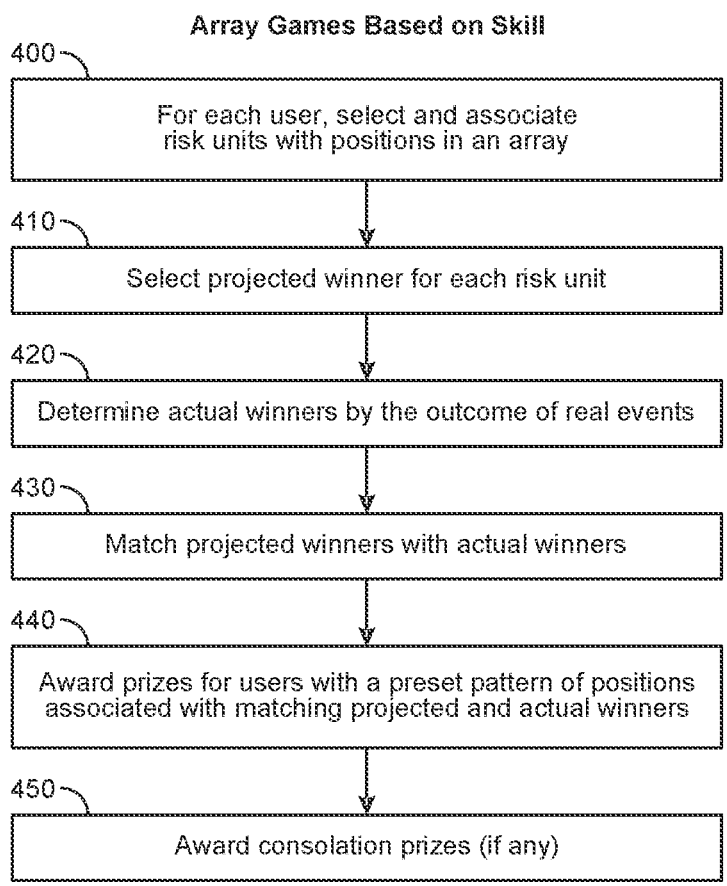
FIG. 14 summarizes array-based games of skill according to embodiments of the instant invention.
Figure 29:
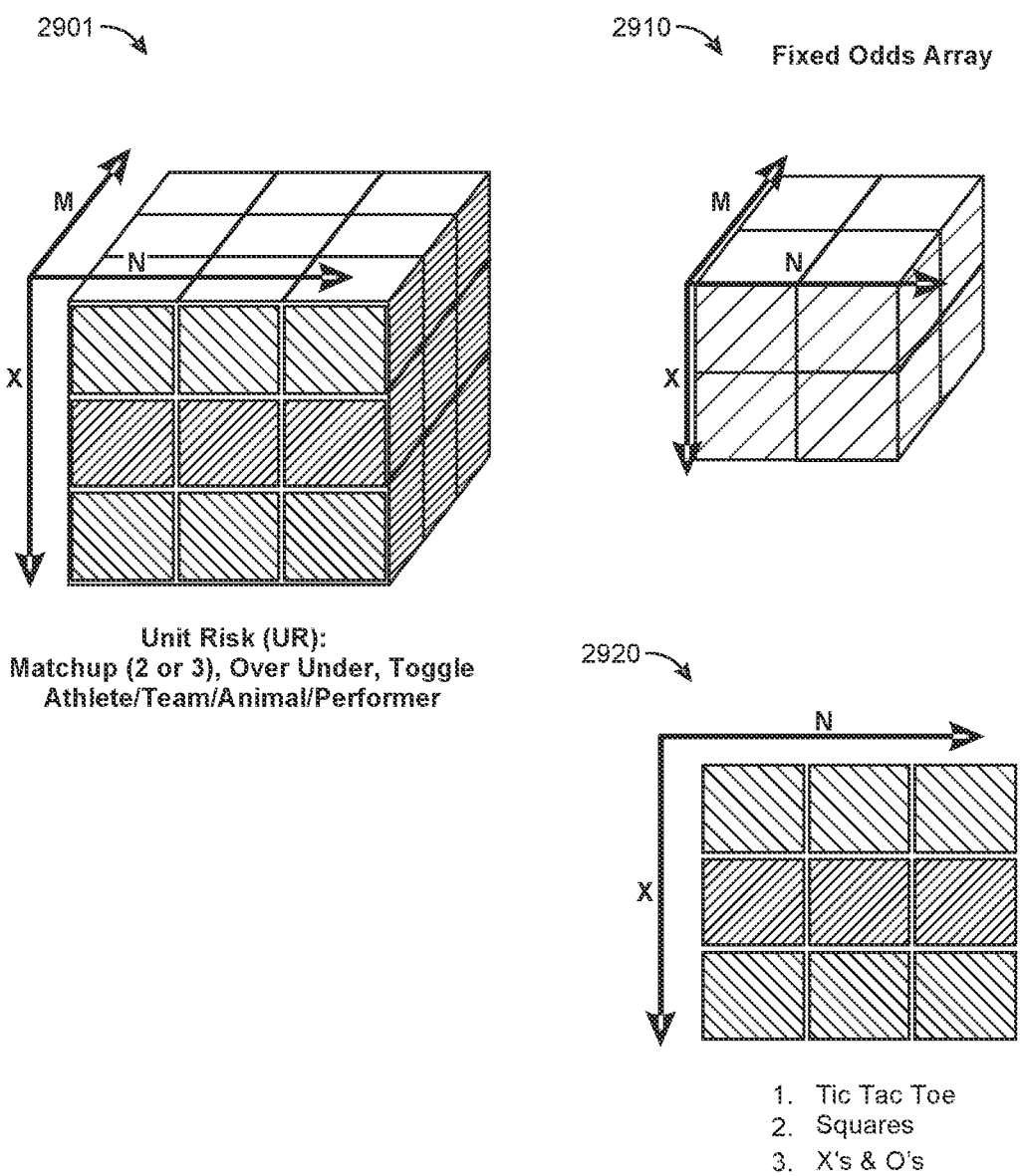
FIG. 29 embodies the platform in 3D and 2D array games.

FIG. 29 shows how the platform may derive the 3×3×3 cube game 2901 into a 2×2×2 cube game 2910 or a 3×3 array 2920. The platform simplifies the original game 2901 into the derivative forms 2910, 2920 which may be less complicated to pay and understand how to win. These games may be further characterized based on the winning patterns selected by the platform. For example, 3×3 array 2920 may be broken down into Tic-Tac-Toe, Squares, and X's and O's. The games 2901, 2910, and 2920 may be further characterized as games of skill, class II games, or games of chance. A game of skill allows the customer to select a projected winner from the risk units (as outlined in steps 400, 410, 420, 430, 440, and 450 of FIG. 14). The class II games provide a bingo element to the games. In these games of chance, the computer generates the projected winner selections. The selections may be of a matchup (2 or 3), Over-Under, and toggle. The platform calculates the payouts for each game and each winning pattern within the game.

FIG. 33 shows how the platform may take different odds for two potential winners A and B. Potential winners A and B may have the same or different odds, and the platform determines the odds depending on whether the odds are: fixed, fixed progressive, dynamic fixed, and dynamic fixed progressive. In some embodiments the platform may calculate the odds for events having more than 2 outcomes. In embodiments where the odds for A and B vary the platform may calculate different prizes dependent on the potential winners selected by the user.

FIGS. 30A-H shows array and ranking games for which the platform can identify chance of success and fixed-odds payouts. In game 3010, shown in FIG. 30A, each row is a risk unit allowing selections of potential winners A, B, C. In some embodiments of game 3010, certain risk units may have different amounts of potential winners than others. For example the number of potential winners may include one, two, and three. Game 3010 then requires the projected winners to be ranked. The customer or the computer may rank the selections. The platform can decide different fixed-odds payouts based on the chance of success. The ranking may be based on a specific fantasy score, and determining a first rank would be done by determining which participant exceeded the spread by the highest margin.

Figures 30A, 30B, 30C, 30D:
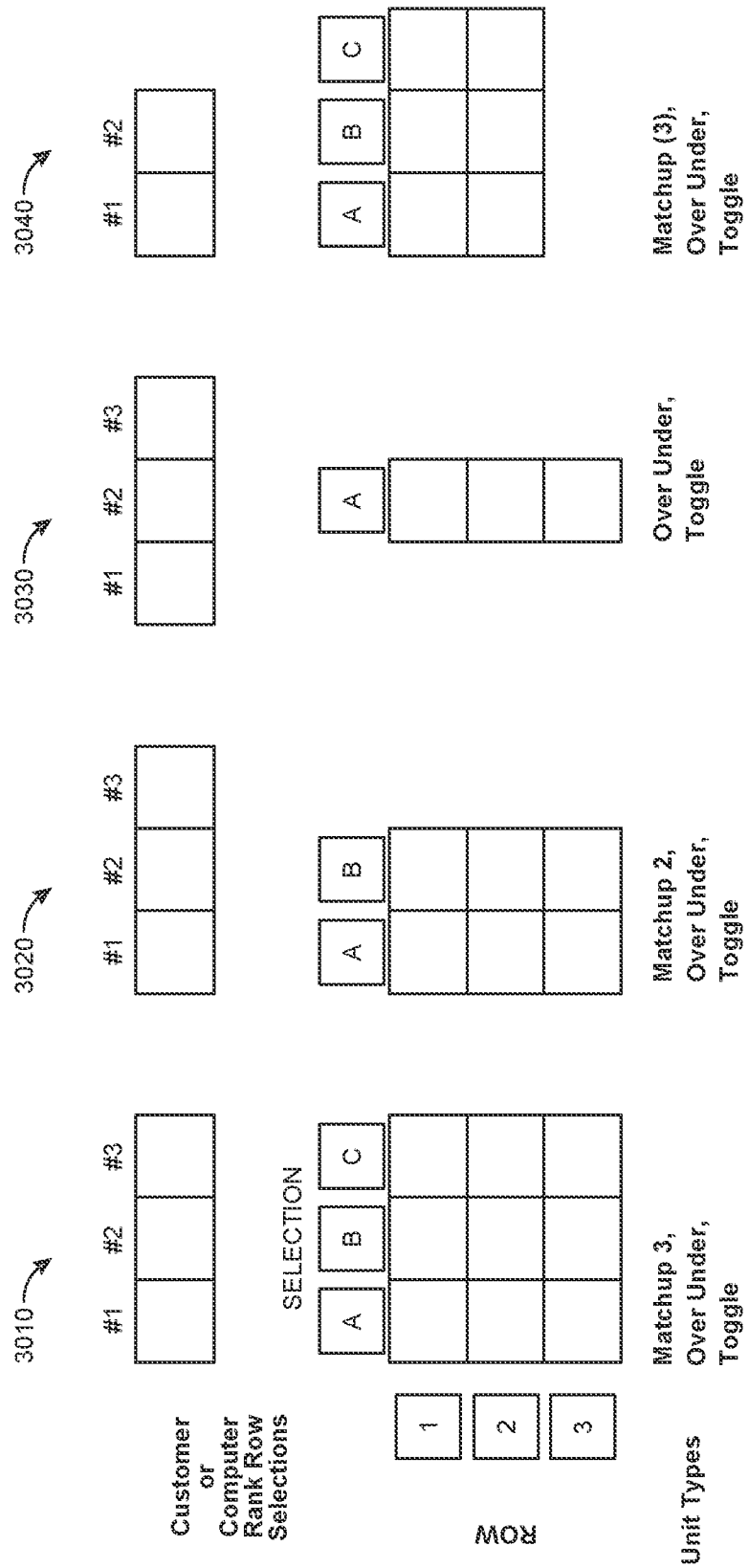

FIG. 30B shows game 3020 which is an embodiment where each risk unit comprises two potential winners. The potential winners are then ranked by the user or by the computer. FIG. 30C shows game 3030 wherein the projected winners are already selected for the user. In this embodiment, the game allows for the whole risk unit to be selected and the actual winners are ranked. FIG. 30D shows game 3040 wherein two risk units each have three potential winners. Since there are two risk units, there are only two spots to rank. FIG. 30E shows game 3050, wherein each of the two risk units have two potential winners. Some embodiments may include a combination of games 3040 and 3050 such that one risk unit has two potential winners and another risk unit has three potential winners.

FIGS. 30F-H show games 3060, 3070, and 3080 which are embodiments of a game having one risk unit. The single risk unit may have varying amounts of potential winners. In each game the platform may determine a chance of success of each risk unit and a chance of success at correctly ranking each risk unit. The chance of success may be converted into a fixed-odds payout for one or more reward winning patterns. Since each game can be calculated on its own, either derived from a previous game or done in separate calculation, the platform may determine a volume of sales based on the plurality of games. The platform may then determine a fixed odds payout based on the sale of a plurality of games and not on each single game.

Skill-Based Games

Embodiments of the present invention include methods and systems for presenting pure skill-based array games to users.

Figure 4:
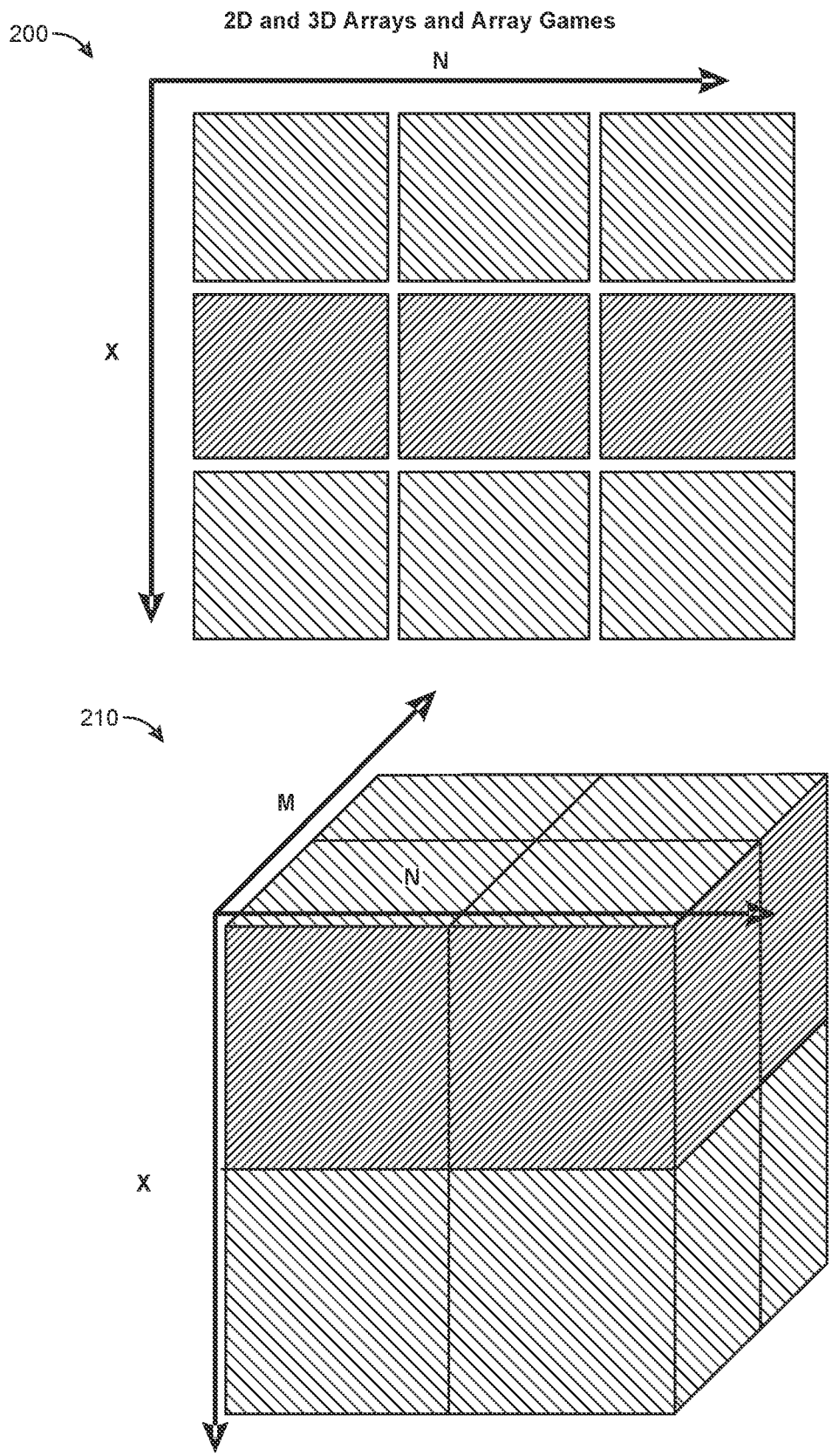
FIG. 4 shows an overview of some array-based games manageable by the platform disclosed in the instant invention, which can be embodied as two-dimensional arrays or arrays of three-dimensional surfaces.

Multiple types of event bingo games can be constructed from arrays. In preferred embodiments, computer processes generate an array from a risk inventory of matchup, over-under, and toggle risk units. As embodied in FIG. 4, event bingo games can be constructed from two dimensional arrays 200 as well as three-dimensional arrays 210 and array-based games.

Some embodiments generate a set of matchups, such that each matchup pairs a first activity participant against a second activity participant. The matchups may include one or more participants from selection by the user. In some embodiments, a set of matchups are presented to the user as game components, and the user selects from the set to form a game.

Some embodiments generate a set of toggles (A versus B or C), such that each matches a first activity participant to multiple second activity participants. In some embodiments, a set of toggles are presented to the user as game components, and the user selects from the set to form a game. For each selected toggle, the user then selects which of the second activity participants to pair against the first activity participant in the matchup.

Some embodiments of the present invention generate a set of "over-unders." Each over-under presents a score for an activity participant, together with the choice of whether the actual score of the activity participant will be over or under the presented score. In some embodiments, a set of over-unders are presented to the user as game components, who selects from the set to form a game. For each selected over-under, the user then selects whether the actual score will be over or under the presented score.

Some embodiments generate a set that includes a mixed set of matchups (e.g., matchups, toggles, and over-unders). The mixed set is presented to the user as game components, and the user selects from the set to form a game. For any toggles in the set, the user then selects which of the second activity participants to pair against the first activity participant in a matchup. For any over-unders in the set, the user then selects whether the actual score will be over or under the presented score.

Figure 15:
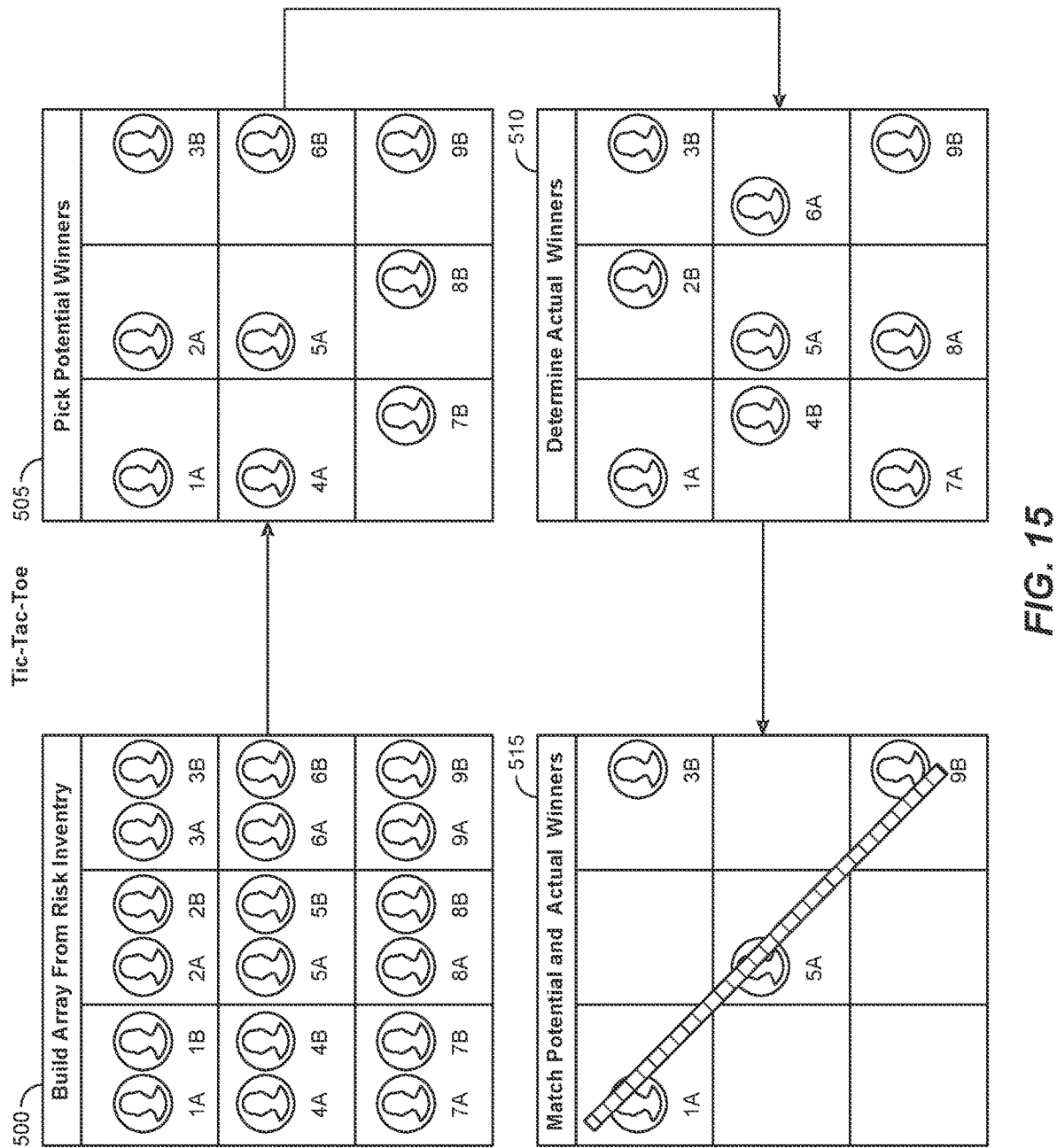
FIG. 15 embodies a skill-based game of tic-tac-toe according to embodiments of the instant invention.

Some embodiments present an array choice game as a set of matchups, a set of over-unders, a set of toggles, or a mixed set of risk units as a two-dimensional or three-dimensional array. In some embodiments, an array is presented to the user, who selects a risk unit of either a matchup, a toggle, or an over-under for each position (e.g. square) of the array. In other embodiments, the system presenting the array automatically selects a matchup, toggle, or over-under for each position of the array. For any position that has a matchup, the user selects a "projected winner" of the matchup. For any position that has a toggle, the user selects which of the second activity participants to pair against the first activity participant in a matchup, and further selects which activity participant will be a "projected winner" of the matchup. For any square that has an over-under, the user selects the "projected winner" as a choice between whether the actual score will be over or under the presented score. For embodiments of a skill-based array choice game, if a user has made a sufficient number of successful picks and the picks are arranged in a game-ending pattern (e.g. three in a row for tic-tac-toe) then the user wins a fixed odds-based prize (see tic-tac-toe boards 500, 505, 510, and 515 of FIG. 15).

In some embodiments, there may be more possible entries than the number of positions in the array. In such embodiments, the platform uses a random or algorithmic method for selection of the risk units for the entries in the positions. In some embodiments, the platform also uses a random or algorithmic method for determining the placement of the selected risk units into the positions.

Some embodiments present a set of matchups, a set of toggles, a set of over-unders, or a mixed set as a ranking array game (array choice-plus-ranking game). In these embodiments, the array is presented to the user, who selects a risk unit for each square in a row of the array. In other embodiments, the system presenting the array automatically selects a risk unit for each square in a row of the array. For any selected entry that is a toggle, the user selects which of the second activity participants to pair against the first activity participant in the toggle matchup. For any selected entry that is an over-under, the user selects whether the actual score will be over or under the presented score. The user then ranks each square in the row from 1 . . . N, indicating how the user expects the matchup or over-under associated with that square to perform with respect to the matchups or over-unders associated with each other square in the row, multiple rows, or the entire array. In some embodiments, the platform uses a random or algorithmic method for selection of the advanced choice games for the entries of ranking array. In some embodiments, the platform also uses a random or algorithmic method for determining the placement of the selected advanced choice games into the entries of the ranking array.

In some embodiments, risk units are selected prior to the activity participants participating in the corresponding event (e.g., playing in a professional sporting event or other events). The set of risk units and the corresponding participants is referred to as "user roster data".

In some embodiments, these skilled-based games may be created based on single team performance projections associated with their game components, such as matchups, over-unders, toggles of a selected advanced choice game, such that these games are created for individual teams by mathematically calculating the portfolio of participants based on single participant prediction and statistical optimization. In some embodiments, these games may also be created based on single participant performance projections by prediction and statistical optimization of the scores of such participant.

The outcomes of the matchups may be determined with reference to the first and second participants' actual performance in one or more actual sports events or other events according to a predetermined scoring criterion. In one embodiment, the first or second participant(s) with better statistics in predetermined, weighted, statistical categories (e.g., a better fantasy sports score) in the one or more actual sporting event(s) may be determined as the "winner" of each matchup. In various embodiments the fantasy score is related to an event choice, an event ranking, and an event choice and ranking. These fantasy score matchups may be developed as array-based games. In some embodiments, the winners of the matchups may be compared to the user's picks.

The outcome of the over-unders may be determined with reference to the participants' actual score in one or more actual sports events or other events. In one embodiment, the predetermined, weighted, statistical categories (e.g., a fantasy sports score) may be determined as the participants' actual score compared to the user's pick of over or under the score presented to the user.

In a straight matchup, toggle, over-under, or mixed game, if the user has made a sufficient number of winning picks, then the user may be declared to be a winner of the activity. In the tic-tac-toe game, if the user made winning picks that form a sufficient number of rows, columns, or diagonals, then the user may be declared a winner of the activity. In the ranked array game, if the user made a sufficient number of winning picks and/or rankings of the winning picks, then the user may be declared to be a winner of the activity.

Accordingly, embodiments require a fixed odds payout table and each user has an opportunity to win against the system. The fixed odd payout table indicates varying fixed odds payouts based on the number of matchups/over-unders selected, etc. This is in contrast to other games, such as pari-mutuel games, where users play against other users and payouts are based upon the amount of money that users associate with their selections. The payout may be based on a fantasy-based scoring which is "performance based scoring" and in the context of teams the scoring may include points scored as presented within these unique games and on the system that scores both participants and teams through a single risk management system.

When the user is a winner of a game, the user may be awarded a reward according to a fixed odds payout table, which may be predetermined fixed odds, dynamic fixed odds, fixed odds progressive, and dynamic fixed odds progressive. For dynamic fixed odds and dynamic fixed odds progressive payouts, the system may dynamically price the payouts using techniques selected from the group consisting of AI, machine learning and, other algorithmic data analysis of reward, risk, volume, and total risk, and combinations thereof. Each of these payout types is also captured and monitored by the risk assessment system.

In some embodiments, the user may win a fixed odds payout as a cash award or other fixed reward for correctly picking actual winners, or for correctly picking a predetermined number of actual winners (e.g., for getting close). The awards may vary depending on the number of actual winners selected. In another example, the user may win such a fixed odds payout for correctly picking actual winners that form a row, column, or diagonal in a tic-tac-toe board. The fixed odds payout may vary depending on the number of rows, columns, and diagonals formed by the actual winners selected. In a further example, the user may win such a fixed odds payout for correctly picking and ranking actual winners in a row of an array. The award may be progressive, such that winning all matchups in row wins a reward, and progressively higher rewards are given based on the number of those matchups are correctly ranked within the row.

The use of fixed odds payout games is a pronounced innovation over prior art because it reduces the complexity of multiple sports (or other events) and multiple teams and multiple athletes to single application of the game as a user interface across multiple clients. Accordingly, in these embodiments, events can be virtualized, i.e., turned into a game. In these embodiments, the consumer, perhaps the audience, a spectator, or a fan is presented with an objective expectation of rewards with a single set of rules for each game no matter what the athlete, team or sport. In the case that the fantasy sports examples used herein are used as aspects of the user interface, in these embodiments, the performance scoring of the particular event may be based on the reduction of the performance data to an application programming interface and then used to score the new games described herein. The fixed odds payout simplifies the performance expectations to concrete expectation of reward based on the calculations of the event result. Further, in some embodiments, the platform's production of a new class of games (further described herein) take all events and reduce them to a single expected prizing format and is able to evaluate the variable and fixed risks based on projected event scoring, discount to the theoretical value based on total entries and the basis risk of those entries. Such prizing format is completely unlike "Totes" or pari-mutuel where the odds of success depend on the actual vs advertised rewards. Creating a finality of the expectation at the time of reward entry radically, in these embodiments, changes the idea of the value of the event as a prizing tool for fan or audience engagement.

Figure 16:
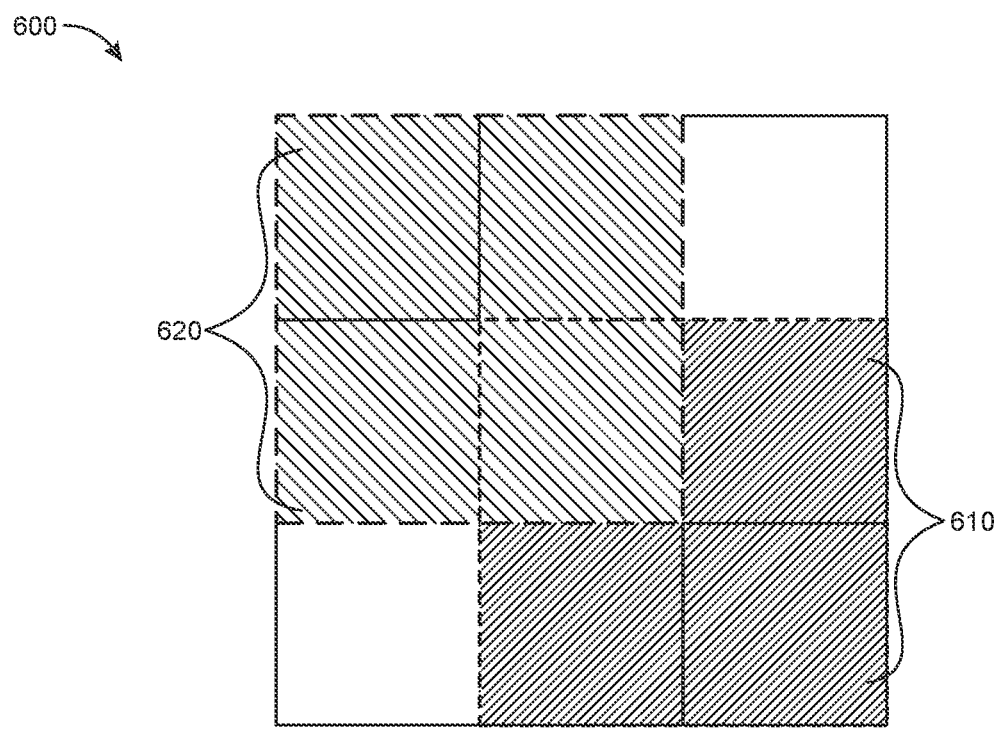
FIG. 16 provides an embodiment of a 3×3 squares game, for which a game-ending pattern is one of four possible 2×2 squares.

FIG. 27 shows a ranking array screen layout in accordance with an embodiment of the present invention. The user is presented with a set of three risk units, 1, 2, and 3, with potential "winners" 1A and 1B, 2A and 2B, and 3A and 3B, respectively. The user first makes a selection of "winners" and then ranks the choices based on the difference in the performance between the winning and losing choices. For example, if 1, 2, and 3 are matchups and the "winner" is based on winning score, then the winning ranking would rank the matchups from highest difference in fantasy point to lowest difference in fantasy points between the winning and losing scores. For the ranking game shown in FIG. 27, the user-selected winners are compared to the actual winners, and the actual ranking of winners based on the actual differences in the performance between winning and losing choices, as determined by actual events. Prizes are awarded based on correctly selecting and correctly ranking winners. "Squares" is an array choice game formed from a square array of N×M positions, each position being a 1×1 square associated with a risk unit. A winning pattern for this array occurs when winners are correctly selected corresponding to position in the N×M matrix that form an Y×Z square, where Y<N and Z<M. FIG. 16 provides a 2D embodiment of "squares," formed from a square array of 3×3 positions, for which the winning pattern occurs when any of four possible 2×2 squares are correctly associated with winners. In other embodiments, as discussed below, squares may be a 3D game. A first such square 610 is shown in light gray with a dotted line border in embodiment 600, and a second such square 620 is shown in dark gray with a dashed line border. The remaining potential winning 2×2 squares, at the upper right and lower left of the 3×3 square are not specifically illustrated. Because the central 1×1 square is required in order to form a 2×2 pattern, a consolation prize may be given for users that correctly select four or more positions that do not form a square.

Figure 17:
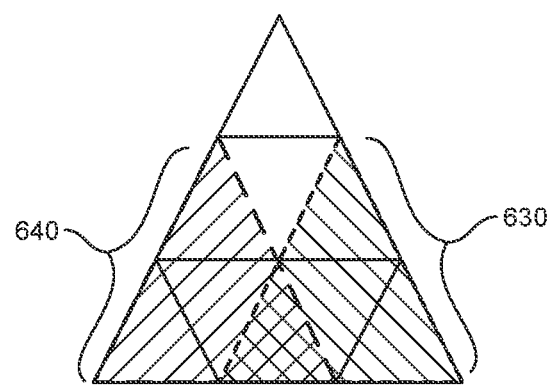
FIG. 17 embodies a 3×3 triangles game, for which a game-ending pattern is one of three possible 2×2 triangles.

Array games similar to "squares" can be formed with other geometric objects. FIG. 17 shows a "triangles" game formed with 2×2×2 equilateral triangles within a 3×3×3 equilateral triangle. In this case there are three possible game-winning 2×2×2 triangles, each formed by four 1×1×1 triangular positions. A first such 2×2×2 triangle 630 is shown in light gray with a dotted line border, and a second such 2×2×2 triangle 640 is shown in dark gray with a dashed line border. The remaining potential winning 2×2×2 triangle, at apex of the 3×3×3 triangle is not specifically illustrated.

Figure 18:
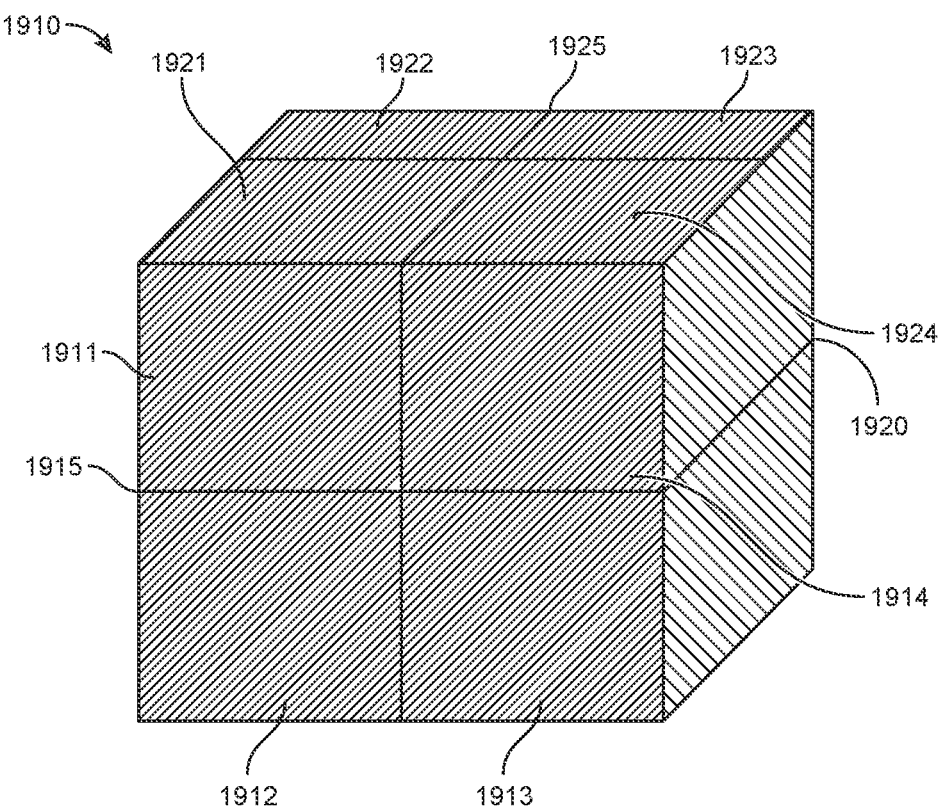
FIG. 18 embodies a three-dimensional array game with the array mapped to the surface of a cube.
Figure 19:
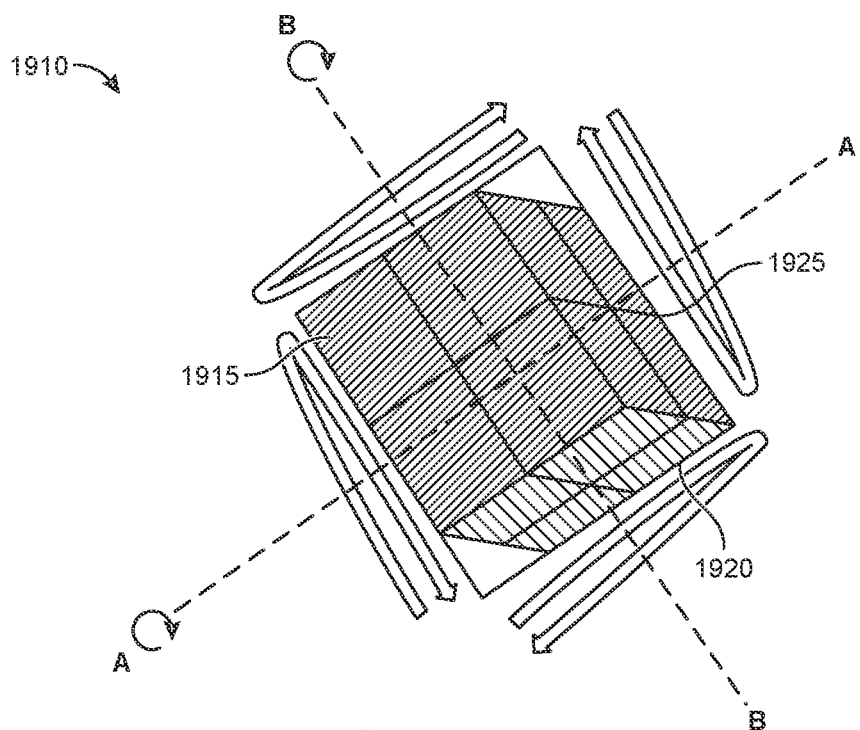
FIG. 19 shows how the three-dimensional array game of FIG. 18 can be rotated to display different positions on the surface of the cube.

Another family of array games arranges positions, represented as squares, triangles, or other two-dimensional geometric objects on the surface of a three-dimensional geometric object. In FIGS. 18 and 19 is shown an embodiment for which square positions form a three-dimensional array on the surface of a cube.

In some embodiments, the 3D cube game is presented to the user in a 2-dimensional (2D) display and, in other embodiments, the 3D cube game is presented to the user in a 3D display, such as in an augmented reality or a virtual reality environment. In embodiments, the game components may include choices of winning athletes, teams, or other choices of outcome in an event.

In the embodiment of FIG. 18, the game is configured through graphical interaction with a presented 3D cube 1910. The cube 1910 has six faces, including the faces 1915, 1920, 1925 shown in FIGS. 18-19. Each face is configured with a set of positions (shaped as squares), and each position is associated with a risk unit. For example, face 1915 has the four positions 1911, 1912, 1913, 1914, and face 1925 has the four positions 1921, 1922, 1923, 1924. As shown in FIG. 19, through the user interface game screen, the user can graphically interact with the 3D cube 1910, so as to rotate the 3D cube 1910 about the A and B axes to graphically display a set of the cube faces. In some embodiments, the user graphically chooses a subset of the displayed set of cube faces, thereby selecting the positions and associated risk units on the chosen subset of cube faces for use in playing the game. In some embodiments, the user selects individual positions on the display set of cube faces.

In the example of FIG. 19, the cube 1910 is rotated to graphically display three cube faces 1915, 1920, 1925, and the user graphically chooses, from among the three displayed faces, a group of two faces 1915, 1925. The 8 (2×2×2) positions 1911, 1912, 1913, 1914, 1921, 1922, 1923, 1924 on the chosen two faces 1915, 1925 are, thereby, selected for use in playing the game. In some embodiments, such selection of the positions is made prior to determination of fixed odds payout rewards. Each of these selected positions 1911, 1912, 1913, 1914, 1921, 1922, 1923, 1924 is configured with a risk unit of a matchup, toggle, or over-under, and a winning pick for that configured risk unit. In some embodiments, for each selected position, the user interface game screen is displayed with a set of matchups from which the user may select one of the matchups to assign to that position. In other embodiments, the platform uses a random or algorithmic method for selection of the risk unit for each position of the chosen cube faces 1915, 1925.

In some embodiments, the cube 1910 is made up of independently rotatable sections, in the manner of a Rubik's cube, it could also be shown as a 2×2×2 cube of 8 blocks, each block being a risk unit. This allows the user to organize positions and thus the risk units by virtually rotating one or more of the independently rotatable faces. This game too has fixed odds payouts and dynamic fixed odds payouts.

FIG. 32 shows an embodiment in which games of skill involve the ranking of two or more participants in combination. In this embodiment, each game has a reward specified as fixed odds, progressive fixed odds, variable fixed odds, and variable progressive fixed odds. In game I of FIG. 32 a ranking game of four players is shown in a 1×4 array. Game II depicts a sample selection of over-unders. Each over-under combines two of the 4 participants A, B, C, and D. A user may then select over or under for the set lines of each pair of participants. In this embodiment of four participants, there are six over-unders to choose from. In some embodiments the payouts are based on fixed odds for a certain number of correct selections. In one embodiment the user selects how many correct selections they will make, and get a fixed odds payout based on that number, granting higher payouts for more successful picks.

FIG. 32 game III shows a matchup of two participants versus another two participants. For 4 participants there are three matchups. In some embodiments each participant may be weighted differently in different matchups. In another embodiment each participant has a different criteria for achieving a certain fantasy score from matchup to matchup. Game IV is a ranking game based off of game III allowing each of the groups of participants to be ranked by how much they beat the other group by. In some embodiments the platform calculates the chances of each selection relating to each other (for example, if participant A has a very high fantasy score, it is likely that the groups having participant A will all win) and calculates the fixed odds payouts based on these relations.

In embodiments of games shown in FIG. 32, the fantasy scores of participants A, B, C, and D are based off of a qualification and a time. For example, a participant requires a certain amount of time of riding a bull to qualify for a score, and then the score is based off the time ridden above said qualifying time.

In an embodiment the game a number of contestants are entered and after a qualification event, a further over-under is selected. A reward winning pattern may be found for users who correctly select qualifying participants and make winning selections in the following over-under. In one embodiment of a rodeo-based game the wager selects three rider/bull pairs and an over-under on each pair. The over-under may be based on the rider's score or the combined rider and bull score. A user wins if they correctly select at least 2 riders who make their eight.

The user would receive higher payouts for selecting three riders who make their 8. The user may then get a higher payout for each over-under they correctly select. In one embodiment a user who pays one unit will receive 5 units if two of their 3 riders make the 8. If said user selected three riders who made their 8 that user would receive 15 units if they selected 0 over-unders correct; 40 units for selecting one over-under correct, 85 units for selecting two over-unders correct, and 350 units for selection all three over-unders correct. In this embodiment the platform has calculated the odds based upon an approximate ⅙ probability that any rider will make their 8, an approximate ½ probability of selecting a correct over-under, and a probabilistic return of 9.97%. The platform can adjust the fixed odds payout schedule based on changes in any of these numbers.

In some embodiments, such as the fixed odds payout schedule above, the payouts are of relatively large orders of magnitude, e.g. 350:1. Therefore, it is advantageous in these embodiments to have a large number of wagers, e.g. 1,000 to obtain reasonable downside protection.

In other embodiments, the game may not require over-under selections. Instead, the user selects N riders, and receives a fixed odds payout based on the number of selected riders who make the eight.

In other embodiments, the game may require the user to select two riders to make the eight and respective over-unders. This embodiment may require at least one of the riders to make the eight to receive a prize, but offer less payouts than selection two out of three.

Event Bingo Games

Class II games under 25 C.F.R. § 547 provide popular Native American gaming activities. Predominant in this category are games based on bingo cards, i.e. a random number output in an array format. Event bingo games integrate a component based on fantasy sports scoring with various random number generation and random event generation schemes. Event bingo games provide added excitement for sport's fan and gaming enthusiasts while maintaining compatibility with the technical requirements of class II games.

Any array choice game can be configured as an event bingo game by computer processes involving random number generation (RNG) and random event generation (REG). As for the skill-based games previously discussed, each array, or "bingo card" is associated with a set of geometrically confined positions, each position further being associated with a risk unit, and each risk unit being associated with a set of potential winners. A key difference between the pure skill-based games and the event bingo games is that each potential winner is further associated with a set of random numbers, determined by RNG. In some embodiments, events can also be randomly generated by a process of REG.

Figure 5:
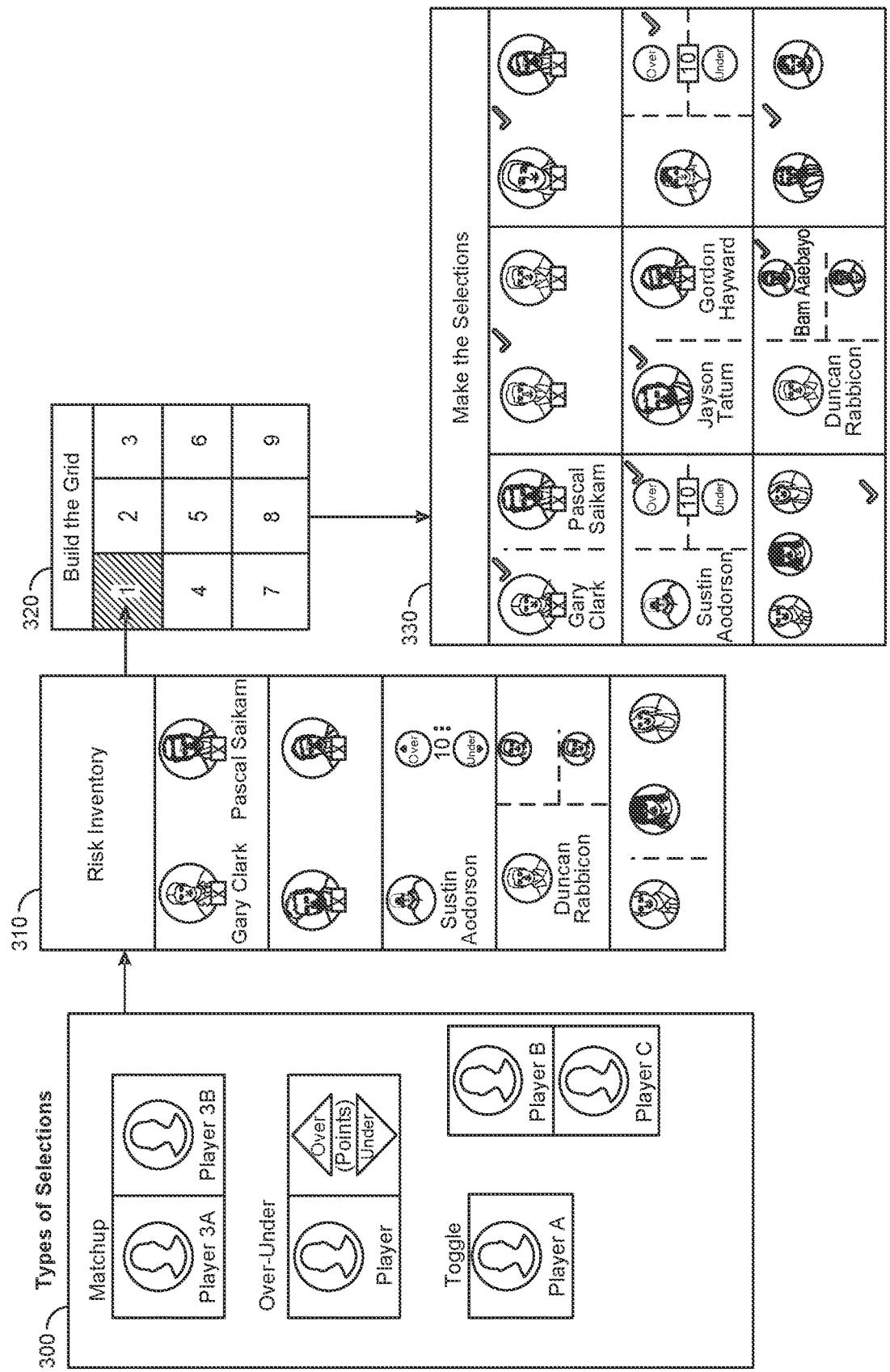
FIG. 5 shows some common features of array-based games embodied in this disclosure.

As summarized in FIG. 5, for preferred embodiments, the activity server system prepares an event selection schedule 300. Based on that schedule, a risk inventory 310 is provided for the user, based on the user's profile, or on random selection processes, or on a combination of the two. Risk units are selected from the risk inventory for placement in an array 320 by the user or by the activity server system, depending on the type of game. Each selected risk unit is then assigned to exactly one position in the array, with exactly one risk unit per position, by the user or by the activity server system, depending on the type of game. Each potential winner of each selected risk unit is assigned a random number. The pool of random numbers available to each potential winner does not overlap with any other potential winner. A projected winner is then determined for each risk unit. In some embodiments the projected winner for each risk unit is selected by the user. In some embodiments the projected winner is randomly selected by the computer. Winning selections are determined by matching the projected winners to actual winners as determined by real events. When it is determined that the projected winner is an actual winner, that position of the array is marked, i.e. covered by the electronically generated RNG. Rewards may be awarded to the users to have a preset pattern or amount of marks. In some embodiments, additional prizes may be awarded based on matching of winners with patterns, such as a reward winning pattern, or on matching some number of winners and random numbers.

In some such embodiments, as summarized in FIG. 6, the computer generates a risk inventory based on customer profiles, which include predicted customer preferences (FIGS. 7-13). Such preferences may be determined by algorithmic or machine learning processes based on user history, geographical information or on user-provided preferences for athletes, teams, horses, trainers, and the like.

Figure 7:
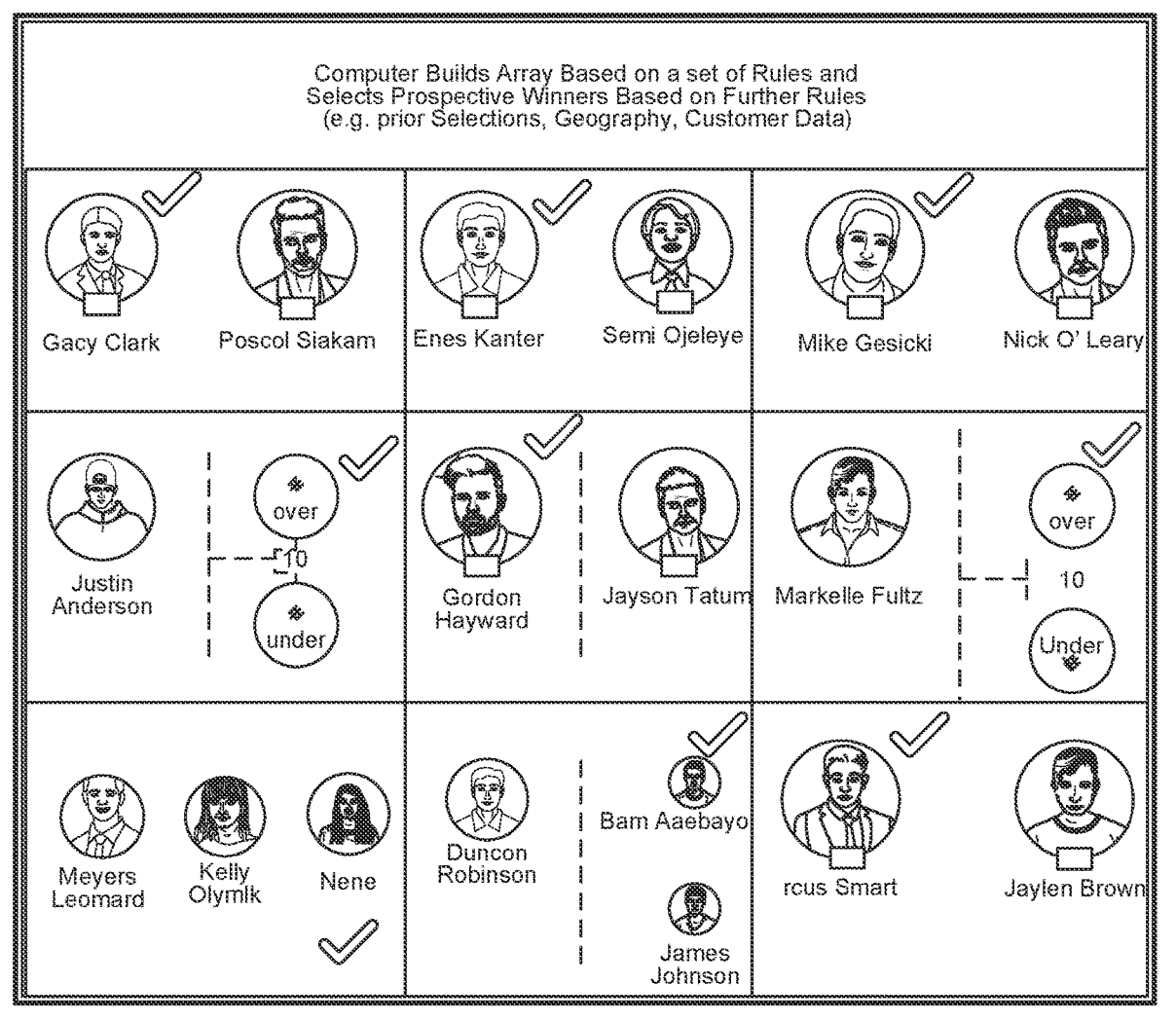
Figure 8:
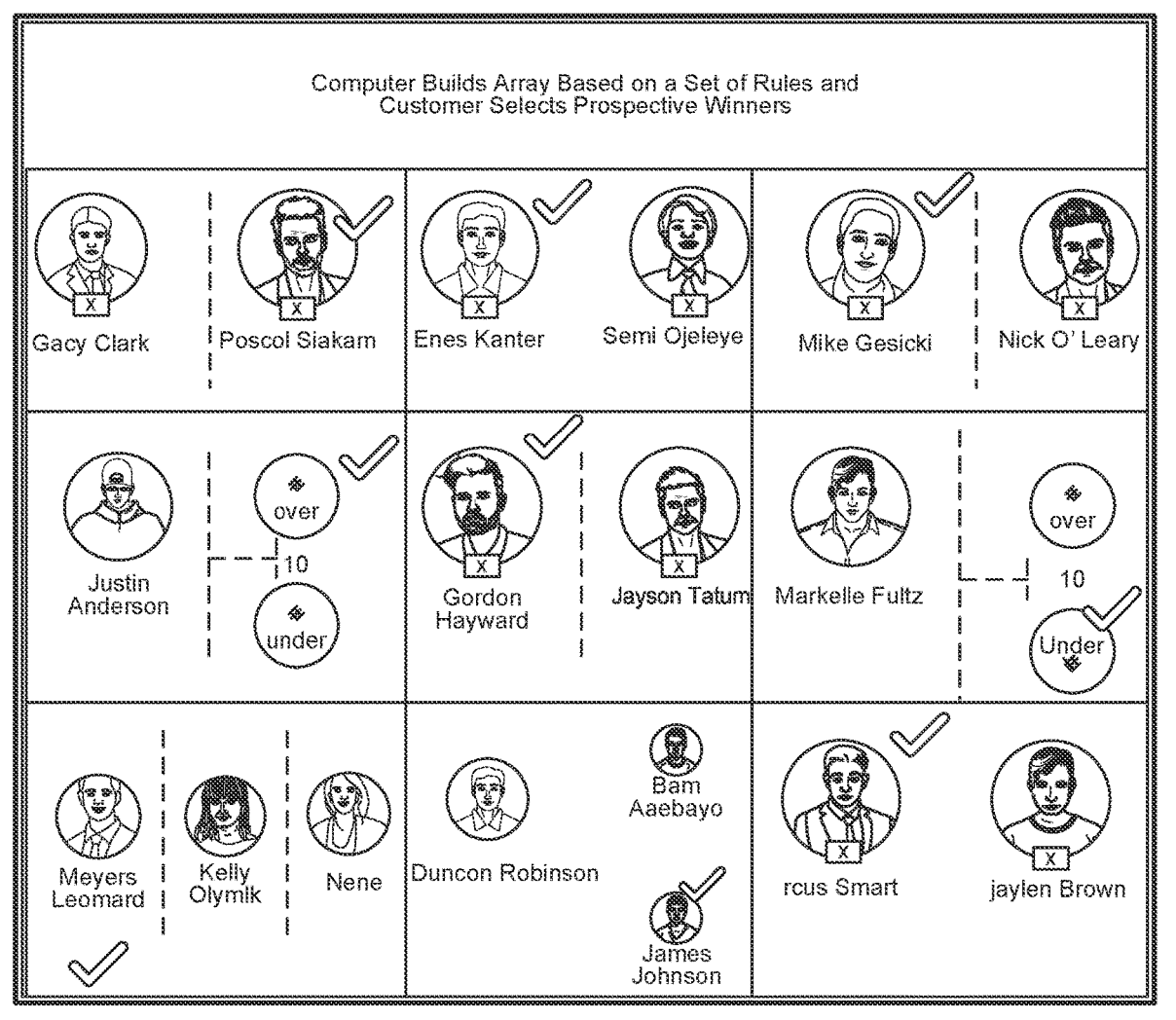
Figure 9:
FIG. 9 embodies array-based games for which the computer generates the events based on a set of rules, and for which the customer arranges the risk units in the array and chooses a prospective winner for each risk unit.

Based on these preferences, in some embodiments the computer builds an array and selects projected winners within the array (FIG. 7). In some embodiments, the computer builds an array and the customer selects projected winners within the array (FIG. 8). In still other embodiments, the customer selects from the computer-provided risk inventory to build the array, and the customer selects projected winners within the array (FIG. 9).

Figure 10:
FIG. 10 embodies array-based games for which the computer randomly generates an array of risk units and randomly selects potential winners for each risk unit (slots).
Figure 11:
FIG. 11 embodies array-based games for which the computer randomly generates an array of risk units, and customer selects potential winners within the array.
Figure 12:
FIG. 12 embodies array-based games for which the computer randomly generates a risk inventory of events, the customer builds an array from the risk inventory, and the computer randomly selects potential winners.
Figure 13:
FIG. 13 embodies array-based games for which the computer randomly generates a risk inventory of events, the customer builds an array from the risk inventory, and the customer selects potential winners.

In some embodiments, the risk inventory of risk units is generated randomly (FIGS. 10-13). Based on these random selections, in some embodiments the computer builds an array and selects projected winners in the array, analogous to a game of slots (FIG. 10). In some embodiments, the computer builds an array and the customer selects projected winners within the array, analogous to keno (FIG. 11). In some embodiments, the customer selects from the computer-provided risk inventory to build the array, and the computer selects projected winners (FIG. 12). In still other embodiments, the customer selects from the computer-provided risk inventory to build the array, and the customer selects projected winners within the array (FIG. 13).

Figure 20:
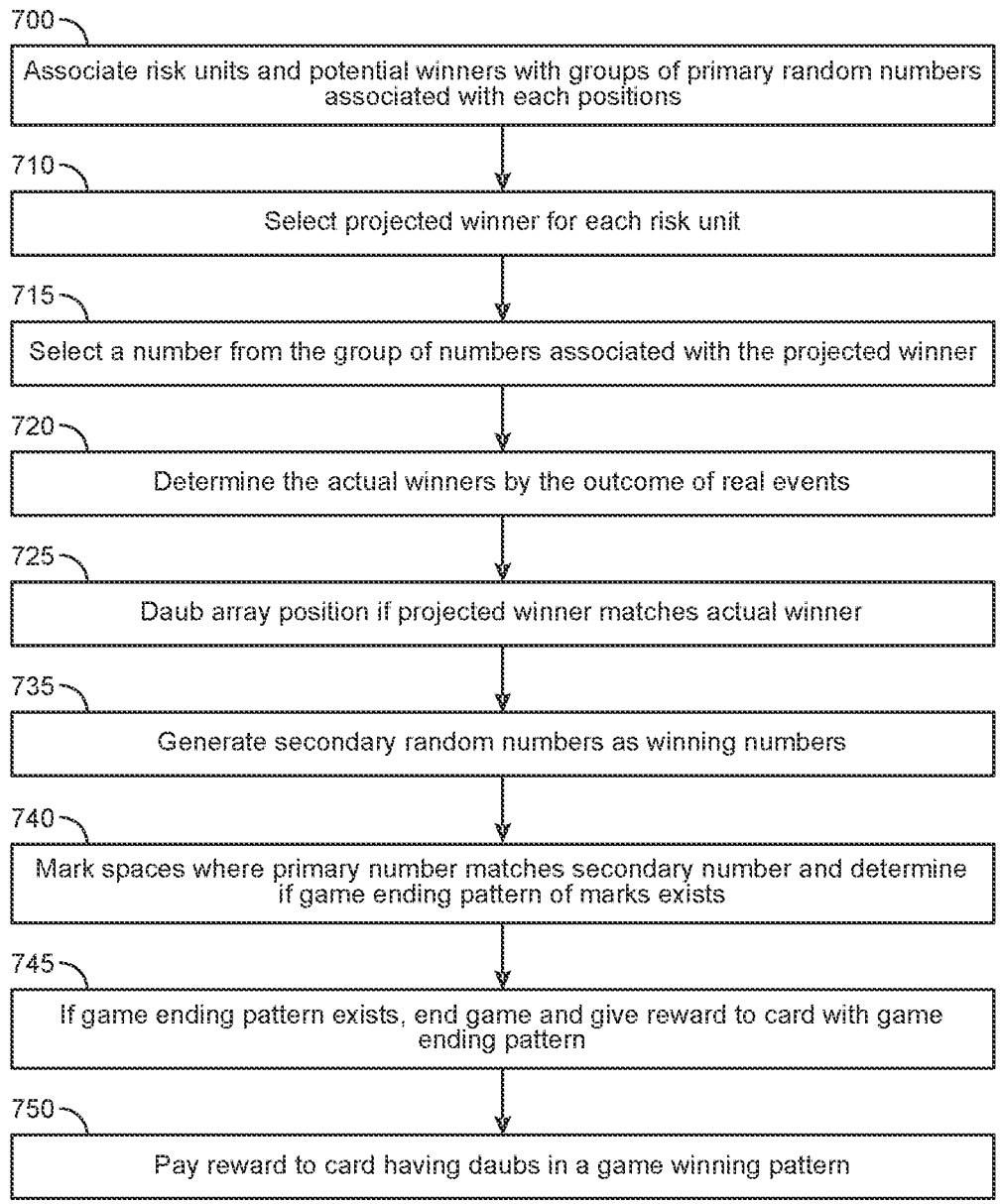
FIG. 20 shows a flowchart summarizing steps in a micro bingo game.

One embodiment of a process for creating an event bingo game is shown in FIG. 20. In step 700 primary random numbers are associated with array positions. There are a set of groups of numbers which are assigned to a potential winner of a risk unit. The numbers may be in three or more groups for a toggle event or other three or more way event. In step 710 a user or the activity server may select a projected winner for each risk unit. The user may select the projected winner based on a skill or knowledge that the user has. The activity server may select the projected winner randomly. When the projected winner is selected in step 715 a number from a group of numbers associated with said projected winner is assigned to the same array position as the projected winner. In step 720 a prized set (often referred to as interim prize) are determined by the correct selections of a real event. In some embodiments the event is a sports game, awards show, political race, random number generator, or other event. In step 725, the array positions where the projected winner is the actual winner are marked. A mark may be a virtual or physical marking. In step 735, a Bingo game is played such that secondary random numbers are generated as winning numbers. These secondary random numbers are matched against the random numbers associated with the events in the card set. If the secondary random numbers match those associated with the events in the card set, the position is daubed. The secondary random numbers may only be matched against numbers associated actual winners. In step 740, the bingo card that is makes a game ending pattern of daubs is considered the winning bingo card. In some embodiments, the secondary random numbers may be redrawn a plurality of times to provide at least one winner. In other embodiments the secondary random numbers may be redrawn until each bingo card having a reward winning pattern of marks also has a game ending pattern of daubs. In some embodiments, once a winning bingo card is determined the game is over. Further rewards, sometimes called continuation or bonus prizes or awards, may be assigned for entries associated with correctly selected patterns based on the game type regardless of achieving the game ending pattern associated with the bingo RNG. In step 745, rewards are awarded to the bingo card having the game ending pattern. These rewards may be money, tokens, discounts, nominal, and any other prize. Once rewards for the winning bingo cards are doled out, bingo cards that have a reward winning pattern from step 730 are paid out in step 750. In some embodiments this may be redundant, as each card with a reward winning pattern will have a game ending pattern, thus the reward may be the same for both. The reward for the reward winning pattern is a fixed odds payout which the activity server determines. The activity server may calculate all the possible winning patterns and associate different or identical fixed odds for each pattern such that the odds of a payout are at a specified value.

Figure 21:
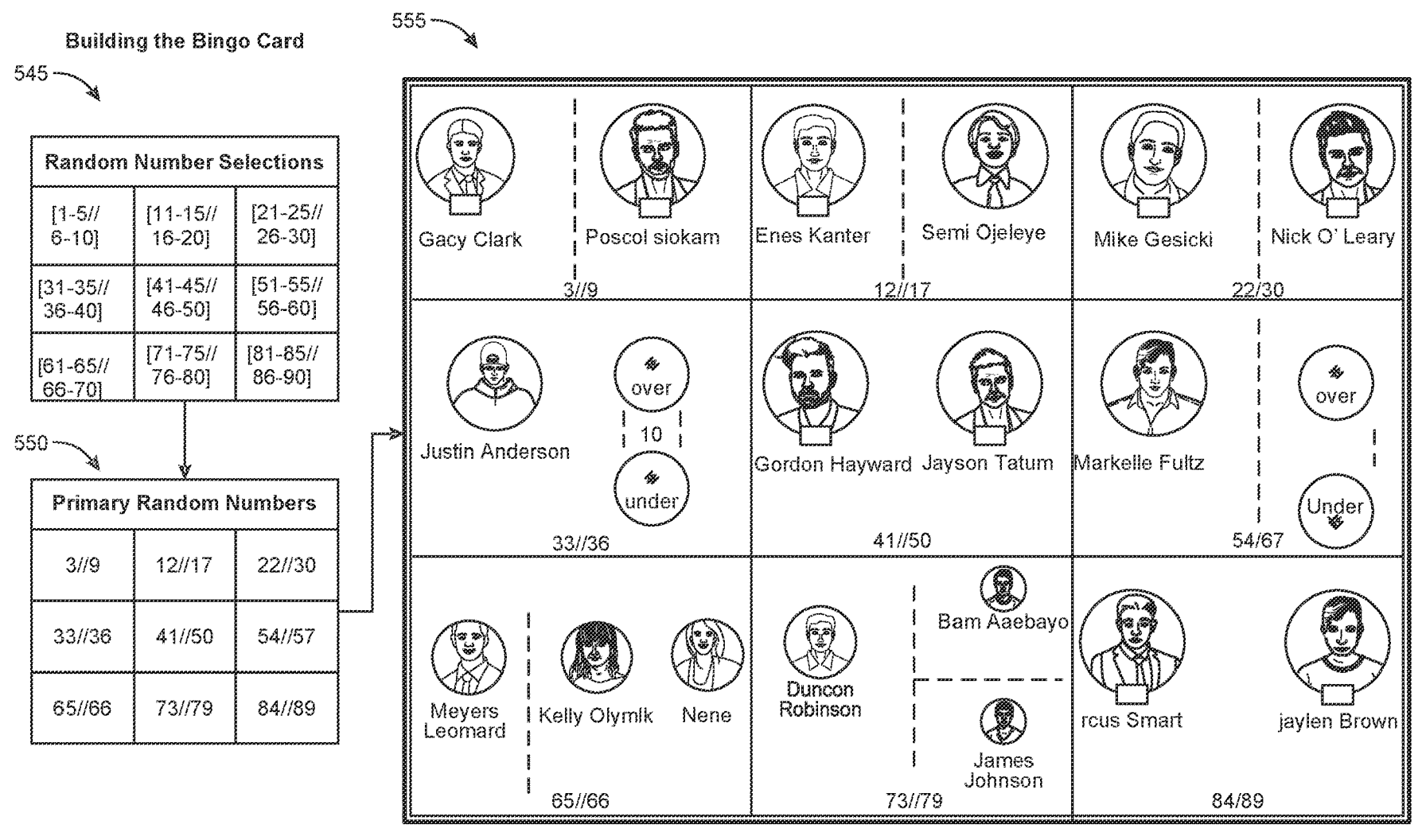
Figure 22:
FIG. 22 shows a first "ball-drop" for actual winners for each risk unit of the micro bingo card are chosen, as determined by real-world events. Primary numbers corresponding to the actual winners then are associated with each position on the micro bingo card.
Figures 23, 24:
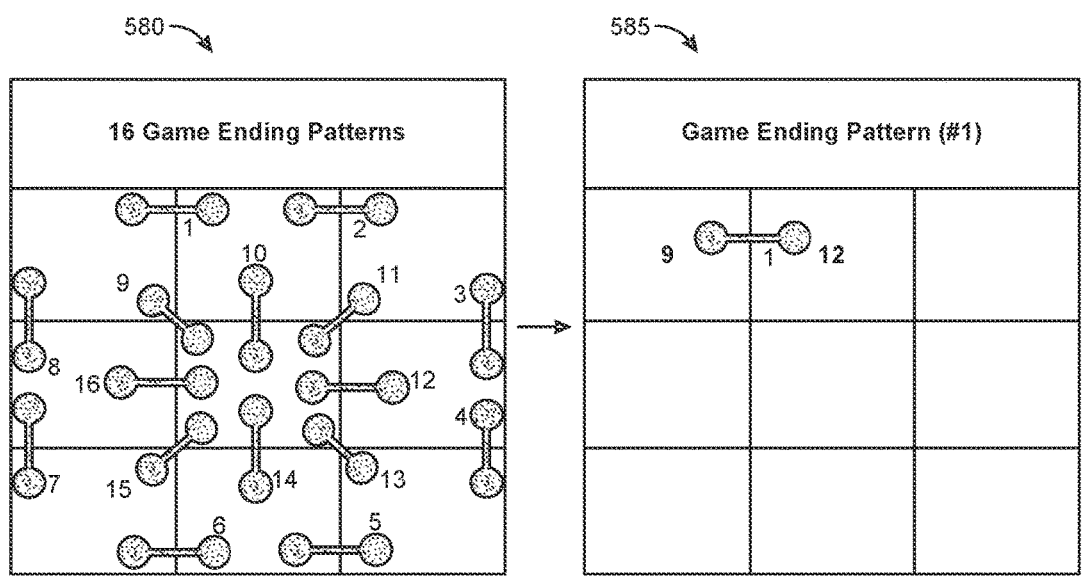
FIG. 23 shows a second "ball-drop" for which each position on the micro bingo card is further associated with a second integer, chosen from the same randomly selected pools as the first integer. For each position, first and second integers are compared, and a winning card is declared as the first card with matching numbers in the correct game-ending pattern. If no matching of numbers gives the game ending pattern, and then further selections of second integers are made, until a winning card occurs.
FIG. 24 shows the sixteen potential game ending patterns involving two neighboring positions on the micro bingo card. In this example, the primary and secondary random numbers of FIG. 25 match for game-ending pattern #1

A specific embodiment of a general process for building and matching an event bingo card is described in FIGS. 21-23. FIG. 21 exemplifies how a 3×3 bingo card is built and matched. Initially, the bingo card 545 is built where each position on the card is associated with a specific risk unit, selected randomly, or based on specific customer preferences. Each risk unit has a pool of random number selections associated therewith. The bingo card 550 has a random number from each group of random number selections selected. The bingo card 555 then has a risk unit associated with each array position and thus each potential winner has a unique random number associated therewith.

In FIG. 22 the bingo card 560 is played by the user or activity server by selecting a projected winner for each risk unit on the bingo card. Therefore, each array position now has a single random number associated therewith as shown on card 565.

As the events take place, the actual winners are determined and the played bingo card is compared with the actual winners and the bingo card is marked where the projected winner is the actual winner. A first pattern may be a horizontal, vertical, or diagonal line being three units long. In this case, the bingo card has achieved a first pattern having a diagonal line from the top left to the bottom right of the card. In some embodiments this first pattern may have a specific fixed odds payout associated with it, which would pay out based on how much the user paid for the bingo card. In some embodiments only the cards containing the first pattern may move onto a second game. In other embodiments both cards having a first pattern and those without a first pattern may move onto a second game. In other embodiments cards not having a first pattern will move onto a second game. In some embodiments there may be different requirements to move onto the second game e.g. having a specified number of marks.

The second game is shown in FIG. 23. The second game may run in parallel with the first game or at a different time, such as right after the last actual event takes place. In card 570, each array position has a secondary number assigned to it. In some embodiments where the numbers may be assigned not in order, the secondary numbers may be drawn without an assigned array position. In some embodiments, when a user or the activity server makes a selection of a projected winner, a random number from the pool of number associated with that projected winner is assigned to that space. In other embodiments, for each bingo card a random number from each pool of numbers associated with a potential winner is assigned to the array section before the projected winner is chosen. The secondary numbers shown in card 570 are then compared to the primary number 575. In some embodiments only primary numbers associated with winning selections are compared. The primary and secondary numbers are then compared as shown on card 580 to determine if a Bingo card has a game ending pattern 585 and is thus, a winning Bingo card. The winning bingo card may be the first bingo card to obtain a game ending pattern. If there is no game ending pattern such as shown in card a new set of secondary numbers may be chosen, or a new game ending pattern may be chosen. The game ending pattern in the second game may be different than the reward winning pattern in the first game. Once a bingo card is known to have a game ending pattern the game is ended and prizes are awarded. Prizes may or may not be given out for having the game ending pattern for the second game. In some embodiments prizes are given out for reward winning patterns.

Figure 25:
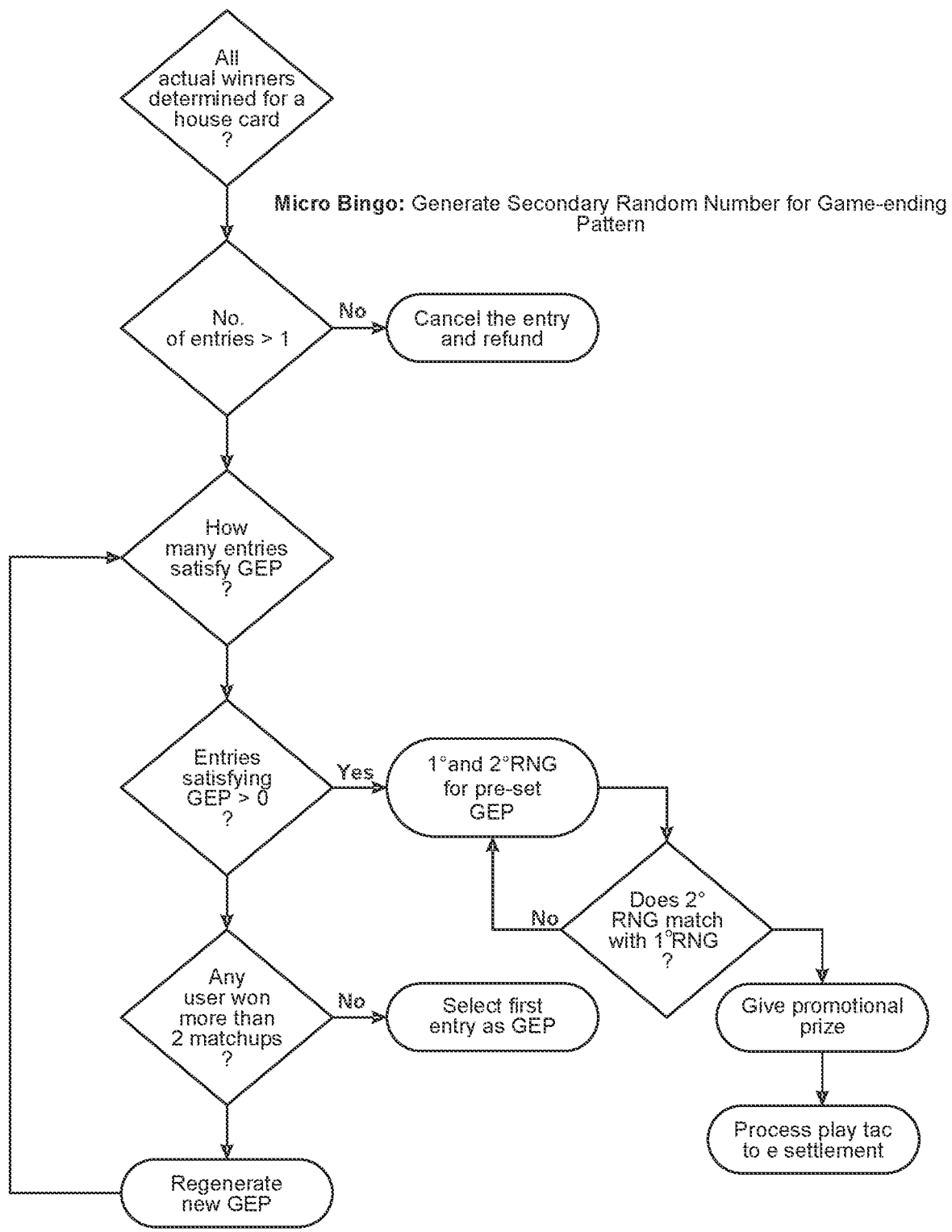
FIG. 25 shows a flow chart of a micro bingo game according to an embodiment of the instant invention.

FIG. 25 provides a flow chart outlining an exemplary embodiment of a process for determining a winning bingo card. The process is designed to ensure that, for each game with more than one player, there is a winning bingo card. If the number of entries is less than one, then the entry is canceled and the user has her money refunded. If the number of entries is greater than one, then the activity server detects how many entries have the first pattern. If the number of entries with the first pattern on their bingo cards is also greater than one, then secondary random numbers are generated. The first bingo card to match the game ending pattern with their daubed array sections is declared the winning bingo card. If no bingo card provides the game ending pattern of daubed array sections, then secondary random numbers are again generated until a game ending pattern of daubed array sections is obtained. In some embodiments the secondary random numbers are again generated until each entrant having a reward winning pattern has a game ending pattern. In further embodiments, the secondary random numbers are generated until each random number associated with each risk unit has been selected, thereby all permutations of correctly selected reward winning patterns have a game ending pattern. In an even further embodiment the reward winning pattern is the same as the game ending pattern.

If on the other hand no card has a pattern of daubs that matches the game-ending pattern, then a new game ending pattern is generated and checked for a game ending pattern of winning matches. This process continues until a game ending pattern of winning matches is found. For example, the original game ending pattern may be a line of three, but if no card has a pattern that matches a line of three, the system would instead look for a line of two. Once the game ending pattern of matches is found, then secondary random numbers are generated as described above until a winning bingo card is obtained.

Once the game has ended, the prizes are awarded. In some embodiments prizes are awarded for achieving the first pattern, the game ending pattern, the reward winning pattern, and other patterns. Small consolation prizes may also be awarded, e.g. for obtaining a given pattern of matches or a given number of winning selections.

In various embodiments prizes are awarded by applying a random number generator to correctly selected risk units, until each correctly selected risk unit associated with the event is matched with a correct random number generator of the prize ending pattern. This can be run in sequence or also run randomly. Such prizes are interim, continuation, consolation and bonus prizes. In some embodiments, the potential winners do not have a common prize set, such as the embodiment shown in FIG. 33. In these embodiments the fixed odds payout would be given to the user based on the selections made.

FIG. 24 shows a game ending pattern of having two neighboring daubs. There are 16 different ways to arrive at this simple game ending pattern. In another embodiment the game ending pattern is 2 daubs that do not need to be adjacent.

Numerous variations and modifications based on the determination of daubs and marks will be apparent to those skilled in the art. All such variations and modifications are intended to be within the scope of the present invention as defined in any appended claims.

Among such variations, are slot-machine type games, which involve purely random choices made by the computer, where the user interacts with the slot machine to initiate the random choices (e.g. by pulling a lever), which institutes random processes of array generation and random selection as shown in FIG. 26. Similarly to matching the potential winners to a pool of numbers in the array, the slot machine may have a set of reel possibilities related to each potential winner. The reel possibilities may overlap with each potential winner. When the actual winner is determined the slot machine may generate a random reel possibility for the actual winner. In some embodiments the reel may look like a 3×3 array such as the one showed in FIG. 25. Each row may be classified as A, B, or C. Each array section may display 1 reel possibilities and payout based on having a set of a particular reel possibility appear in the row. Each array section may determine an actual winner from a different event or some array sections may determine the actual winner from the same game. The activity server may decide payouts based on the possibilities of a winning set of reel possibilities appearing.

FIGS. 34-39 illustrate embodiments in which skill-based games may be modified to include new options during gameplay. For instance, in some cases, a skill-based game such as an advance choice that includes multiple matchup possibilities may be modified to include a buy-out option in which a player may opt to sell the remainder of the matchups in their game for a buy-out price. Or, the skill-based game may be modified to include a buy-in option that would allow the player to add additional matchups to the game for a buy-in price. The buy-out and buy-in prices may be determined in a specified manner as described further below with regard to the computing environment 3400 of FIG. 34 and method 3500 of FIG. 35.

Figure 34:
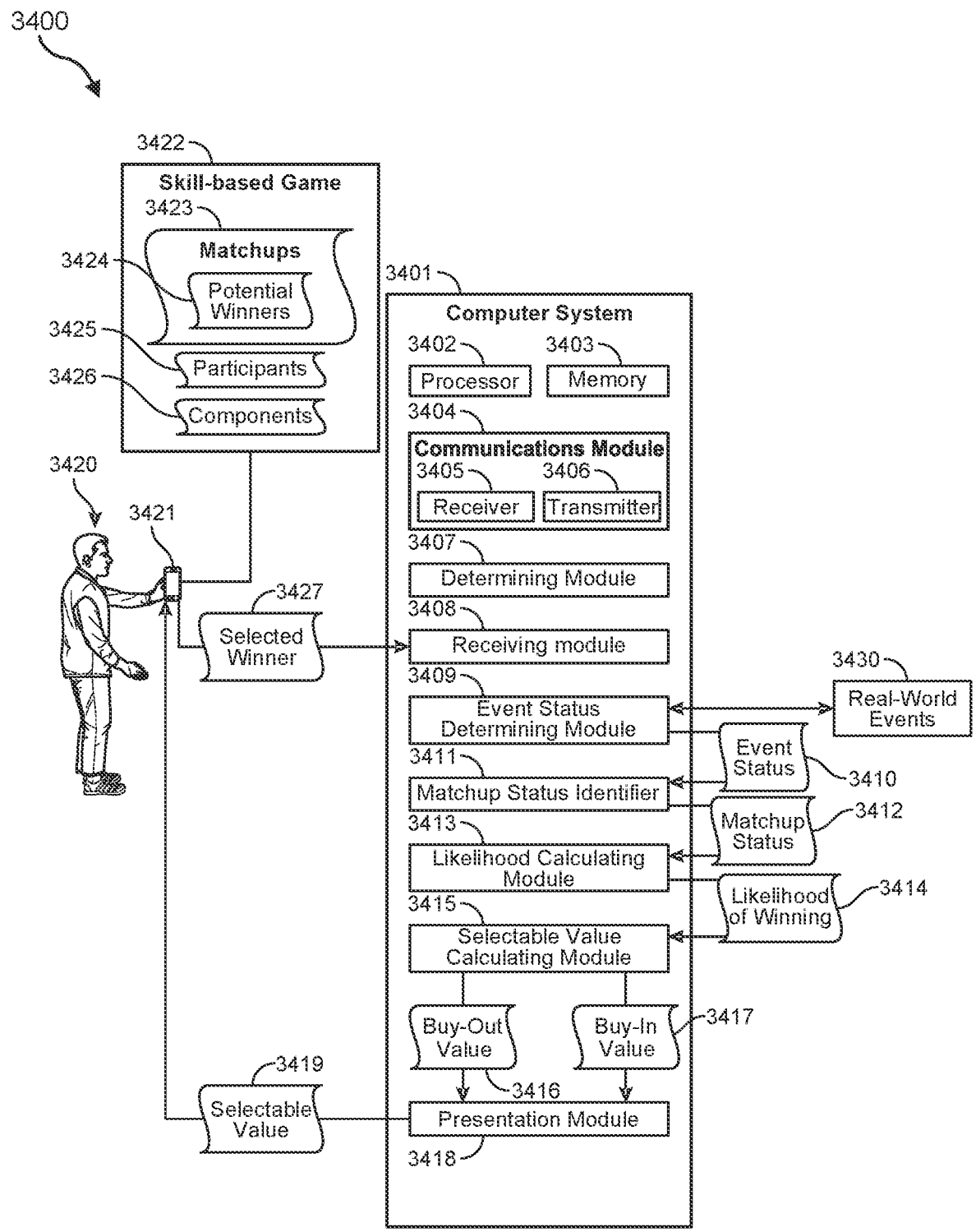
FIG. 34 shows an example computer architecture in which the embodiments described herein may operate.

FIG. 34, for example, illustrates a computing environment 3400 in which skill-based games may be modified to include new options during gameplay. FIG. 34 includes various electronic components and elements including a computer system 3401 that is used, alone or in combination with other computer systems, to perform associated tasks. The computer system 3401 may be substantially any type of computer system including a local computer system or a distributed (e.g., cloud) computer system. The computer system 3401 includes at least one processor 3402 and at least some system memory 3403. The computer system 3401 includes program modules for performing a variety of different functions. The program modules may be hardware-based, software-based, or may include a combination of hardware and software. Each program module uses computing hardware and/or software to perform specified functions, including those described herein below.

In some cases, the communications module 3404 may be configured to communicate with other computer systems. The communications module 3404 may include substantially any wired or wireless communication means that can receive and/or transmit data to or from other computer systems. These communication means may include, for example, hardware radios such as a hardware-based receiver 3405, a hardware-based transmitter 3406, or a combined hardware-based transceiver capable of both receiving and transmitting data. The radios may be WIFI radios, cellular radios, Bluetooth radios, global positioning system (GPS) radios, or other types of radios. The communications module 3404 may be configured to interact with databases, mobile computing devices (such as mobile phones or tablets), embedded computing systems, or other types of computing systems.

The computer system 101 further includes a determining module 3407. The determining module 3407 may be configured to determine that a skill-based game 3422 has been instantiated on an electronic device 3421. In some cases, the determining module 3407 may receive an indication from the electronic device 3421 that an application has been opened or that a webpage allowing gameplay has been visited. Additionally or alternatively, the computer system

3401 may itself start and/or run the skill-based game 3422 and act as a server providing data to that game during gameplay.

The skill-based game 3422 may be one of a plurality of different games or types of games. In some cases, the skill-based game 3422 (or, more simply, "game 3422" herein) may allow players to select potential winners in a game that includes multiple different matchups. Thus, for example, as can be seen in FIG. 34, a player 3420 may select potential winners 3424 for various matchups 3423 in game 3422 via selection input 3427. At least in some cases, the skill-based game may allow players to select potential winners from multiple different matchups arranged in a multi-dimensional array 3427. The multi-dimensional array 3427 may include one or more participants 3425 in different real-world events 3430. In cases where the multi-dimensional array 3427 includes a single participant 3425, players of the skill-based game 3422 may select an over/under for that participant or may choose another type of interaction that involves a single participant.

In other cases, the matchups in the game 3422 may include multiple different participants 3425 in various real-world events 3430. As noted above, the participants may be the athletes or players in the real-world events 3430. The real-world events 3430 may include substantially any type of sporting or other event, from basketball to fencing, and may include subcomponents of those games including the number of consecutive shots made, the number of goals scored by a player, the number of bases stolen by a team, or other individual or team-based statistics. In at least some of the embodiments described herein, the skill-based game 3422 includes at least two components 3426 arranged in a multi-dimensional array. The multi-dimensional array 3427 may include a two-dimensional array, a three-dimensional array, or an array that has more than three dimensions. As will be described further below, the multi-dimensional array 3427 may include two-dimensional tic tac toe arrays of matchups, three-dimensional Rubik's cube arrays of matchups, or other arrays of matchups in which players attempt to create certain patterns in correctly selected matchups.

The matchups 3423 in the skill-based game 3422 may include two or more different components 3426 that each have substantially similar predicted outcomes. As the phrase is used herein, "substantially similar predicted outcomes" may refer to predicted winning or losing outcomes that are equally likely to occur or that are at least substantially equally likely to occur. In some examples, an outcome with substantially similar predicted results may include a 50% or 50.1% or 50.2% or 50.3%, etc. chance of winning. In other cases, a substantially similar predicted outcome may include a 49.9% or 49.8% or 49.7%, etc. chance of winning. Additionally or alternatively, the matchups may include two or more components that are selected so as to produce outcomes that are generally equally weighted within the skill-based game 3422. In order to ensure that the result or outcome of correctly picking the result of a matchup requires a substantial amount of skill from the player, each matchup is generated so that the matchup pairings are generally equal or equally weighted, such as pairing equally matched players. In other words, players with similar skill or ability to play the sports event are matched in the matchups. These "generally equally weighted" matchup components may be similar to or the same as the components that have the substantially similar predicted outcomes described above.

Thus, the embodiments herein, when calculating substantially similar or generally equally weighted predicted outcomes, attempt to predict at least two components for a matchup whose likelihoods are substantially equally likely to occur. The two components, for example, may indicate that a player will have over or under a specific number of hits in a baseball game, or that another player may have over or under a specific number of blocks in a volleyball game or within the first half of the volleyball game (or a combination thereof). Each of these components, having generally equally weighted or substantially similar predicted outcomes, may be paired in a matchup as part of an advance choice game, potentially along with a plurality of other components that each have their own associated matchups. Regardless of the number of matchups in the skill-based game 3422, the player 3420 may send, and the receiving module 3408 of computer system 101 may receive, an indication of selected winners 3427 for each of the plurality of matchups in the game 3422.

Upon receiving this indication of selected winners 3427, the event status determining module 3409 of computer system 101 may determine that at least one of the real-world events associated with one or more of the matchups 3423 in the skill-based game 3422 has completed and that at least one other matchup in the skill-based game remains pending. As long as at least one matchup remains alive or pending within the game, buy-in or buy-out offers may be presented to the player 3420. The event status 3410 indicating the completion of at least one of the real-world events 3430 may then be passed to a matchup status identifying module 3411 that identifies the status 3412 of the matchup 3423 as a winner or loser based on the completed real-world event 3430. Accordingly, based on which option (e.g., over or under) the player selected, the matchup status identifying module 3411 may determine whether the player's selection was winning or losing.

At this point, the player's skill-based game 3422 still has at least one remaining matchup pending. The matchup status 3412 may be provided to the likelihood calculating module 3413. The likelihood calculating module 3413 may be configured to calculate a likelihood that the selected potential winners 3424 in the remaining matchups in the game 3422 will win. If the game still has one or two remaining matchups, the likelihood of one or both winning may be fairly high, while the likelihood of three, four, five, or more remaining matchups winning may be substantially lower. The likelihood calculating module 3413 thus calculates, based on the remaining matchups in the game, a likelihood that the remainder of the matchups will win out (e.g., 3414). Alternatively, the selectable value calculating module 3415 may calculate a selectable amount of value 3419 that is to be presented within the skill-based game 3422 without calculating such a likelihood. In such cases, the selectable value calculating module 3415 may calculate, based at least in part on whether a matchup (or series of matchups) was a winner or a loser, an amount of money to charge a player to close the game early (e.g., a buy-out value 3416) or an amount of money to add additional matchups to the skill-based game (e.g., a buy-in value 3417). Thus, at least in some cases, the selectable amount of value 3419 is calculated without determining a likelihood that the selected potential winners 3424 in the remaining matchups in the game 3422 will win.

The selectable value calculating module 3415 of computer system 3401 may thus calculate a selectable amount of value 3419 that is to be presented within the skill-based game 3422. The selectable amount of value 3419 may be a buy-out value 3416 that, upon selection, buys out the remaining pending matchups in the game 3422 and closes the game. Or, the selectable amount of value 3419 may be a buy-in value 3417 that, upon selection, adds at least one new matchup to the game 3422. Either or both of the buy-out value 3416 and the buy-in value 347 may be presented in the skill-based game 3422 at the same time or at different times by the presentation module 3418. The presentation module 3418 may provide the selectable value(s) or may cause the selectable value(s) to be displayed on the player's electronic device 3421. The player 3420 may then select the buy-out value 3416 to close the remainder of the game 3422 and receive the buy-out value in payment. Or, the player 3420 may select the buy-in value 3417 to add one or more matchups 3423 to the game 3422. These concepts will be explained further below with regard to method 3500 of FIG. 35, and with regard to FIGS. 36-39.

Figure 35:
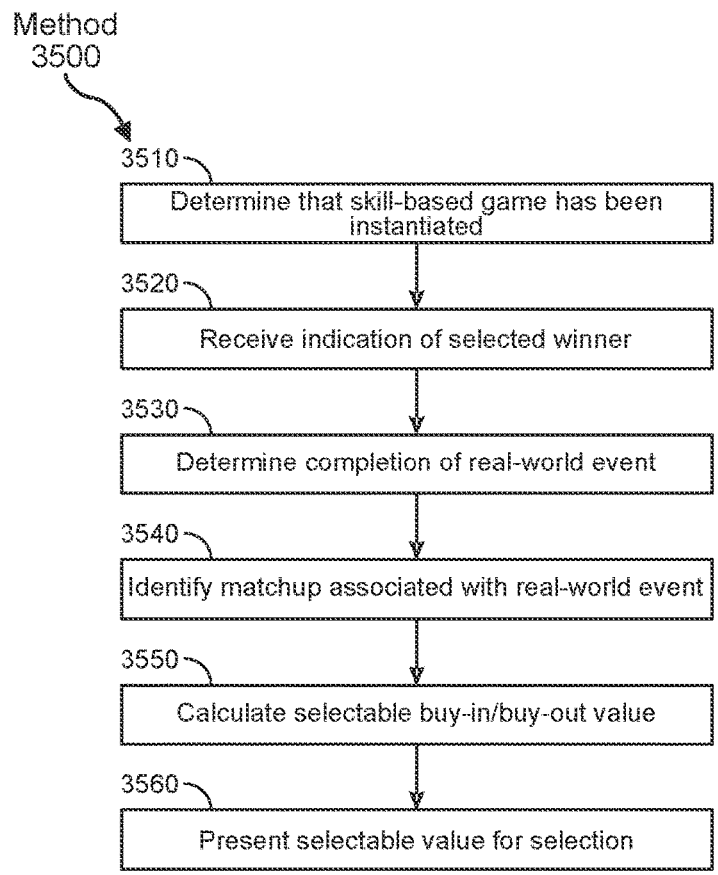
FIG. 35 shows a flow diagram of an exemplary method for providing a customized buy-out or buy-in option in a skill-based game.

FIG. 35 is a flow diagram of an exemplary computer-implemented method 3500 for providing customized buy-out and buy-in options within a skill-based game. The steps shown in FIG. 35 may be performed by any suitable computer-executable code and/or computing system, including the systems illustrated in FIG. 34. In one example, each of the steps shown in FIG. 35 may represent an algorithm whose structure includes and/or is represented by multiple sub-steps, examples of which will be provided in greater detail below.

At step 3510, method 3500 includes determining that at least one skill-based game 3422 has been instantiated on at least one electronic device 3421. The skill-based game 3422 may be configured to allow selection of potential winners 3424 in a game that includes a plurality of matchups 3423 arranged in a multi-dimensional array. Each of the plurality of matchups in the game may include at least two components 3426, associated with at least one participant 3425 in various real-world events 3430 that are selectable so as to produce generally equally weighted predicted outcomes within the skill-based game 3422.

At step 3520, method 3500 includes receiving an indication of a selected winner 3427 for each of matchups 3423 in the multi-dimensional array 3427 and, at step 3530, determining that at least one of the real-world events 3430 associated with at least one of the matchups in the multi-dimensional array 3427 has completed and that at least one other matchup in the multi-dimensional array 3427 remains pending. At step 3540, method 3500 includes identifying the matchup associated with the completed real-world event 3430 as a winner or a loser and, at step 3550, calculating, based at least in part on whether the at least one matchup was a winner or a loser, a selectable buy-in/buy-out value 3419 that is to be presented within the skill-based game 3422, where the selectable buy-in/buy-out value 3419 is either a buy-out value 3416 that, upon selection, buys out the remaining pending matchups 3423 in the game, or is a buy-in value that, upon selection, adds at least one new matchup to the game. The method 3500 further includes, at step 3560, causing the selectable buy-in/buy-out value 3419 to be presented for selection within the skill-based game 3422.

The selectable buy-out and buy-in values 3419 may be presented as selectable options within a plurality of different skill-based games. For instance, in some cases, the selectable values may be presented within advance choice games or plurality of choice games, in which a user makes multiple initial matchup selections of which the user intends to win at least a certain number (e.g., 3-of-5, 4-of-5 or 5-of-5). In other cases, the selectable values may be presented in two-dimensional or three-dimensional array-based games that may be referred to herein as "risk ranking games." Such risk ranking games may include three-dimensional games such as Rubik's cube games in which a user attempts to win matchups that form a side of a 3D cube, or two-dimensional games such as tic tac toe games in which a user attempts to win matchups that form a line in a 2D grid.

In two-dimensional tic tac toe games, for example, players may select up to nine matchup winners and attempt to achieve a vertical, horizontal, or diagonal tic tac toe. In a 3D Rubiks cube risk ranking array-based game (or similar three-dimensional game), users may select up to 12 matchups and attempt to form rows, columns, and/or diagonals of matches that correspond to different sides of a three-dimensional cube. These tic tac toe and Rubik's cube games may include different numbers of matchups, each of which has a substantially similar predicted outcome. Rubik's cubes with two squares per side, or three squares per side, or more may have different numbers of matchups and different matchup possibilities (e.g., column, row, or diagonal matches of different numbers). Each number or pattern of matchups may have a different reward (e.g., a fixed odds payout) associated with it that the user can then select. Once corresponding matches have been chosen for the matchups and once the risk ranking game has begun, different in-game offerings may be provided throughout the course of the game. The term "in-game" may refer to offerings that are provided during the course of an actual event. The in-game offering may be selected in real time and may include a dynamic fixed or variable payout. In some cases herein, such in-game offerings are provided as part of advanced choice games and may provide real-time prizing and matchup selection options.

Similarly, different numbers of matchups (having generally equally weighted or substantially similar predicted outcomes) may be incorporated into spinner games. Spinner games may provide a wheel of selectable matchups that are associated with different triangular slots of a spinnable wheel. Hexagon games may include up to six matchups selections that are intended to be matched according to a specific pattern. The spinnable wheels may include substantially any number of triangular slots and may be winnable by correctly identifying specific sequences of two or more matchups on the spinnable wheel. Other similar games may also be provided. Each of the above games may be presented as Class II (as that term is defined by 25 USC § 2703(7)) skill-based games that fall under Class II purview within casinos or other establishments. Additionally or alternatively, each of the skill-based games above may be presented as Class III games (as that term is defined by 25 USC § 2703(8)) that fall under Class III purview within casinos or other establishments. Each matchup within these games may include over/unders, daily fantasy sports, player performance metrics, team performance metrics, or other statistics, as generally outlined above with regard to FIGS. 1-33.

Different sports gaming models may be implemented when creating matchups within a skill-based game. For instance, a margin-based gaming model may take a fee from a user and manage a spread (i.e., a margin) between an established buyer's price and an established seller's price. In some instances, this may be referred to as a "double-blind auction." In such cases, a market maker (i.e., a bookie) may manage the prices of a seller's auction that is higher in price than a buyer's auction. Some such embodiments may implement a Bayesian Nash price equilibrium when managing the auction prices. One risk in such cases is that, in order to produce liquidity and attract larger wagers, the market maker may need to act as principal in order to serially locate an offsetting buy or sell order, which may open the market maker to disproportionate amounts of risk.

A second sports gaming model is a volume-based model that takes a percentage of a total volume bet, where losers pay the winners on a pro rata basis from the pool of price entries. This may be referred to as a pari-mutuel or rake system. In such systems, there may be little or no risk to the market maker, but due to a high number of games as various price points for wagering, this model is highly dependent on marketing spending. Furthermore, the data associated with the skill-based games cannot be centralized, virtually assuring a direct-to-consumer model and low scalability. Such models, while often used in horse racing, poker, and daily fantasy sports, are limited in number and are limited to the size of the pool of price entries.

In contrast to the margin-based and volume-based gaming models described above, the embodiments herein may implement a gaming model that is both margin-based and volume-based. The combination margin and volume gaming model may offer a fixed prize that is at or near the midpoint of a predicted sellers' and buyers' price, but at a discount to the theoretical value expected for the payout on that midpoint for an expected number of players. Thus, a theoretical payout value for winning one of five, or two of five matchups may be fairly low, while a theoretical payout value for winning four of five or five of five matchups may be fairly high.

Regardless of whether the theoretical payout value is determined to be relatively high or relatively low, the embodiments herein may calculate a value that is less than the theoretical value or is "at a discount to" the theoretical value. For example, in a given game with a certain number of players, the amount of the fixed prize may be discounted by a specified amount according to the amount of risk involved in the game. The amount of the discount may be determined in real time and may scale as different winning combinations of matchups are considered for each game. In such cases, the calculations involved may be granular and unitary where all players are presented with the same risk, whether they are a buyer or a seller. And, as such, each player has access to the same fixed prize that is not dependent on the size of other user's wagers or on the overall pool of price entries.

Within the rubric of combination margin and volume gaming models, users may play any of a variety of different skill-based games. In some embodiments, these games may be parlays that include sequences or pairings of matches. Thus, a parlay, as defined above, may include a sequence of five matchups and the user is to correctly select winners for one of five, two of five, up through all five of five. At each level of wager, the odds of winning may decrease, and the fixed payout may increase. As noted above, each of the matchups in the parlay may be calculated to have substantially similar predicted outcomes.

Thus, one matchup may pair an over/under for LeBron James hitting a certain number of points in a game or in a quarter against an over/under for Stephen Curry hitting a certain number of three-point shots in a row during the same game or during a different game. Or, the matchup may pair the above LeBron James over/under with a baseball-related over/under or a Formula One over/under, or other matchup that is determined to have substantially similar predicted outcomes. The matchups in the parlay may be one match vs. another match (e.g., 1 vs. 1) or may be 1 vs. many or many vs. 1. For example, parlays may include 1 vs. 1, 1 vs. 2, 2 vs. 1, 1 vs. 3, 3 vs. 1, 3 vs. 3, 2 vs. 3, 3 vs. 2, etc. Other matchup possibilities with higher or lower numbers of matchups may be interchangeably used. In some cases, matchups may be generated automatically by a computer algorithm. The autogenerated matchups may be presented to the game player for selection. In some embodiments, the automatically generated matchups are randomly generated based on random participants and events. In other cases, the autogenerated matchups are tailored to a given user and are based on the user's preferences, playing history, or other characteristics associated with the user.

Accordingly, each matchup in the parlay or other game may have generally equally weighted or substantially similar predicted outcomes and, as a result, may have a fixed payout associated therewith. That fixed payout, in turn, may be calculated to include a discount to the theoretical maximum value, giving the player an even higher odds of selecting a winning matchup. In some cases, the player statistics or team statistics used in the matchup may be altered or handicapped in some manner to skew the predicted outcomes to the point that the outcomes are substantially similar. Thus, if the underlying systems determine that a matchup has substantially different predicted outcomes, the statistics involved in that matchup may be increased or decreased to the point that both predicted outcomes of the matchup are equally likely to occur. In this manner, the systems herein may alter matchup statistics to ensure that each matchup result has substantially similar predicted outcomes.

Figure 36A:
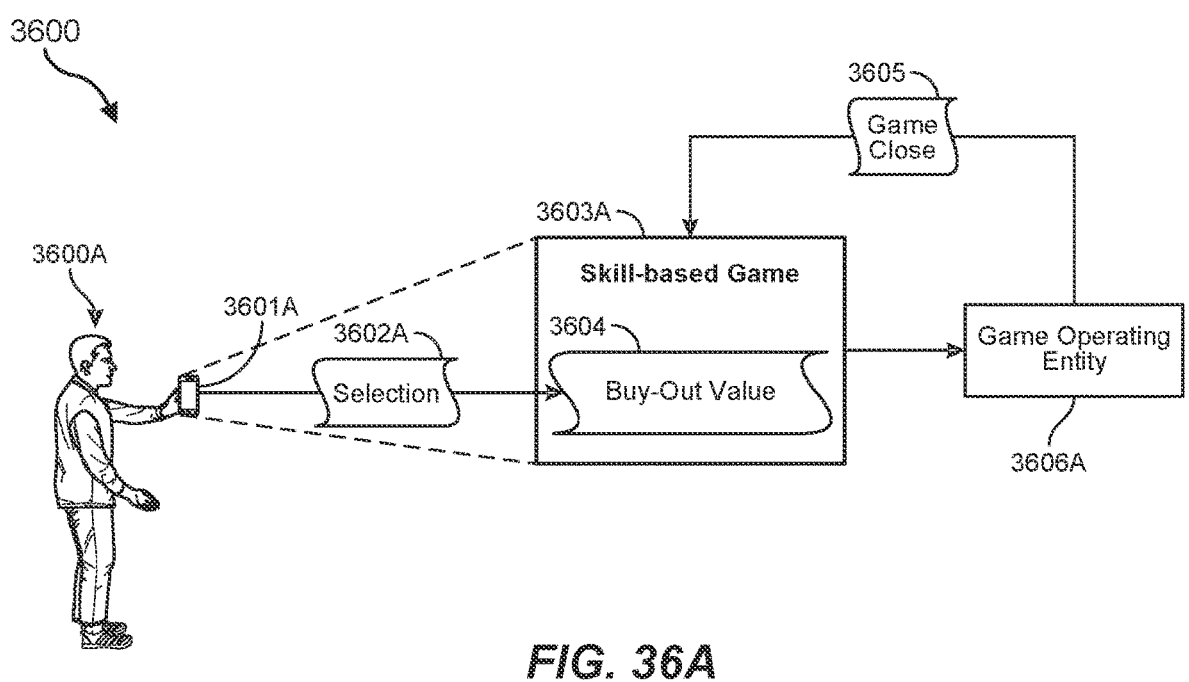
FIGS. 36A & 36B show embodiments in which a player of a skill-based game is presented with buy-out options or buy-in options, respectively.

FIG. 36A illustrates an embodiment 3600A in which a buy-out value may be presented to a player 3610A within a skill-based game 3603A in an electronic device 3601A. The skill-based game 3603A may be substantially any type of skill-based game including those listed above and may include substantially any number of matchups or sequences or arrays of matchups. In this embodiment, a player 3610A may be playing one or more skill-based games 3603A and, while playing that game, may receive a selectable buy-out value 3604. The selectable buy-out value 3604 may be presented at any point during the game 3603A where there is at least one matchup that is still pending. As the game progresses, the selectable buy-out value 3604 may increase or decrease based on how many matchups the player has correctly selected the winning component and how many matchups remain in the game 3603A. In a three-dimensional (3D) Rubik's cube game, for example, if the user has correctly matched six of nine blocks on one side and has three remaining blocks (where each block represents a matchup), the buy-out value 3604 to buy-out the remaining three matchups and close the game may be relatively high. Whereas, if the user has only matched two of six blocks and has three remaining blocks, the buy-out value 3604 may be relatively low.

If the player opts to take the buy-out value 3604 via selection 3602A, the input may be received by the skill-based game 3603A (and/or by a backend system (e.g., 101 of FIG. 1) or game operating entity 3606A). The skill-based game 3603A may then present the buy-out value 3604 to the player 3610A and the game operating entity 3606A may provide payment of the buy-out value (e.g., via direct payments or credits to an account). The game operating entity 3606A may also signal to the skill-based game 3603A that the remainder of the game is to be closed 3605. In this manner, the game operating entity 3606A may provide an option during gameplay to the player 3610A to buy-out and close the remainder of the player's game. The buy-out value may be determined at a discount to the theoretical value expected for the payout for each of the "bought out" remaining matchups. As such, the buy-out value 3604 that allows the player 3610A to sell their remaining matchups will allow the player to sell their remaining matchups at a fixed price that is better than the maximum theoretical value would indicate.

Figure 36B:
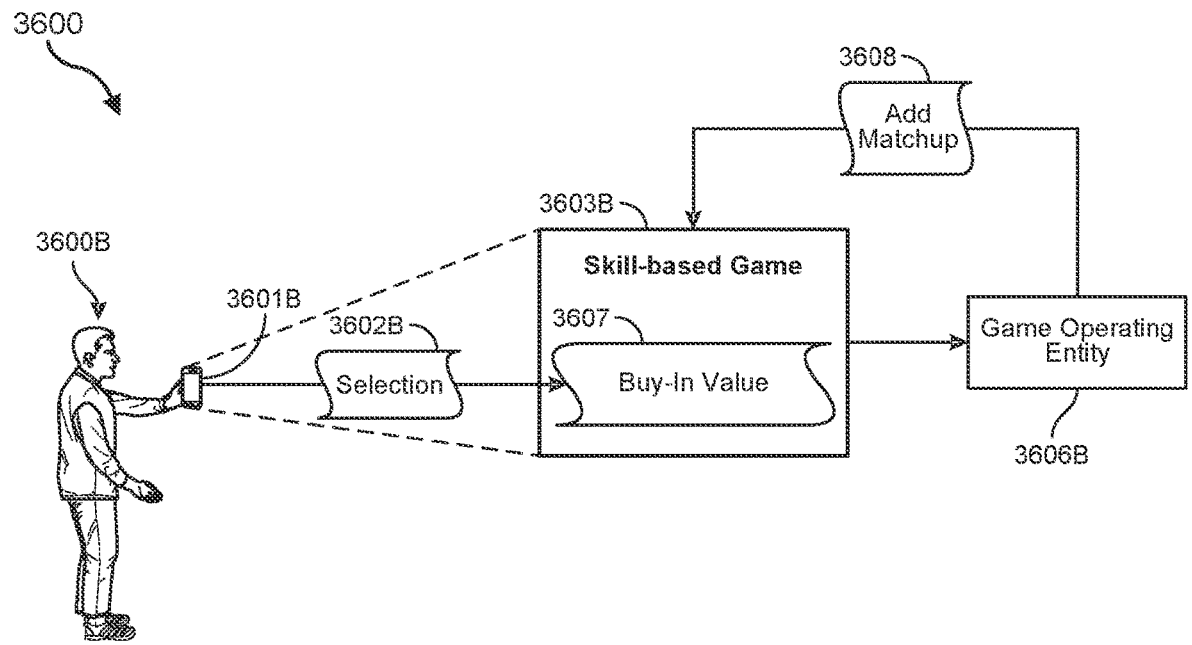

Similarly, FIG. 36B illustrates an embodiment 3600B in which a buy-in value 3607 may be presented to a player 3610B within a skill-based game 3603B in an electronic device 3601B. As with the example embodiment of FIG. 36A, the skill-based game 3603B of FIG. 36B may be substantially any type of skill-based game and may include substantially any number of matchups or sequences or arrays of matchups. In either or both of these embodiments, the skill-based games 3603A/3603B may be any type of Class II games. In embodiment 3600B, a player 3610B may be playing a skill-based game 3603B and, while playing that game, may receive a selectable buy-in value 3607. The selectable buy-in value 3607 may be presented at any point during the game 3603B where there is at least one matchup that is still pending.

As the skill-based game 3603B progresses, the selectable buy-in value 3607 may increase or decrease based on how many matchups the player has correctly selected the winning component and how many matchups remain in the game 3603B. In a spinner game, for example, if the user has correctly matched five of six triangular slots in a spinning wheel and has one remaining slot (where each slot represents a matchup), the buy-in value 3607 to add one or more slots/matchups to the game may be relatively high. Whereas, if the user has only matched one of six slots and has two remaining slots, the buy-in value 3607 may be relatively low to add more matchups to the spinning wheel.

If the player opts to select the buy-in value 3607 via input 3602B, that input will be received by the skill-based game 3603B (and/or by a backend system (e.g., 101 of FIG. 1) or game operating entity 3606B). The game operating entity 3606B may then accept payment of the buy-in value from the player 3610B (e.g., via debits from an account) and may signal to the skill-based game 3603B that at least one matchup 3608 is to be added to the game. In some cases, the player 3610B may opt to purchase multiple new matchups, each of which will be added to the game 3603B in real time. In some cases, purchasing a new matchup may include replacing one or more participants in a matchup. For instance, if a matchup had initially included Tom Brady and LeBron James, a player may select the buy-in value 3607 to replace LeBron James with Aaron Rogers or another available participant. The participants presented in the new matchup will, like the other matchups, have generally equally weighted predicted outcomes and, as such, each outcome in the new or updated matchup is virtually equally likely to occur. In this manner, a player of a skill-based game may replace participants in a given matchup, as well as purchase entirely new matchups by selecting the buy-in value 3607.

In this manner, game operating entities (e.g., 3606B) may provide options that allow players to continue playing within a game and extend the life of the game. Each of the new matchups may be selected to have generally equally weighted or substantially similar predicted outcomes, as described above. Moreover, each buy-in value may be determined at a discount to the theoretical value expected for the payout to the newly added matchup. As such, the buy-in value 3607 that allows the player 36108 to purchase new matchups will allow the player to purchase the matchups at a fixed price that is better than the maximum theoretical value would indicate. Other pricing models for the selectable buy-out and buy-in values are described further below and with regard to FIG. 39.

The selectable amount of value, whether a buy-out value or a buy-in value, may include different types of value. For example, in some cases, the selectable amount of value may be a monetary value, including cash, dollars, Euros, or other currency. The money may be transferred through banking or credit institutions which may be separate from the game operating entities. In other cases, the selectable amount of value may be in the form of in-game credits, which may or may not be tied to money. The in-game credits may allow a player to purchase buy-in matchups or may allow the player to receive payment (in credits) for a buy-out. Other forms of value may also be used in addition to or in place of those mentioned above.

The selectable amount of value that is presented in the skill-based game may be dynamically updated during the course of the game. For instance, different factors or different real-world events may affect gameplay of the skill-based game. If, for example, a real-world baseball player that was a participant in a matchup was injured and taken out of a game, matchups involving that baseball player may be removed from the game. Any selectable value to add new matchups or to buy out existing matchups may be correspondingly changed as a result of the matchup no longer being present in the game. If a team forfeits a game or if a player is ejected from a game or is sick or otherwise causes a substantial change in the calculation of substantially similar predicted outcomes, that matchup may be removed from the game, and buy-out/buy-in prices may change correspondingly. Other factors including weather, location, or other factors may also change the real-world event. In such cases, the systems herein may compensate for such factors and price those into the fixed prize values offered for winning a series of matchups in different style games.

In cases where the systems herein determine that a given real-world event resulted in a certain matchup being a winner, this determination may be based solely upon a given player's selections and not on the selections of other players. Thus, in contrast to other systems that change the size of the payout based on how many participants are in the betting pool, the embodiments herein may provide fixed-size prizes that are based solely upon each player's individual selections and not on the selections of other players. Moreover, the fixed-size prizes may be provided to each participant according to a calculated discount from a maximum theoretical value and not according to the size of the overall pool that are betting on any one matchup or game. In cases where the determination that a given real-world event resulted in a certain matchup being a winner is based solely upon a given player's selections and not on the selections of other players, the steps of receiving and analyzing user selections from other computing devices are avoided when making the determination. Accordingly, CPU cycles that would otherwise be spent processing those other players' selections can be saved, and data that would otherwise be transmitted over a computer network can be avoided, thereby saving network bandwidth for other data transfers.

Figure 37:
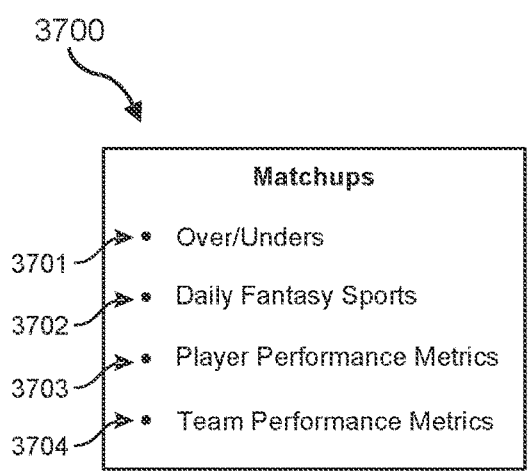
FIG. 37 shows example matchups that may be used in a skill-based game.

As noted in FIG. 37, the matchups 3700 may include over/unders 3701 that are based on daily fantasy sport outcomes 3702, player performance metrics 3703, team performance metrics 3704, or other statistics that indicate specific outcomes. For example, a matchup may include an over/under for how a given user's daily fantasy sports team will do based on a certain day of football play or based on a certain game or series of football games being played. Additionally or alternatively, a matchup may include an over/under for a specific player's performance including goals made by a player in soccer or shots blocked by a volleyball player or shot attempts in ice hockey. Many variations on player performance metrics, including a certain number of punching moves in a row in a boxing fight, or performing a pitstop within a given time period, etc. may be implemented. Team performance metrics that are based on the performance of a given team on a given date may also be implemented in matchups, including variations on team performance metrics.

Figure 38A:
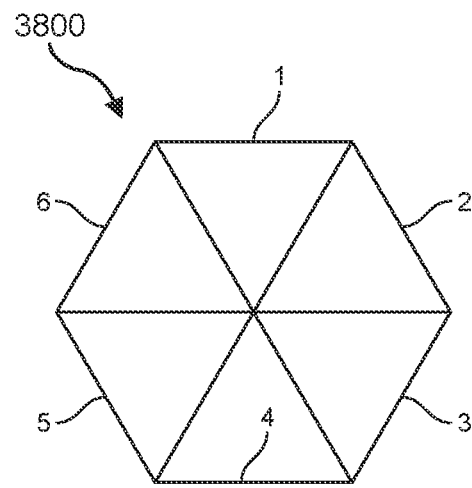
FIGS. 38A, 38B, and 38C show example advance choice or plurality of choice games in which buy-out or buy-in options may be presented.
Figure 38B:
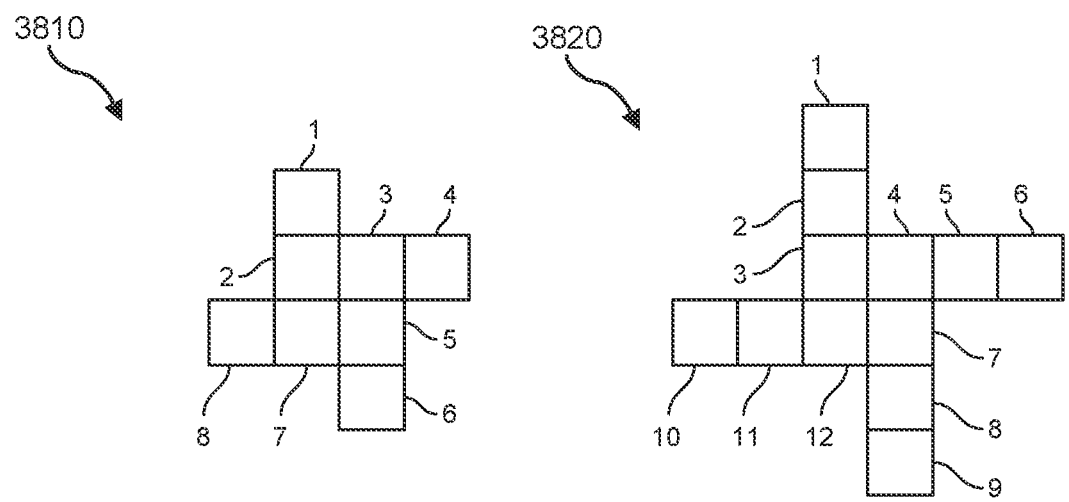
Figure 38C:
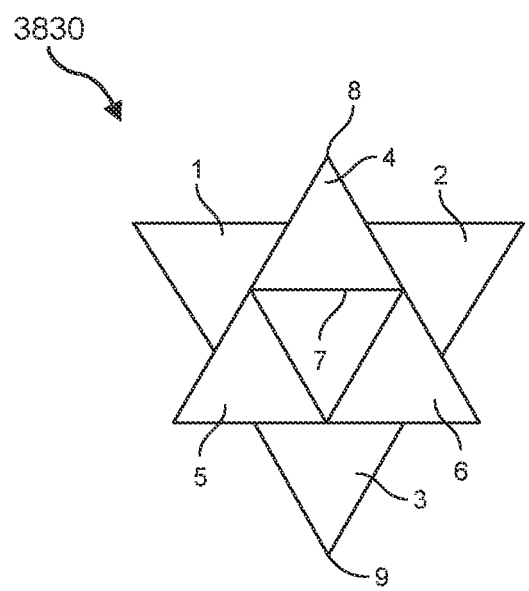

FIGS. 38A and 38B illustrate embodiments of a spinning wheel game (3800) and 3×3 Rubik's cube (3810) and 2×2 Rubik's games (3820). The numbers 1-6 in the spinning wheel game 3800 may each represent matchups, while the numbers 1-12 and 1-8 in the two Rubik's cube games may each similarly represent different matchups. In each game, the user may select winners for each of the different matchups and may try to achieve adjacent slots in the spinning game or matching 3×3 or 2×2 sides of a Rubik's cube. Another embodiment illustrating a spinning wheel game is shown in FIG. 38C. In the embodiment shown in FIG. 38C, a triangular spinning wheel 3830 may include nine different triangles labeled 1-9. Other numbers of triangles may be used in different spinning games. Each of the nine triangles may represent different matchups, as explained above. Users may select single triangles or subsets or triangles to achieve certain patterns in the spinning wheel 3830.

In some cases, a winning pattern of triangles may include adjacent triangles, or may include triangles on the spinning wheel's outer edges or may include triangles in the center of the spinning wheel or may form rows, columns, or other patterns. Each spinner game or array-based game may be presented as a Class II game, as defined herein. In such cases, the Class II spinner or array-based games may include a random number generator and may operate according to rules stipulating that the random number generator (RNG) will ensure that events resulting from or created from the RNG will not repeat. Other Class II skill-based games are also possible including tic tac toes, scratch boards, parlays, or other games.

In each game type, buy-outs or buy-ins may be provided during gameplay. Thus, in tic tac toe for example (or other two-dimensional array-based games), a player may be seeking to obtain a specific arrangement of winning matchups (e.g., three squares across, three squares up or down, or three squares diagonally). In such cases, if a player loses a matchup and loses the square corresponding to that matchup (e.g., the middle square in a tic tac toe), the player may be presented with a buy-in option to buy an additional or different square or buy the square they just lost (the middle square in this example).

In cases where the losing matchup is associated with a middle square, or in cases when the losing matchup is associated with a square that is in line with two other winning matchups, the buy-in value to repurchase a given square or to add a new square may be much higher due to the other winning matchups or due to the center location. Other locations may be associated with cheaper buy-in amounts. Similarly, if a player wants to leave their game early and wants to buy-out their remaining matchups, each matchup may be individually priced based on its location and/or based on which surrounding matchups have been won or lost. Thus, the price of a buy-in or buy-out in a given array-based game may depend on the location of the matchup in the array, the number of other winning or losing matches in the array, or the arrangement of matchups that have won or lost in the array. In cases where a player buys out their remaining matchups, that player may be able to switch to a different game and purchase matchups for that game. In some cases, instead of just buying out a game or purchasing a new matchup, the player may be able to buy out another player's matchups (based on the above pricing) and continue playing the game.

The changeable buy-in/buy-out value may be different in different games or in different types of games. For example, in cases where the skill-based game is a Class II game (e.g., a spinner game, a bingo game, a tic tac toe game, a Rubiks' cube game, or a scratch board), purchasing additional matchups may cost more in spinner games or less in bingo games, or may change based on the number or arrangement of matches in a Rubik's cube game or tic tac toe game. Each matchup, by itself, may have two or more components that are generally equally weighted or generally equally likely to occur. However, achieving a specific pattern of such matchups (e.g., to form a bingo in bingo) may be much more difficult. Allowing the buy-in or buy-out value to vary between games or to vary within a game based on current arrangements of matches may allow for players to continue playing a game even after losing or may allow the players to exit a game early and still retain some of their winnings despite not achieving a bingo or other specified arrangement of matchups in an array. It should also be noted that the above pricing principles related to multi-dimensional array-based Class II games may also be applied to multi-dimensional array-based Class III games designed for play in casinos or other similar establishments.

Additionally or alternatively, the player may be able to use the buy-in option to add a new player to the game. Thus, if a tic tac toe or spinning wheel game was already under way with three players, one of the players may select a buy-out option to buy out (and thus close the game for) one of the other players. Additionally or alternatively, the player may select a buy-in option to buy in or pay cash to add a new player to the tic tac toe or spinning wheel game. In this manner, not only may matchups be added or removed from a game that is underway, but players may also be dynamically added to or removed from games.

In some cases, the systems herein may allow a group of players (e.g., a group of friends) to bet within a group pool. Each player in the group may play their own skill-based game (e.g., tic tac toe or parlay) and, whoever wins a specific in-game payout, wins the group pool. In some such cases, the group of players may be physically located together in a common location. In other cases, the players may be disparately located. In cases where the players are commonly located, the systems herein may provide pari-mutuel, on-premise games that allow each player to select their own winners in a set of matchups. But, whoever in the group wins a specific in-game payout may win a prize designated for the winner of the pool.

Figure 39:
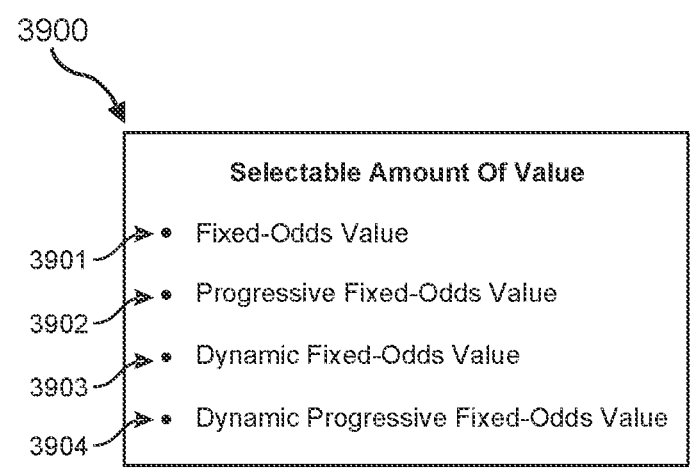
FIG. 39 shows example selectable amounts of value that may be presented within a skill-based game.

Different pricing levels may apply to groups of players or to individual players. These different levels of types of pricing may be reflected in the selectable buy-out/buy-in value that is presented to users in the form of a buy-out value or a buy-in value. Thus, for example, as shown in FIG. 39, a selectable amount of value 3900 may be a fixed-odds value 3901, a progressive fixed-odds value 3902, a dynamic fixed-odds value 3903, or a dynamic progressive fixed-odds value 3904.

A fixed odds payout 3901 may refer to a payout for a single matchup that remains the same as time progresses. A progressive fixed odds payout 3902 may refer to a series of matchups in a tic tac toe game, in a Rubik's cube game, or in a parlay with multiple consecutive matchups. The user may select a plurality of winning matchups and, as the game progresses and the player wins or loses various matchups, the fixed odds may progress (e.g., if the user has won two of four or if the user has won four of four in a five-game series) and may worsen or improve depending on whether the user is making winning selections or not. The progressive rates for buy-out or buy-in values may be established at the beginning of the game and may be fixed for the duration of the game.

In other embodiments, dynamic fixed odds payouts 3903 may be provided. The dynamic fixed odds payouts may be calculated and updated in real time on an in-game basis. As such, the fixed odds payout may change as the game progresses, with buy-out and buy-in values increasing or decreasing based on how well the player is performing (e.g., how many matchups they have selected correctly). In such cases, pricing for a buy-out may decrease if a user has made poor matchup selections and may increase if the user has made good (winning) selections. Pricing for the buy-in option, however, may increase if a user has made poor matchup selections and may decrease if the user has made multiple winning selections. In cases where the player is looking to salvage their game after a matchup losing streak, for example, prices may be decreased, and in cases where the player is looking to add to their winning streak, prices may be increased.

Dynamic progressive fixed odds 3904 implementations may be provided in a changing, real-time environment. In such cases, the systems herein may dynamically calculate risk for the remaining matchups in each skill-based game and may offer buyouts or buy-ins to players at a discount from the theoretical maximum value (i.e., the total risk that the game operating entity is taking). This provides incentives to players to keep playing, while ensuring that overly risky fixed price odds are not provided (or are at least minimized).

Any or all of these different ways of determining an appropriate selectable amount of value 3900 for a given in-game buy-in or buy-out offering (e.g., 3901-3904) may be implemented in a tournament scenario. In at least some embodiments herein, multiple different matchups in a skill-based game may be structured as a tournament having multiple tournament rounds. For example, one tournament may include four matchups in a skill-based game with two tournament rounds. Another tournament may include eight or sixteen matchups in a skill-based game with four or eight rounds, respectively. Other numbers of tournament rounds may also be used. In some cases, these rounds may be arranged in a bracket, while in other cases, the rounds may be arranged on a spinner or in a Rubik's cube.

For example, a tournament may be structured to include 16 matchups in a first round, where each matchup is selected so as to produce outcomes that are each generally equally likely to occur. Each player in the tournament may make selections for each of the 16 matchups in the first round. The tournament players may also make winning selections for the eight matchups of the second round, for the four matchups of the third round, and for the two matchups of the fourth round. In some embodiments, the matchups in the second, third, and fourth rounds may be related to or may depend on the matchups in the first round, while in other cases, the matchups in the second, third, and/or fourth rounds may not depend on the outcomes of the matchups in the first or other previous rounds.

Continuing this example, as the real-world events associated with the matchups commence, matchups in the first round will either be winning or losing. At this juncture, the systems herein may provide options to buy out the remaining matches in the tournament and allow the user to cease tournament play or may allow the user to purchase new or replacement slots in the bracket for a specific amount of value. As noted above, the selectable amount of value for a buy-in or buyout may be fixed, progressively fixed, dynamically fixed, or dynamically progressively fixed. The selectable amount of value 3900 may be offered at an amount that is discounted relative to the theoretical maximum value and may be calculated on a per-user basis or per-game basis and may be based on how many matchups the user has won or lost and/or how many matchups remain in the tournament.

Still further, the selectable amount of value 3900 may change at each round in the tournament. In a bracket of eight matchups, for example, a user may make eight selections, one for each matchup, or may make four selections if each of the matchups represents a team and those teams are competing against each other. As the real-world events associated with those matchups occur, each matchup will be determined to be a winner or a loser. In some embodiments, each matchup may be associated with a specific team, and may be an over/under for a component of play associated with that team (e.g., an over/under for points, rebounds, blocks, etc. in basketball). Alternatively, each of the eight matchups may be pitted against another team in the tournament, resulting in four teams that move on to the next round in the tournament.

If the user selected the winning outcome in a given matchup, the user may move on in the tournament to the next round which, in this case, may include four matchups. Before proceeding to this round, the user may be presented the option to buy-in to add a matchup to replace a losing matchup. Alternatively, the user may be presented the option to buy out their remaining matchups and close their tournament. The selectable amount of value associated with the buy-in amount or the buy-out amount may change at each round in the tournament and may be based on a risk ranking product. The risk ranking product may represent the likelihood of the user selecting subsequent winning matchups in some or all of the remaining matchups.

Thus, continuing this example, a second round of the tournament may have four matchups and four corresponding teams (e.g., Team A vs. Team B on one side of the bracket, and Team C vs. Team D on the other side of the bracket). In some cases, these teams may be arranged in a 2×2 Rubik's cube or in a four-card parlay or other suitable arrangement. The risk ranking product for these two games or these four teams may indicate the likelihood of any one of the teams winning both in the second round of four teams and in the final round of two teams. The matchups may be selected so that each team A-D has an equally weighted or equally likely chance of winning in each tournament round.

The user then selects the winner of A vs. B and C vs. D, as well as the winner of the final tournament game in which the A vs. B winner faces the C vs. D winner. In some cases, during the tournament, the user may be presented with buy-in or buy-out amounts that allow the user to continue playing or to cash out, despite winning or losing the A vs. B game or the C vs. D game. Moreover, an increased payout prize may be provided if the user correctly selects all three winners in the A vs. B game, the C vs. D game, and the A/B winner vs. the C/D winner game. Alternative buy-out options may also be presented before the final round in case the user wishes to exit the tournament before potentially losing the final round. Thus, buy-in and buy-out selectable values may be presented at any time during tournament play and may change the user's involvement in the tournament. Still further, it will be recognized that, while many of the embodiments described herein have been described with regard to skill-based games, these embodiments (including tournaments and multi-level buy-in/buy-out and other gaming elements described herein) may also be implemented in chance-based (e.g., Class II) games. Thus, Rubik's cube games, spinner games, tournament games, and other games described herein and illustrated in the drawings may be implemented in both Class III, skill-based games and Class II, chance-based games.

In some embodiments, tournaments may be implemented in conjunction with specific games such as spinner games or Rubik's cube games. For example, as shown in FIG. 38A, a spinner game may include multiple matchups (e.g., eight matchups). The player may attempt to select winning matchups for each of the slots in the spinner game 3800. A tournament that implements the spinner game 3800 may include multiple elections that attempt to win all of the slots or a certain number of the slots in the spinner.

Other players in the spinner game tournament may also provide their own winning selections for matchups in the spinner 3800. As the real-world events corresponding to the matchups take place in real life, the elections of the players are marked as winners or losers. Within such a tournament, the players may be offered buyouts to purchase the remainder of their selections and close the game or may be offered buy-ins to purchase additional slots within the spinner tournament. These buy-ins or buy-outs may be offered at a selectable amount of value 3900 determined using any of the various pricing models described above.

Similarly, in a Rubiks' cube tournament, a player or set of players may make selections within a 2×2×2 Rubik's cube (e.g., 3810 of FIG. 38) or within a 3×3×3 Rubik's cube (e.g., 3820). Each player in a Rubik's cube tournament may make their own elections for the matchups presented in each box of the Rubik's cube. Within such a tournament, each player may attempt to arrange a winning pattern, such as completing winning matchups on one full 2×2 or 3×3 side. During the tournament, as real-life events occur and the corresponding matchups in each square result in winning or losing squares, the tournament players may wish to buyout the remainder of their selections and close the game via an in-game buy-out value or may wish to purchase additional squares with additional matchups via an in-game buy-in value. The selectable amount of value presented to the player as a buy-in or buy-out amount may vary based on the factors outlined above. In this manner, players that want to continue playing within a Rubik's cube tournament may continue playing, despite lost matchups/squares, and players that want to stop playing within the tournament can pay the buy-out value and withdraw from the tournament.

It should be recognized that, although spinner and Rubik's cube games have been used to describe tournament play, substantially any type of Class II game may be implemented in tournament play. Moreover, it should be recognized that in-game buy-in or buy-out offers may be presented to the player at any round or at any point throughout these tournaments using the various pricing models described in FIG. 39, unless arranged otherwise by the tournament.

In at least some embodiments, some or all of the various pricing models may be insurable in real-time. Because the systems herein calculate and pay out at a discount to the theoretical maximum value of the prize on a real-time basis, the risk to the game operating entity may be controlled and managed and, therefore, known and insurable. Such insurance can be applied to skill-based games that incorporate multiple different sports and multiple different types of player and team statistics. Such pricing models may be instantaneous and may include a real-time analysis of risk, resulting in dynamic pricing that is reflective of the risk taken by the game operating entity.

In some cases, the risk may be different for each person or situation. For instance, when determining a substantially similar predicted result for multiple matchups, a different discount may be applied or offered to each player. For instance, if a player plays a game that attempts to match four matchups in a row, the initially determined odds may be $0.5^4$ or 16:1. However, the embodiments herein may determine that, if the player begins playing one game, that player may be more likely to play other games and purchase other matchups. As such, the embodiments herein may calculate the probability that, if the player opens the application or otherwise begins playing a skill-based game, the player will play other games. This likelihood to play other games is referred to herein as the player's "liquidity."

If the player's liquidity is determined to be high (i.e., the player is highly likely to play other games), the discount to the maximum payout may be reduced in order to induce the player to play that first game. Thus, instead of 16:1 odds, the systems herein may determine, based on the high liquidity value associated with the user, that 11:1 or 10:1 odds are to be presented instead. Conversely, if the player's liquidity is determined to be low, higher odds (although still at a discount) may be presented (e.g., 13:1 or 14:1). Accordingly, each player may receive or be presented with different odds or different payout values based on the player's determined liquidity value.

The liquidity value itself may be determined based on historical data (e.g., past gameplay), demographic data associated with the player, or other information that would indicate a likelihood of that person playing additional games. Additionally or alternatively, in some cases, the liquidity value may be based on 1) the number of players in a given skill-based game (e.g., in games where a minimum threshold number of players are needed in order to calculate reliable odds values), and 2) which kinds of in-game offerings or add-on purchases are available and the probability that the player will activate those offering (e.g., buy-outs or buy-ins).

For instance, at least in some cases, the systems herein may calculate, for each game or matchup, a payout value and an associated risk value (e.g., 0.5). These systems may then calculate the liquidity of the player, indicating how likely the player is to play additional games, purchase additional matchups, or purchase buyouts, and may further determine how many people will be playing the skill-based game. The systems may also determine how many players and at which liquidity values are needed to maintain the risk of the game at 0.5 (or substantially close to this value). This value may ensure that higher payouts are being provided to those who are likely to play more games, while still managing risk for game operating entities.

Accordingly, the embodiments herein may provide buy-out or buy-in opportunities for players during gameplay of a skill-based game. The pricing for these opportunities may be dynamically determined and may depend on how likely the user is to continue playing other games on the platform. The risk for providing these opportunities may be carefully managed by ensuring that each matchup has substantially similar predicted outcomes, thereby minimizing risk for providers while providing an optimal payout for players.

In some embodiments, a system corresponding to the above-described method may include at least one physical processor and physical memory comprising computer-executable instructions that, when executed by the physical processor, cause the physical processor to: determine that at least one skill-based game has been instantiated on at least one electronic device, the skill-based game being configured to allow selection of potential winners in a game that includes a plurality of matchups, wherein each matchup in the game: includes a plurality of participants in one or more real-world events and includes at least two components with substantially similar predicted outcomes, receive an indication of a selected winner for each of the plurality of matchups in the game, determine that at least one of the real-world events associated with at least one matchup in the game has completed and that at least one other matchup in the game remains pending, identify the at least one matchup associated with the completed real-world event as a winner or a loser, calculate a likelihood that the selected winner in each of the remaining pending matchups in the game will win, calculate, based on the calculated likelihood, a selectable amount of value that is to be presented within the skill-based game, the selectable amount of value comprising at least one of: a buy-out value that, upon selection, buys out the remaining pending matchups in the game or a buy-in value that, upon selection, adds at least one new matchup to the game; and cause the selectable amount of value to be presented for selection within the skill-based game.

A corresponding non-transitory computer-readable medium may also be provided that includes one or more computer-executable instructions that, when executed by at least one processor of a computing device, cause the computing device to: determine that at least one skill-based game has been instantiated on at least one electronic device, the skill-based game being configured to allow selection of potential winners in a game that includes a plurality of matchups, wherein each matchup in the game: includes a plurality of participants in one or more real-world events, and includes at least two components with substantially similar predicted outcomes, receive an indication of a selected winner for each of the plurality of matchups in the game, determine that at least one of the real-world events associated with at least one matchup in the game has completed and that at least one other matchup in the game remains pending, identify the at least one matchup associated with the completed real-world event as a winner or a loser, calculate a likelihood that the selected winner in each of the remaining pending matchups in the game will win, calculate, based on the calculated likelihood, a selectable amount of value that is to be presented within the skill-based game, the selectable amount of value comprising at least one of: a buy-out value that, upon selection, buys out the remaining pending matchups in the game or a buy-in value that, upon selection, adds at least one new matchup to the game; and cause the selectable amount of value to be presented for selection within the skill-based game.

Figure 40:
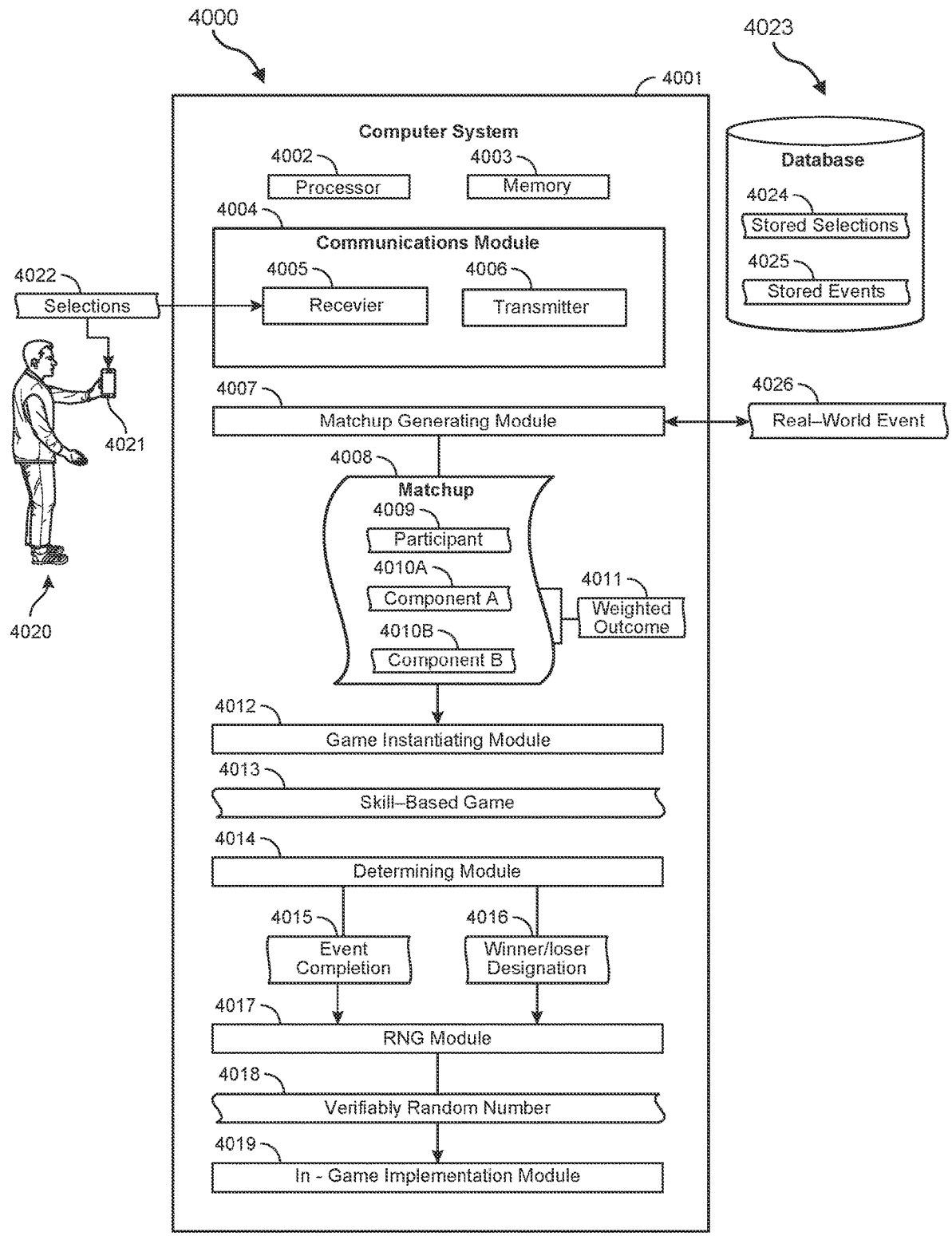
FIG. 40 shows an example computer architecture in which the embodiments described herein may operate.

Turning now to FIG. 40, a computing environment 4000 is provided in which various embodiments may be carried out, including generating and implementing a verifiably random number in skill-based games. The computing environment 4000 may include various electronic components and elements, including a computer system 4001 that is used, either alone or in combination with other computer systems, to perform associated tasks. The computer system 4001 may be substantially any type of computer system including a local computer system or a distributed (e.g., cloud) computer system. The computer system 4001 may include at least one processor 4002 and at least some system memory 4003. The computer system 4001 may include program modules for performing a variety of different functions. The program modules may be hardware-based, software-based, or may include a combination of hardware and software. Each program module may use computing hardware and/or software to perform specified functions, including those described herein below.

In some cases, the communications module 4004 may be configured to communicate with other computer systems. The communications module 4004 may include substantially any wired or wireless communication means that can receive and/or transmit data to or from other computer systems. These communication means may include, for example, hardware radios such as a hardware-based receiver 4005, a hardware-based transmitter 4006, or a combined hardware-based transceiver capable of both receiving and transmitting data. The radios may be WIFI radios, cellular radios, Bluetooth radios, global positioning system (GPS) radios, or other types of radios. The communications module 4004 may be configured to interact with databases, mobile computing devices (such as mobile phones or tablets), embedded computing systems, or other types of computing systems.

The computer system 4001 may further include a matchup generating module 4007. The matchup generating module 4007 may be configured to generate matchups for skill-based and/or chance-based games. As noted above, skill-based games may involve, for example, a user selecting which of two components in a matchup is going to occur in an associated real-world event 4026. Chance-based games may involve selections or may simply involve a user selecting when an event, such as a bingo draw, occurs. Such bingo draws may form the backbone of many different types of Class II, chance-based games. Some or all of these chance-based games may be based on bingo or may have a bingo-based algorithm that provides some or all of the random elements of the game. For these chance-based bingo games, the drawing of a bingo number is ideally based on a number that is truly, verifiably random.

However, in many bingo-based games, designers opt to consult third parties to acquire a pseudorandom number. Or, application designers may use cyclic base values to generate pseudorandom numbers. Often, these third parties or designers will use pseudorandom patterns (e.g., cycles that are incredibly large (e.g., $2^{48}$ cycles)) to generate a number that is supposed to be random. Because the number is only pseudorandom, and is not entirely and verifiably random, there is a potential for unscrupulous users to attempt to identify patterns in the pseudorandom numbers and use that knowledge to unfairly play the bingo-based game. Indeed, in real-life bingo-based games, multiple people have identified these pseudorandom patterns and have used those patterns to illegally win large amounts of money from such chance-based games.

In contrast to pseudorandom number generators or generating allegedly random numbers from patterns that use some type of cyclic, repeating base values, the embodiments herein are designed to generate truly, verifiably random numbers that are based on a verifiably non-repeating set of occurrences. Because this number is truly random, and is verifiably random, the embodiments herein may ensure that bingo-based games using these truly random numbers cannot be manipulated or gamed in the manner described above.

Figure 41:
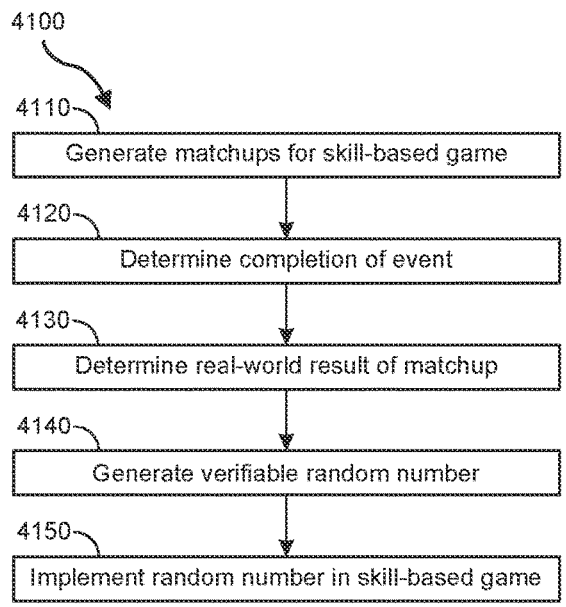
FIG. 41 shows a flow diagram of an exemplary method for generating and implementing a verifiably random number.

FIG. 41 is a flow diagram of an exemplary computer-implemented method 4100 for generating truly random numbers for implementation within a skill-based game. The steps shown in FIG. 41 may be performed by any suitable computer-executable code and/or computing system, including the systems illustrated in FIG. 41. In one example, each of the steps shown in FIG. 41 may represent an algorithm whose structure includes and/or is represented by multiple sub-steps, examples of which will be provided in greater detail below.

At step 4110, method 4100 includes generating one or more matchups for a skill-based game. The skill-based game may be configured to allow selection of potential winners from among the matchups. For example, the matchup generating module 4007 of computer system 4001 may be configured to generate matchups (e.g., 4008) for a skill-based game 4013 that was instantiated by the game instantiating module 4012. The skill-based game 4013 may be any type of skill-based game, including array-based games, as defined and explained in greater detail above. The skill-based game 4013 may include multiple different matchups 4008, where each matchup may include at least two components (e.g., 4010A and 4010B) associated with a participant 4009 in one or more real-world events 4026.

As noted above, these real-world events 4026 may be sporting events that occur on a specific day and time. Throughout the sporting event (or other real-world event), the matchup generating module 4007 may create matchups involving at least one participant 4009 (e.g., a player in the sporting event) and two components 4010A/4010B (e.g., over/unders) that are selected so as to produce weighted outcomes 4011 that are generally equally weighted within the skill-based game. Due to the generally equal weighting, the two weighted outcomes 4011 may be equally probable to occur in the real-world event 4026.

Because the two weighted outcomes 4011 are equally probable to occur, the player (e.g., 4020) of the skill-based game 4013 may use skill to determine, in his or her selections 4022 (e.g., using a mobile device 4021), which outcome the player thinks will actually occur during the sporting event. Each sporting (or other) real-world event is unique in time and place. For instance, while the Green Bay Packers have played the New York Giants many times over years of football competition, the Green Bay Packers will only play the New York Giants on a specific date in a specific year one time. That event, tied to that date and time, will occur once and only once. That event, tied to that date and time (and place), will never be played again. Any future meeting between those two teams would be on a different date and time (and potentially place) and would be its own unique event. As such, these sporting events and the components within the events, in aggregate, can form a series of non-repeating values. Because time only progresses forward, these sporting and other events locked in time and place can form an infinite series of non-repeating values. This infinite series of non-repeating values, in addition to the matchups generated for those events, may be used in the embodiments herein in the generation of random numbers that are truly, verifiably random.

Returning to FIG. 41, Method 4100 next includes, at step 4120, determining that at least one of the real-world events associated with at least one of the matchups has completed. For example, if the real-world event 4026 was a football game, the components 4010A/4010B may involve an indication that the Green Bay Packers will convert on their next third down, or that the quarterback of the New York Giants will throw passes in at least two of the next three plays. The components, in this example, may involve over/unders for each of these occurrences. The determining module 4014 of computer system 4001 may thus determine that the events related to a given matchup have completed 4015 and that an outcome can be determined. The determining module 4014 may then, at step 4130, determine a real-world result of the matchup 4008, where the real-world result indicates a winner or a loser 4016 based on which of the (e.g., two) components of the matchup was selected by the player 4020 in their selection 4022. The determining module 4014 thus determines, in this example, whether the player 4020 selected the proper over or under for each matchup component and then declares the player a winner or loser 4016 for each component.

Method 4100 next includes, at step 4140, generating a verifiably random number that is based on the determined real-world result of the at least one matchup. Because the real-world result(s) represent non-repeating occurrences, these events (or the matchups derived from the events) may form the basis of the verifiably random number. At step 4150, the Method 4100 may include implementing the generated verifiably random number to perform at least one action within the skill-based game 4013. Thus, the random number generating module (e.g., RNG module 4017) of computer system 4001 may generate a verifiably random number 4018 that may be used, by the in-game implementation module 4019, within the skill-based game 4013.

The verifiably random number 4018 may be tied to any number of different occurrences that happen as part of the real-world event. For example, in a basketball game, multiple different players may play in each of the four quarters of the game. Those players will take shots (which are made or missed), steal passes, block shots, make assists, and gather rebounds. Coaches will draw plays, make substitutions, manage team lineups, and make other decisions. Each of these points may be tied to a specific game played between two specific teams at a known date, time, and place. As such, each occurrence within the basketball game is, for that date and time, unique. As the basketball game progresses, hundreds or thousands of such occurrences or events may be identified and recorded. Each of these events may form the basis for a matchup selection within the skill-based game 4013. Each of these events may be stored (e.g., 4025), along with other users' stored selections 4024, in database 4023. Each of these events may also be used to generate a verifiably random number 4018.

In contrast to other systems that may implement pseudo-random sequences, or even sequences that cycle on an extremely long scale (e.g., $2^{48}$ cycles), the systems herein may generate truly random numbers based on the events within the real-world game or based on the matchups between selected components. The matchups (e.g., 4008), as noted above, may include multiple components 4010A/4010B that have a generally equally weighted outcome. As such, these components are equally probable to occur in real-life. These matchups may be tied to in-game occurrences, each of which are unique to that specific game, in that date, time, and place.

Accordingly, the matchups 4008 provided by the matchup generating module 4007 may themselves be unique and, in aggregate, may form an infinite series of non-repeating values. Even if the same teams play each other again in the same location, it would be on a different date and time and, thus, each event or occurrence that happened during that game would be unique. As such, random numbers based on these events or occurrences are truly random and can be verified as not being based on any type of cyclic pattern that could repeat. Moreover, the random numbers are not generated based on physical states, quantum results, or any type of physical elements of entropy based on physics or chemistry. In some cases, even though those sources of randomness may produce random values, the current states of the random number generators may potentially be discovered.

These states may then be used to generate a highly accurate prediction of the next "random" value generated by that source.

In contrast, the embodiments herein are non-cyclical and are verifiably random. The random numbers provided herein are generated from an event-based RNG that is tied to a physical space and time. The generated random numbers are also based on calculated outcomes that are generally equally probable to occur. Because these random numbers are based on both a physical event and calculated outcomes that are equally probable to occur, the random number generator is not virtual RNG or pseudo RNG. Rather, both the random numbers themselves and the state of the random number generator are unpredictable and verifiably random. Moreover, because the random numbers are based on both a physical event and calculated outcomes that are equally probable to occur, the Class II or traditional games (e.g., bingo) that implement these random numbers may be games of skill, as further defined above.

Figure 42:
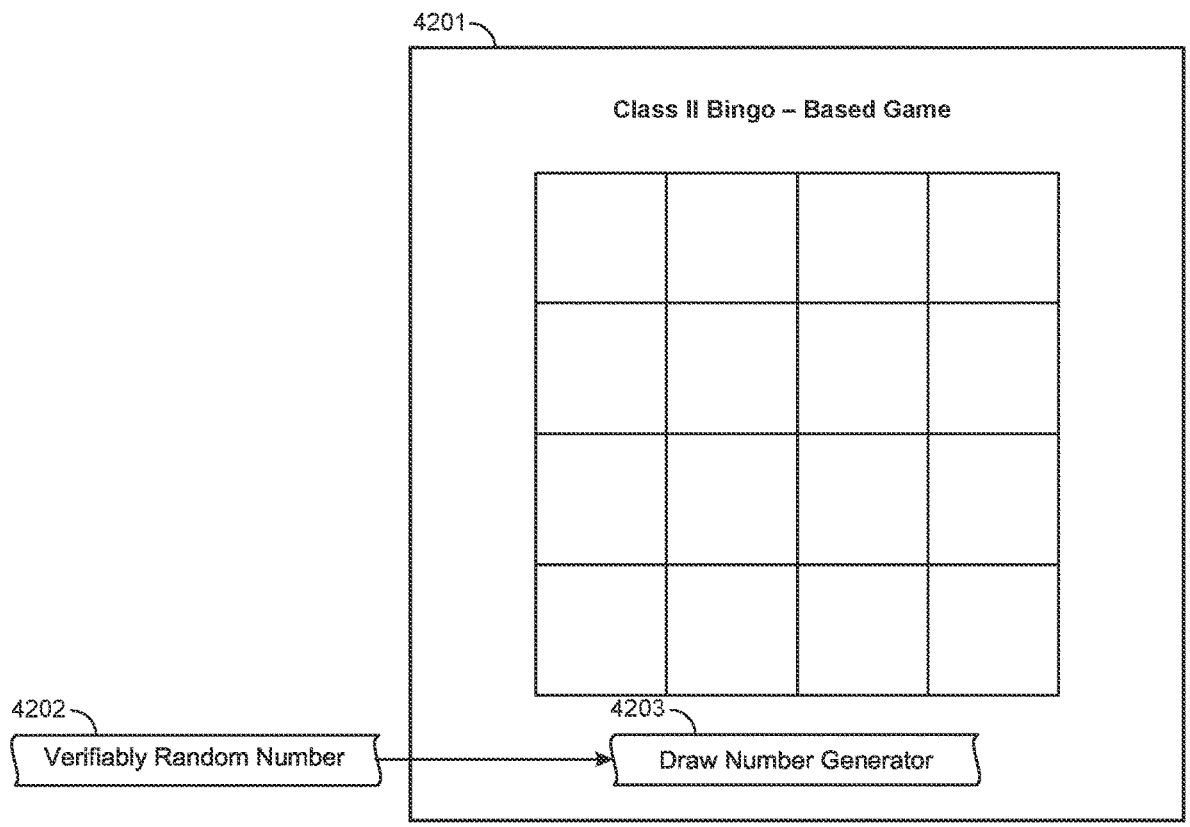
FIG. 42 illustrates an embodiment in which a verifiably random number is implemented in a Class II Bingo-based game.

In some cases, the skill-based game may be a Class II skill-based game. For instance, as shown in FIG. 42, the skill-based game may be a Class II, bingo-based game 4201. The Class II, bingo-based game 4201 may be any type of game that uses a bingo draw number generator 4203 for one or more of its functions. For example, many Class II, bingo-based games may appear as slot machines or horse races or other types of games. Underlying those appearances, however, is a bingo-based draw number generator 4203 that randomly draws numbers that are to be applied to a bingo board. In some cases, Class II games that display a slot-style game also project a bingo board onto that screen so users can see how the bingo board is filled in when random numbers are drawn by the draw number generator 4203.

In the embodiments described herein, the draw number generator 4203 may draw a random number based on a random number generating algorithm. This algorithm may use the verifiably random number 4202 generated in FIG. 40 as the basis for calculating a bingo draw number. Or, in other cases, the verifiably random number 4202 may, itself, be used as the draw number for the bingo game. In some embodiments, different verifiably random numbers 4202 may be used for the generation of each bingo draw number. The verifiably random numbers 4202 may, themselves, be based on unique events or unique matchup components derived from those events. Those matchup components may be calculated and specifically selected to be generally equally weighted and, thus, equally probable to occur. Such matchup components are based on occurrences within the real-world event and are tied to certain dates and times that will never recur. Thus, the calculated matchup components may, themselves, form a series of non-repeating values upon which verifiably random numbers may be generated and then implemented within a skill-based game.

In some cases, actions performed in a bingo-based game (e.g., 4201) may include selecting a draw number for the bingo-based game. In other cases, the actions performed in a bingo-based game may include selecting a slot element in a slot-style game, selecting a winning horse in a historical horse racing event, selecting a projected winner of an event (e.g., a daily fantasy sports event, a participant performance event, a racing event (e.g., a horse race or a car race, etc.), a team performance event, or other selectable event where a user can select a projected winner), or performing some other action that is ideally based on true randomness. Events that are less than random (e.g., pseudorandom) may be subject to manipulation and gaming, potentially resulting in large losses for entities that provide the games. In some cases, each of these random in-game actions may be based on newly generated, verifiably random numbers. Indeed, in the class II bingo-based game 4201, each draw number may be generated for selection based on a newly generated, verifiably random number.

Figure 43:
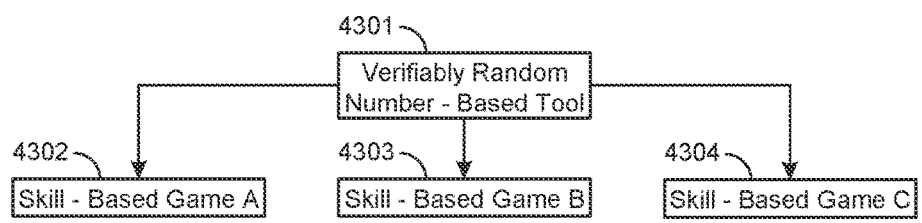
FIG. 43 illustrates an embodiment in which a verifiably random number-based tool is implemented in conjunction with one or more skill-based games.

FIG. 43 illustrates a tool that can be used by many different skill-based games. The tool is a verifiably random number-based tool 4301 that implements verifiably random numbers in various skill-based games (e.g., 4302, 4303, and/or 4304). In some cases, the verifiably random number-based tool 4301 may be a tool to effectuate bingo play for Class II gaming products. These Class II gaming products may include historic horse racing interfaces that are based on bingo draw numbers or may include slot machine-appearing games that are similarly based on bingo draw numbers or may include other DFS events, player performance events, team performance events, or live racing events whose outcomes are calculated to be equally probable to occur. The verifiably random number-based tool 4301 may generate verifiably random numbers based on matchups and/or matchup components, each of which is tied to a specific date and time and is, definitionally, unique. Because the matchups and components are each unique, they may represent infinite series of non-repeating values that can be used by the verifiably random number-based tool 4301 when generating and implementing random numbers. Such a truly random number may be implemented in substantially any bingo operation or in any other scenario where truly random, non-repeating numbers are needed.

In some cases, regardless of which Class II game is offered, the prizing for positive outcomes in these games may be different. For example, in a Class II bingo game, the random number generator described herein may generate a random number and use that number to perform a bingo draw. After multiple such draws, if a user achieves a specific pattern (e.g., a row, column, or diagonal), that user may be in competition to be the first to achieve the pattern. The prize for winning the bingo game is open to many players but (at least in some instances) may only be achieved by one player. This is referred to as a "competition-based" prizing scheme.

The random numbers generated herein may also be used in lottery games. In lottery games, users are permitted to select certain numbers and, when those numbers are drawn, the users will win a prize. That prize will be shared with any other players that have selected the same winning numbers. In such cases, there is no competition among players; rather, each player that properly selected the winning lottery numbers gets to share in the prize. This is referred to as a "shared" prizing scheme. In this manner, the type of prize (either competition-based (as in bingo) or shared (as in lottery)) may define the game. The various types of prizing may be applied to different chance-based games, including Class II bingo games, traditional bingo games, and lottery games.

Figure 44:
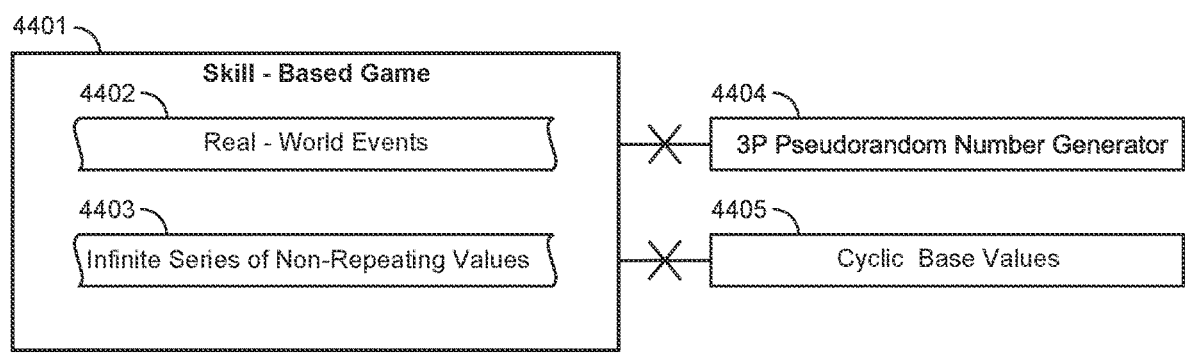
FIG. 44 illustrates an embodiment in which a skill-based game implements an infinite series of non-repeating values without implementing cyclic base values or third-party pseudorandom number generators.

Thus, the generated verifiably random number-based tool 4301 may be provided as a tool for effectuating bingo-based play in multiple different skill-based games (4302-4304). The non-repeating occurrences (e.g., matchups or matchup components) that form the basis of the verifiably random number generation avoid cyclic base values used in pseudorandom number generation. Each matchup or matchup component may be timestamped to a specific sporting event or other real-world event. The timestamp may ensure that, even if a similar event occurs, that event will be at a different date and time and will not be the same event. Numbers generated using this infinite series of non-repeating values 4403 (as shown in FIG. 44) which, itself, is tied to a real-world event 4402 taking place on a certain date and time and includes options that are equally probable to occur, are truly random and cannot be reverse engineered. Thus, in contrast to skill-based games that use third-party pseudo-random number generators 4404 or use cyclic base values 4405 to generate pseudorandom values, the skill-based games herein (e.g., 4401) may avoid using third-party pseudorandom number generators 4404 and may avoid using cyclic base values 4405 (even if the cycle is very, very large).

The embodiments herein may further avoid computer network traffic that would otherwise be sent to a third-party pseudorandom number generator 4404. Still further, the embodiments herein may avoid at least some of the security risks that may come from opening the skill-based game 4401 to third-party access. Because 3P APIs are not exposed by the system, those APIs cannot be exploited by malicious third parties. Moreover, the embodiments described herein may be much more secure. Previous systems that relied on cyclic base values 4405, regardless of cycle size, were subject to computing systems that could learn the cyclic patterns and then manipulate those patterns to know when (or approximately when) a given number would be generated from a process that was supposed to be entirely random. Thus, the embodiments herein may avoid communication with third party pseudorandom number generation services and may generate the verifiably random number based on the real-world result of a specific matchup. Moreover, the embodiments described herein are not subject to reverse engineering and, as such, are more secure than virtual random number generation or pseudorandom number generation.

Still further, in at least some embodiments, the random numbers generated using the systems and methods described herein may be verified using artificial intelligence (AI) algorithms. Such AI algorithms may be designed to identify patterns among the random numbers being generated (e.g., bingo draw numbers). The AI algorithms may analyze many thousands, millions, or more of the random numbers and may determine whether any patterns have been identified. As noted above, such patterns may include any cyclic values or repeating numbers or numbers that follow any sort of recognizable pattern. Because the embodiments described herein are based on real-world occurrences that are tied to a place and time and because the random numbers may be further generated based on identified matchups with components that are generally equally weighted and are equally probable to occur, these random numbers are definitionally non-recurring and are verifiably random. AI algorithms may be used to verify that the generated numbers are truly random and are safe for use in skill-based games that rely on random elements. Accordingly, the embodiments herein may provide numbers that are not only random but are truly and verifiably random.

A corresponding system may include: at least one physical processor, and physical memory comprising computer-executable instructions that, when executed by the physical processor, cause the physical processor to: generate one or more matchups for a skill-based game, the skill-based game being configured to allow selection of potential winners from among the one or more matchups, wherein each of the generated matchups includes at least two components associated with at least one participant in one or more real-world events that are selected so as to produce weighted outcomes that are generally equally weighted within the skill-based game, determine that at least one of the real-world events associated with at least one of the one or more matchups has completed, determine a real-world result of the at least one matchup, the real-world result indicating a winner or a loser based on which of the at least two components of the matchup was selected, generate a verifiably random number that is based on the determined real-world result of the at least one matchup, the real-world result representing a non-repeating occurrence that forms the basis of the verifiably random number generation, and implement the generated verifiably random number to perform at least one action within the skill-based game.

A corresponding non-transitory computer-readable medium may include one or more computer-executable instructions that, when executed by at least one processor of a computing device, cause the computing device to: generate one or more matchups for a skill-based game, the skill-based game being configured to allow selection of potential winners from among the one or more matchups, wherein each of the generated matchups includes at least two components associated with at least one participant in one or more real-world events that are selected so as to produce weighted outcomes that are generally equally weighted within the skill-based game, determine that at least one of the real-world events associated with at least one of the one or more matchups has completed, determine a real-world result of the at least one matchup, the real-world result indicating a winner or a loser based on which of the at least two components of the matchup was selected, generate a verifiably random number that is based on the determined real-world result of the at least one matchup, the real-world result representing a non-repeating occurrence that forms the basis of the verifiably random number generation, and implement the generated verifiably random number to perform at least one action within the skill-based game.

It will be understood that the above-described arrangements of apparatus and the method there from are merely illustrative of applications of the principles of this invention and many other embodiments and modifications may be made without departing from the spirit and scope of the invention as defined in the claims.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses. As will be apparent to those skilled in the art, techniques described above for panoramas may be applied to images that have been captured as non-panoramic images, and vice versa.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method comprising:
generating one or more matchups for a skill-based game, the skill-based game being configured to allow selection of potential winners from among the one or more matchups, wherein each of the generated matchups includes at least two components associated with at least one participant in one or more real-world events that are selected so as to produce weighted outcomes that are generally equally weighted within the skill-based game;
determining that at least one of the real-world events associated with at least one of the one or more matchups has completed;
determining a real-world result of the at least one matchup, the real-world result indicating a winner or a loser based on which of the at least two components of the matchup was selected;
generating a verifiably random number that is based on the determined real-world result of the at least one matchup, the real-world result representing a non-repeating occurrence that forms the basis of the verifiably random number generation; and
implementing the generated verifiably random number to perform at least one action within the skill-based game.

2. The computer-implemented method of claim 1, wherein the skill-based game comprises a Class II skill-based game.

3. The computer-implemented method of claim 2, wherein the Class II skill-based game comprises a bingo-based game.

4. The computer-implemented method of claim 3, wherein the at least one action performed in the bingo-based game comprises selecting a draw number for the bingo-based game.

5. The computer-implemented method of claim 4, wherein each draw number in the Class II, bingo-based game is generated for selection based on a newly generated, verifiably random number.

6. The computer-implemented method of claim 3, wherein the generated verifiably random number is provided as a tool for effectuating bingo-based play in a plurality of different skill-based games.

7. The computer-implemented method of claim 1, wherein the non-repeating occurrence that forms the basis of the verifiably random number generation avoids cyclic base values used in pseudorandom number generation.

8. The computer-implemented method of claim 1, wherein generating a verifiably random number that is based on the determined real-world result of the at least one matchup avoids communication with third party pseudorandom number generation services.

9. The computer-implemented method of claim 1, wherein the one or more real-world events are each tied to a specific date and time of occurrence.

10. The computer-implemented method of claim 9, wherein the one or more real-world events that are each tied to a specific date and time comprise, in aggregate, an infinite series of non-repeating values.

11. The computer-implemented method of claim 1, further comprising verifying the generated verifiably random number using at least one artificial intelligence algorithm.

12. A system comprising:
at least one physical processor; and
physical memory comprising computer-executable instructions that, when executed by the physical processor, cause the physical processor to:
generate one or more matchups for a skill-based game, the skill-based game being configured to allow selection of potential winners from among the one or more matchups, wherein each of the generated matchups includes at least two components associated with at least one participant in one or more real-world events that are selected so as to produce weighted outcomes that are generally equally weighted within the skill-based game;

determine that at least one of the real-world events associated with at least one of the one or more matchups has completed;

determine a real-world result of the at least one matchup, the real-world result indicating a winner or a loser based on which of the at least two components of the matchup was selected;

generate a verifiably random number that is based on the determined real-world result of the at least one matchup, the real-world result representing a non-repeating occurrence that forms the basis of the verifiably random number generation; and implement the generated verifiably random number to perform at least one action within the skill-based game.

13. The system of claim 12, wherein the skill-based game comprises a Class II skill-based game.

14. The system of claim 13, wherein the Class II skill-based game comprises a bingo-based game.

15. The system of claim 14, wherein the at least one action performed in the bingo-based game comprises selecting a draw number for the bingo-based game.

16. The system of claim 15, wherein each draw number in the Class II, bingo-based game is generated for selection based on a newly generated, verifiably random number.

17. The system of claim 14, wherein the generated verifiably random number is provided as a tool for effectuating bingo-based play in a plurality of different skill-based games.

18. The system of claim 12, wherein the non-repeating occurrence that forms the basis of the verifiably random number generation avoids cyclic base values used in pseudorandom number generation.

19. The system of claim 12, wherein generating a verifiably random number that is based on the determined real-world result of the at least one matchup avoids communication with third party pseudorandom number generation services.

20. A non-transitory computer-readable medium comprising one or more computer-executable instructions that, when executed by at least one processor of a computing device, cause the computing device to:

generate one or more matchups for a skill-based game, the skill-based game being configured to allow selection of potential winners from among the one or more matchups, wherein each of the generated matchups includes at least two components associated with at least one participant in one or more real-world events that are selected so as to produce weighted outcomes that are generally equally weighted within the skill-based game;

determine that at least one of the real-world events associated with at least one of the one or more matchups has completed;

determine a real-world result of the at least one matchup, the real-world result indicating a winner or a loser based on which of the at least two components of the matchup was selected;

generate a verifiably random number that is based on the determined real-world result of the at least one matchup, the real-world result representing a non-repeating occurrence that forms the basis of the verifiably random number generation; and implement the generated verifiably random number to perform at least one action within the skill-based game.

\* \* \* \* \*